US008717878B2

(12) United States Patent
Martinez et al.

(10) Patent No.: US 8,717,878 B2
(45) Date of Patent: May 6, 2014

(54) PROVIDING FEEDBACK INFORMATION WHEN NETWORK STREAMING OVER MULTIPLE PHYSICAL INTERFACES

(75) Inventors: Martin Martinez, Ladera Ranch, CA (US); Eric Riggert, Lake Forest, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 12/732,167

(22) Filed: Mar. 25, 2010

(65) Prior Publication Data
US 2011/0235650 A1    Sep. 29, 2011

(51) Int. Cl.
*H04L 1/00*     (2006.01)
*H04L 12/26*    (2006.01)
*H04L 12/28*    (2006.01)
*H04L 12/56*    (2011.01)

(52) U.S. Cl.
USPC ............ 370/221; 370/219; 370/225; 370/419

(58) Field of Classification Search
USPC .......................... 370/216–225, 241–252, 419
See application file for complete search history.

(56) References Cited

U.S. PATENT DOCUMENTS

| 4,216,374 A | 8/1980 | Lam et al. |
| 4,625,315 A | 11/1986 | Lemberger et al. |
| 4,896,374 A | 1/1990 | Waugh et al. |
| 5,045,713 A | 9/1991 | Shima |
| 5,267,271 A | 11/1993 | Rice |
| 5,311,502 A | 5/1994 | Mueller et al. |
| 5,444,705 A | 8/1995 | Olnowich et al. |
| 5,452,328 A | 9/1995 | Rice |
| 5,539,306 A | 7/1996 | Riggio, Jr. |
| 5,815,526 A | 9/1998 | Rice |
| 5,991,333 A | 11/1999 | Rice |
| 6,032,194 A * | 2/2000 | Gai et al. ...................... 709/239 |
| 6,208,618 B1 | 3/2001 | Kenney et al. |
| 6,377,992 B1 | 4/2002 | Plaza Fernandez et al. |
| 6,389,005 B1 * | 5/2002 | Cruickshank ................. 370/352 |
| 6,512,774 B1 | 1/2003 | Vepa et al. |
| 6,560,630 B1 | 5/2003 | Vepa et al. |
| 6,639,582 B1 | 10/2003 | Shrader |
| 6,687,758 B2 | 2/2004 | Craft et al. |
| 6,734,740 B1 * | 5/2004 | Green et al. ..................... 331/25 |
| 6,757,725 B1 | 6/2004 | Frantz et al. |
| 6,938,092 B2 | 8/2005 | Burns |
| 6,963,932 B2 | 11/2005 | Bhat |

(Continued)

FOREIGN PATENT DOCUMENTS

WO    WO 2010/105667    *    9/2010    ............ H04W 72/12

*Primary Examiner* — Ronald Abelson
(74) *Attorney, Agent, or Firm* — Fitzpatrick, Cella, Harper & Scinto

(57) ABSTRACT

The present disclosure is directed to providing feedback information for a data stream being sent from a sending endpoint to a receiving endpoint. Both of the endpoints each have multiple physical interfaces connecting each endpoint to multiple networks, respectively. Information as feedback information is gathered regarding a data capacity throughput for each of the multiple physical interfaces connected to the endpoints. The feedback information is split and sent on one or more of the multiple physical interfaces from the receiving endpoint to the sending endpoint. A detection is made, based on the feedback information, whether one or more of the physical interfaces used to send the feedback information have degraded or failed. The feedback information is then reapportioned and sent from the receiving endpoint to the sending endpoint on one or more of the multiple physical interfaces which have not been detected as degraded or failed.

47 Claims, 42 Drawing Sheets

(56) References Cited

U.S. PATENT DOCUMENTS

| | | |
|---|---|---|
| 7,027,439 B1 | 4/2006 | Barrow et al. |
| 7,151,744 B2 | 12/2006 | Sarkinen et al. |
| 7,233,115 B2 | 6/2007 | Lys |
| 7,256,554 B2 | 8/2007 | Lys |
| 7,323,931 B2 | 1/2008 | Hong et al. |
| 7,349,342 B2 | 3/2008 | Carpenter et al. |
| 7,404,012 B2 | 7/2008 | Matters et al. |
| 7,459,864 B2 | 12/2008 | Lys |
| 7,545,741 B1 | 6/2009 | Manickavasagam et al. |
| 2004/0116153 A1* | 6/2004 | Kaminski et al. .......... 455/552.1 |
| 2005/0188407 A1* | 8/2005 | van Beek et al. ................ 725/81 |
| 2008/0192644 A1* | 8/2008 | Utsunomiya et al. ......... 370/252 |
| 2008/0205409 A1 | 8/2008 | McGee et al. |
| 2008/0313362 A1 | 12/2008 | Takamoto |
| 2011/0131319 A1* | 6/2011 | Harrang et al. ................ 709/224 |

* cited by examiner

|  | FIG. 6F | FIG. 6J | FIG. 6N |
|---|---|---|---|
|  | FIG. 6E | FIG. 6I | FIG. 6M |
| FIG. 6B | FIG. 6D | FIG. 6H | FIG. 6L |
| FIG. 6A | FIG. 6C | FIG. 6G | FIG. 6K |

FIG. 6

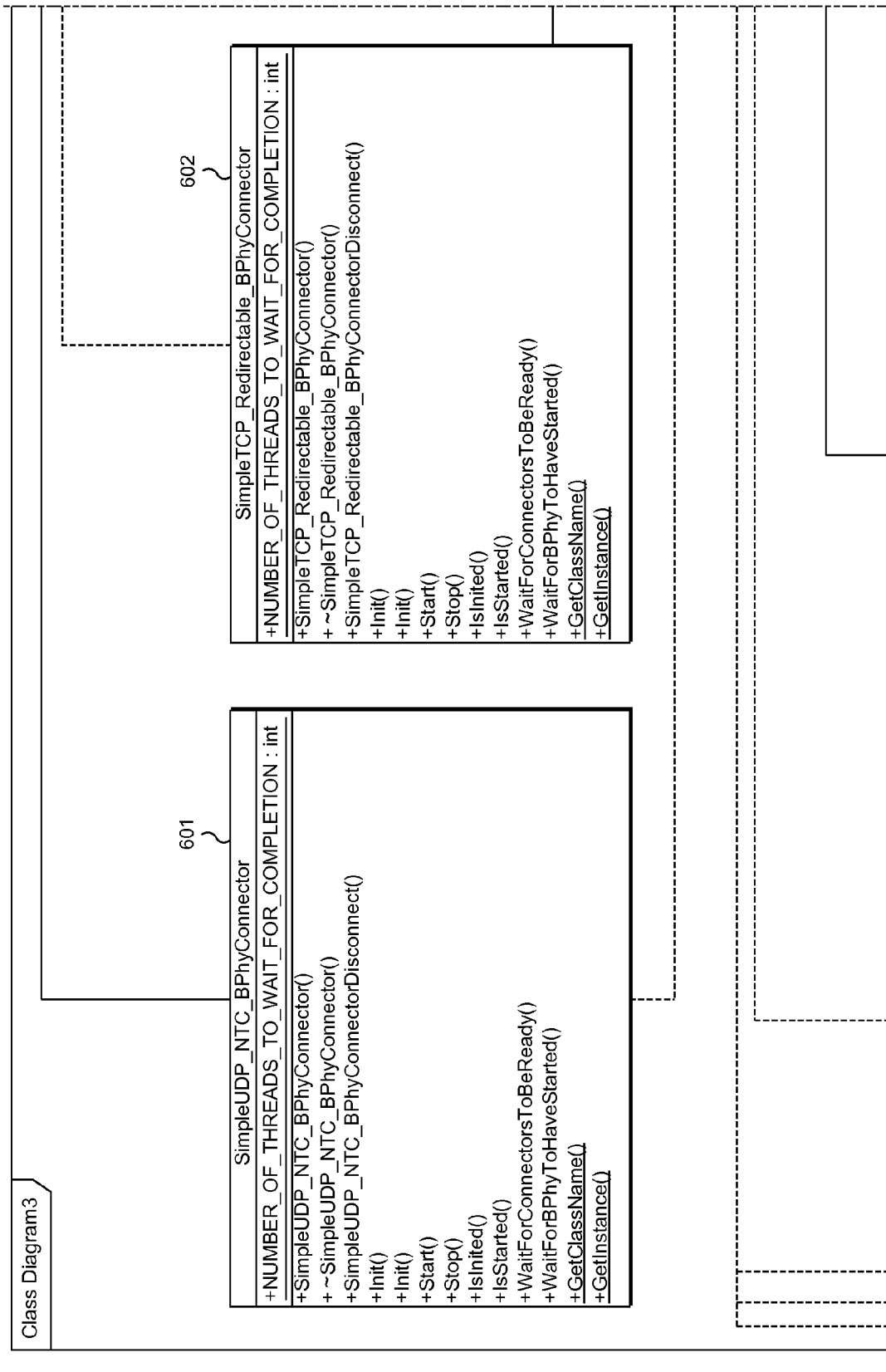

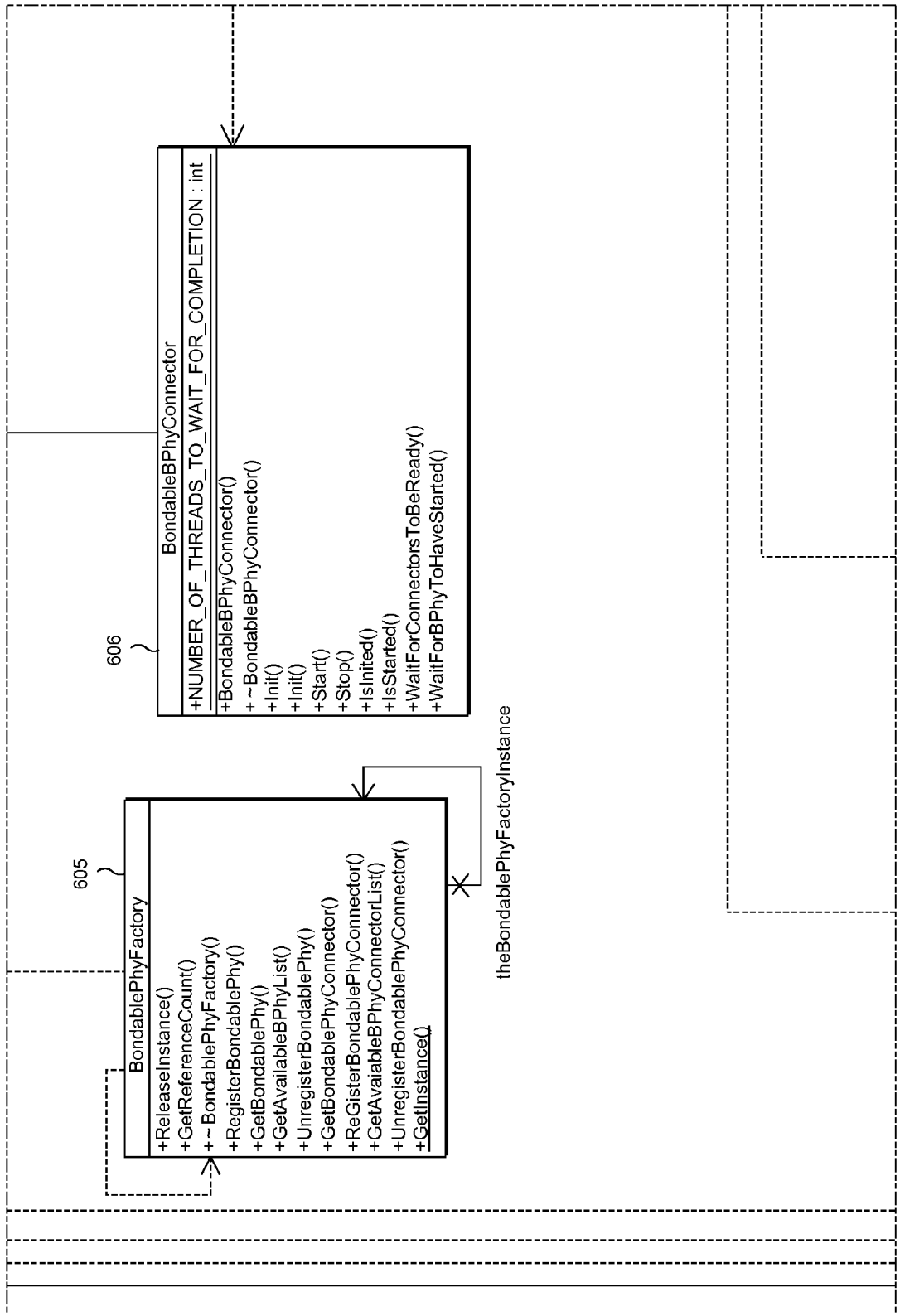

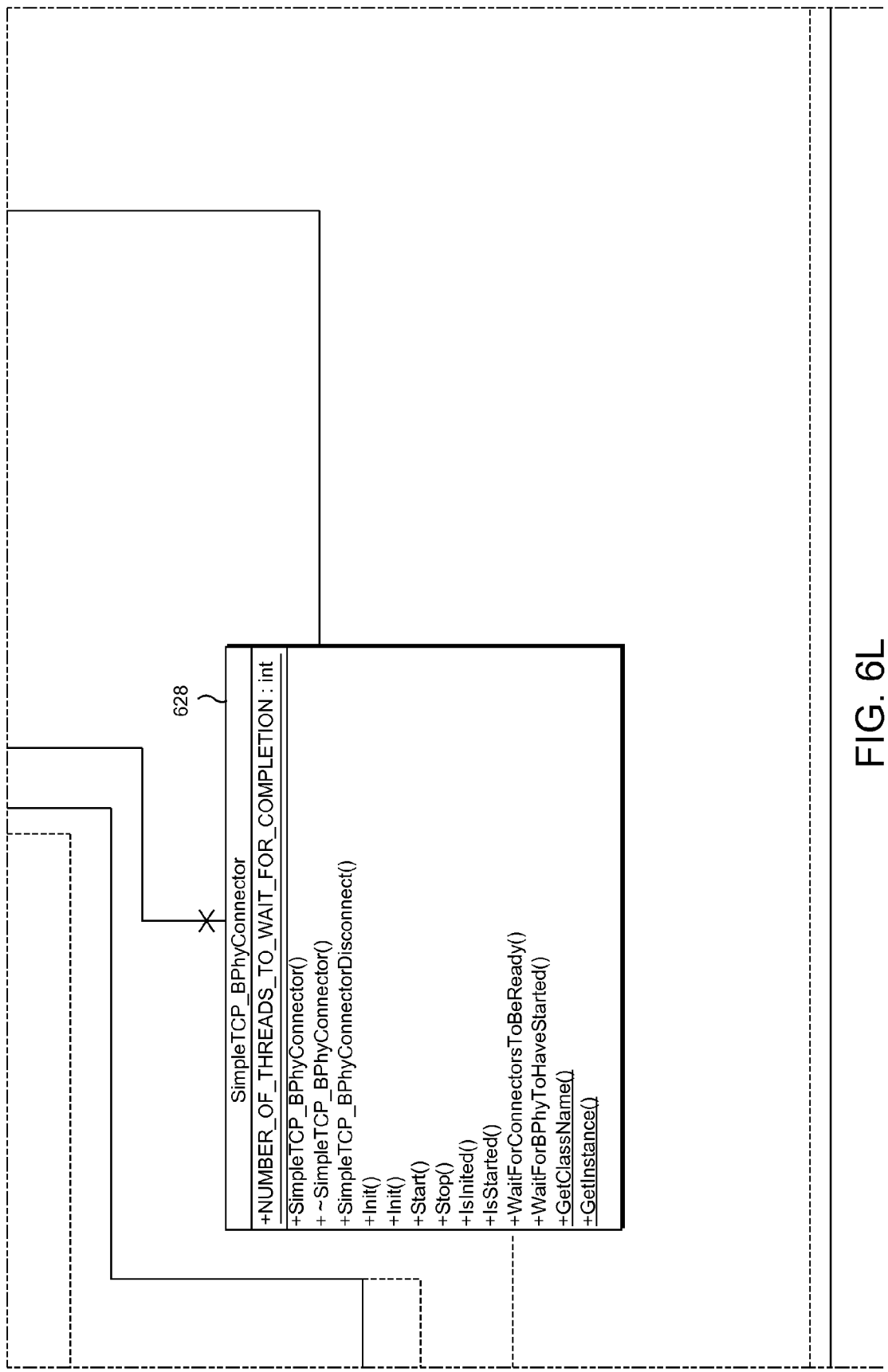

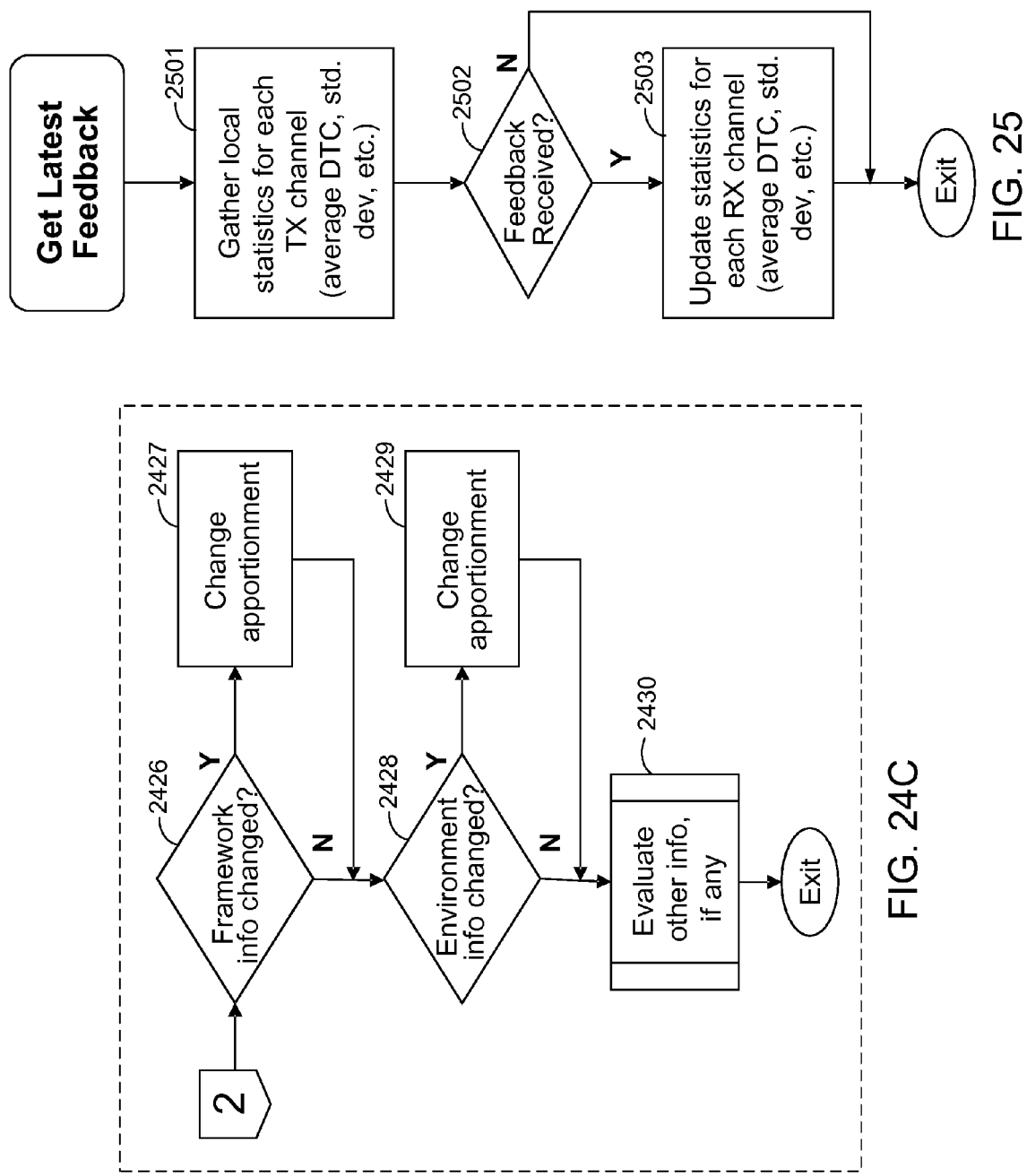

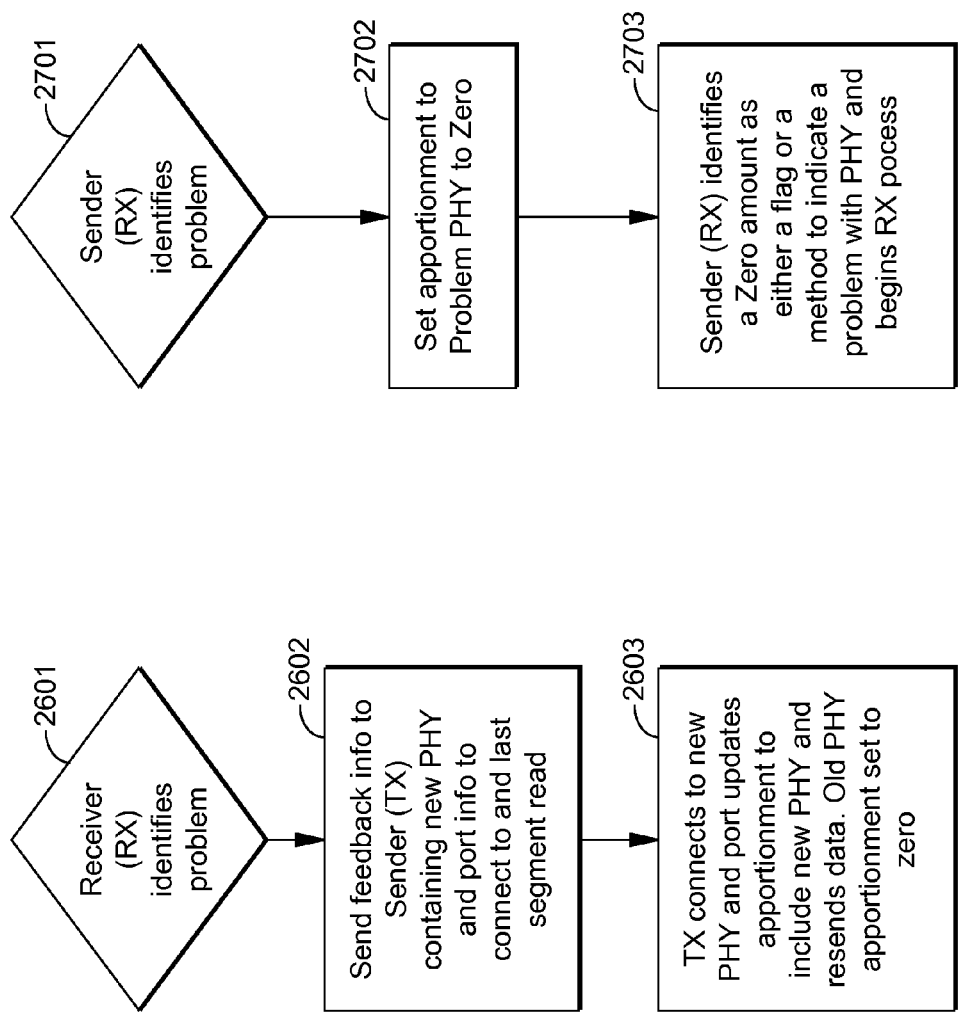

PROVIDING FEEDBACK INFORMATION WHEN NETWORK STREAMING OVER MULTIPLE PHYSICAL INTERFACES

BACKGROUND

1. Field

The present disclosure generally relates to network streaming, and more specifically relates to providing feedback information when network streaming from a sending endpoint to a receiving endpoint.

2. Description of the Related Art

In the field of data streaming over a network, there is a problem in that data streaming from a sending endpoint to a recipient endpoint may be detrimentally affected by a variety of effects such as limited network bandwidth, collisions in data transmission, and latency, which in turn affect the delivery quality of the streamed data. In the future, network bandwidth will invariably increase, which might suggest that this problem will become less significant in the future. In fact, however, recent history has shown that the quantity of data information that needs to be sent over networks grows much faster than the then-current delivery infrastructure, such that it is expected that the problem will persist. As the quantity of data information continues to increase (e.g., High Definition video streaming), an already overburdened system may provide less than adequate data delivery and/or playback quality, or may fail outright.

SUMMARY

The inventors herein have proposed arrangements that address this problem in a situation where the architecture of the network is such that the sender and the recipient both have multiple physical connections to the network, and/or in situations where there are multiple networks that connect the sender and recipient, and both the sender and recipient each have one or more physical connections to each network. For example, the sender and recipient might be connected over four separate networks including, such as, an Ethernet network, a MoCA (Multimedia over Coax Alliance) network, an Ethernet over powerline network, a HomePNA (Home Phoneline Networking Alliance) network, and/or a wireless network. For each network, both sender and recipient each have one or more physical connections to each network, such as twisted pair cable connecting to the Ethernet network, coaxial cable connecting to the MoCA network, power lines/wires connecting to the Ethernet over powerline network, and one or more radio antennas connecting to the wireless network.

With such an architecture, the single data stream is split into sub-streams and sent over multiple physical interfaces which connect the endpoints of the network, instead of streaming data over only one of the possible physical interfaces. This arrangement is more flexible and resilient to network load or impairments because multiple physical interfaces are used simultaneously. Within this architecture, providing feedback information to the endpoints of the network provides further improvements relative to flexibility and resilience to network loads or impairments.

However, providing feedback information to the endpoints of the network raises a new set of problems. One of such problems is that providing feedback information from a receiving endpoint to a sending endpoint may further congest the multiple physical interfaces. Further congesting the multiple physical interfaces may create more network load and possible impairments. Another of such problems is that feedback information which is sent from the receiving endpoint to the sending endpoint might not be received by the sending endpoint, or might be received with some latency, due to the failing or degrading of a physical interface. As an example, a physical interface may become disconnected from the associated endpoint, or the physical interface may already be carrying a large amount of data, so that the feedback information is not received at all, or is not received in a timely manner.

In the present disclosure, the foregoing problems are addressed by providing feedback information for a data stream being sent from a sending endpoint to a receiving endpoint, wherein both of the sending endpoint and the receiving endpoint each have multiple physical interfaces connecting the sending endpoint and the receiving endpoint to multiple networks, respectively. In particular, feedback information which includes at least a data capacity throughput for each of the multiple physical interfaces is provided to the sending endpoint by splitting the feedback information and sending the split feedback information over one or more of the multiple physical interfaces from the receiving endpoint to the sending endpoint. If one or more of the physical interfaces used for sending the split feedback information are detected, based on the feedback information, as degraded or failed, then the feedback information is reapportioned and sent on one or more of the multiple physical interfaces which have not been detected as degraded or failed.

Thus, in an example embodiment described herein, information is gathered as feedback information which includes at least a data capacity throughput for each of the multiple physical interfaces connected to the sending endpoint and each of the multiple physical interfaces connected to the receiving endpoint. Feedback information gathered at the receiving endpoint is then split and sent on one or more of the multiple physical interfaces from the receiving endpoint to the sending endpoint. A detection is then made, based on the feedback information, of one or more of the physical interfaces used for sending the split feedback information that have degraded or failed. Then, the feedback information is reapportioned and sent from the receiving endpoint to the sending endpoint on one or more of the multiple physical interfaces which have not been detected as degraded or failed.

By virtue of the foregoing arrangement, it is ordinarily possible to provide feedback information for data being sent from a sending endpoint to a receiving endpoint in a consistent and efficient manner. More precisely, because a detection is made, based on the feedback information, of one or more of the physical interfaces used for sending the feedback information that have degraded or failed, physical interfaces which are more reliable and efficient than the degraded or failed physical interfaces may be used to send the feedback information from the receiving endpoint to the sending endpoint. Another advantageous effect resulting from the foregoing arrangement is that the feedback information may be provided so as to substantially minimize possible detrimental effects to the efficiency and quality of the streaming data, which may be caused by sending the split feedback information from the receiving endpoint to the sending endpoint. More particularly, since the feedback information is reapportioned and sent from the receiving endpoint to the sending endpoint on one or more of the multiple physical interfaces which have not been detected as degraded or failed, any further degradation which may be caused by sending the split feedback information from the receiving endpoint to the sending endpoint may be substantially reduced.

In an example embodiment also described herein, the split feedback information is sent over one of the multiple physical interfaces, and when the feedback information is reapportioned, the feedback information is apportioned from the one physical interface to a different one of the multiple physical interfaces. In some cases, the different one of the multiple physical interfaces, to which the feedback information is apportioned, is a physical interface which is already being used to send data from the sending endpoint to the receiving endpoint. In other cases, the different one of the multiple physical interfaces, to which the feedback information is apportioned, is a physical interface which is not already being used to send data from the sending endpoint to the receiving endpoint. In addition, if the physical interface that is being used to send the split feedback information is detected as degraded, then a portion of the feedback information may be sent over the degraded physical interface. In this situation, a remaining portion of the feedback information is apportioned from the degraded physical interface to a different one of the multiple physical interfaces. For example, 10% of the feedback information may be sent over the degraded physical interface, and the remaining 90% of the feedback information would be apportioned from the degraded physical interface to a different one of the multiple physical interfaces.

In another example embodiment described herein, the split feedback information is sent over one of the multiple physical interfaces, and when the feedback information is reapportioned, the feedback information is split and apportioned over different ones of the multiple physical interfaces. In some cases, the different ones of the multiple physical interfaces, to which the feedback information is apportioned, include physical interfaces which are already being used to send data from the sending endpoint to the receiving endpoint. In other cases, the different ones of the multiple physical interfaces to which the feedback information is apportioned, include one or more physical interfaces which are not already being used to send data from the sending endpoint to the receiving endpoint. Further, if the physical interface that is being used to send the split feedback information is detected as degraded, a portion of the feedback information may be sent over the degraded physical interface. In this situation, a remaining portion of the feedback information is split and apportioned over different ones of the multiple physical interfaces. For example, 10% of the feedback information may be sent over the degraded physical interface, and the remaining 90% of the feedback information would be apportioned over different ones of the multiple physical interfaces. In this example, three different ones of the multiple physical interfaces may be selected to send the 90% of the feedback information. As such, the remaining 90% of the feedback information would be divided among the three physical interfaces in accordance with the feedback information.

In yet another example embodiment described herein, the split feedback information is sent over more than one of the multiple physical interfaces, and when the feedback information is reapportioned, the feedback information is split and apportioned over different ones of the multiple physical interfaces. In some situations, the different ones of the multiple physical interfaces, to which the feedback information is apportioned, include physical interfaces which are already being used to send data from the sending endpoint to the receiving endpoint. In other situations, the different ones of the multiple physical interfaces include one or more physical interfaces which are not already being used to send data from the sending endpoint to the receiving endpoint. In addition, if one or more of the physical interfaces on which the split feedback information is sent are detected as having degraded, a portion of the feedback information is sent over one or more of the degraded physical interfaces. In this case, a remaining portion of the feedback information is split and apportioned over different ones of the multiple physical interfaces.

In an additional example embodiment described herein, the one or more physical interfaces used to send the reapportioned feedback information are physical interfaces having a data capacity throughput which is a median data capacity throughput among the data capacity throughputs for each of the multiple physical interfaces. In addition, the one or more physical interfaces are detected as having degraded when a current data capacity throughput for the physical interface is less than an average data capacity throughput for the physical interface, calculated from a time when the data is first sent to a time when the current data capacity throughput is measured. Alternatively, the one or more physical interfaces may be detected as having degraded when a current data capacity throughput for the physical interface is less than a known data capacity throughput of a least participating physical interface.

According to another example embodiment described herein, the information gathered as feedback information further comprises at least one of network statistics, process information, framework information, and information regarding an external environment of the receiving endpoint. In one aspect of this example embodiment, a weighted value is assigned for each type of feedback information in accordance with a desired output for the physical interfaces which are used to send the split feedback information from the receiving endpoint to the sending endpoint. In a case that one or more of the physical interfaces used for sending the split feedback information are detected as failed, the one or more physical interfaces used to send the reapportioned feedback information are selected based on an output value determined using the weighted values assigned to the types of feedback information. Further, the weighted value assigned for each type of feedback information may be continuously adjusted until the output value is equal to or greater than a predetermined percentage of an expected result.

This brief summary has been provided so that the nature of the disclosure may be understood quickly. A more complete understanding can be obtained by reference to the following detailed description and to the attached drawings.

BRIEF DESCRIPTION OF DRAWINGS

FIG. 22 is a flow chart for providing a detailed explanation of sending data from the sending endpoint to the receiving endpoint in an example embodiment.

FIG. 23 is a flow chart for providing a detailed explanation of block 2202 of FIG. 22.

FIG. 24A to 24C are flow charts for providing a detailed explanation of block 2303 of FIG. 23.

FIG. 25 is a flow chart for providing a detailed explanation of obtaining at the sending endpoint the latest feedback information in an example embodiment.

FIGS. 26 and 27 are flow charts for providing a detailed explanation of adding a new physical interface to a bondable virtual interface.

DETAILED DESCRIPTION

Figure 1:
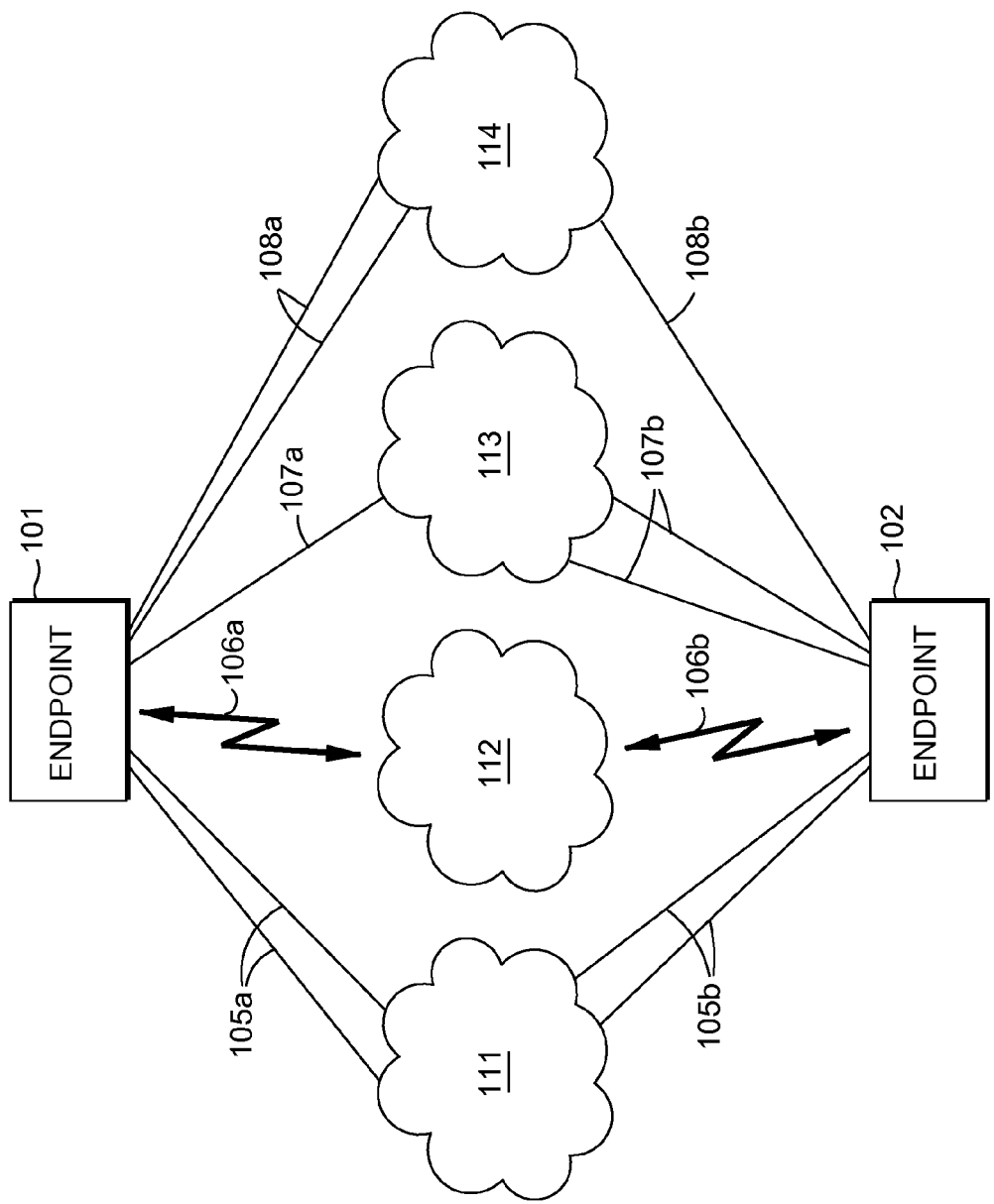
FIG. 1 is a representative view of a sending endpoint and a receiving endpoint, connected via networks, on which an architecture of an example embodiment may be implemented.

FIG. 1 is a representative view of a sending endpoint and a receiving endpoint, connected via multiple networks, on which an architecture of an example embodiment may be implemented. As shown in FIG. 1, sending endpoint 101 is connected to receiving endpoint 102 through networks 111, 112, 113 and 114. The networks may include similar or dissimilar networks, mixed in any combination, as described below. Sending endpoint 101 includes multiple physical interfaces, including at least one or more physical interface for each different network. As shown in the example of FIG. 1, sending endpoint 101 includes physical interfaces 105a, 106a, 107a and 108a. More specifically, sending endpoint 101 has physical interfaces 105a which connect sending endpoint 101 to network 111. In FIG. 1, sending endpoint 101 is shown to have two physical interfaces 105a connecting to network 111; however, in other embodiments, sending endpoint 101 may have a single physical interface connecting to network 111, or may have more than two physical interfaces connecting to network 111.

Receiving endpoint 102 also has multiple physical interfaces 105b connecting to network 111. Similar to sending endpoint 101, receiving endpoint 102 may also have a single or multiple physical interfaces connecting to network 111. As a result of the physical interface connections, sending endpoint 101 is connected to receiving endpoint 102 through network 111, using physical interfaces 105b.

Similar to the above-described connection between sending endpoint 101 and receiving endpoint 102, sending endpoint 101 and receiving endpoint 102 are connected through networks 112, 113 and 114 via physical interfaces 106a and 106b, 107a and 107b and 108a and 108b. Accordingly, sending endpoint 101 is connected to network 112 through one or more physical interfaces 106a; and, receiving endpoint 102 is connected to network 112 through one or more physical interfaces 106b. Sending endpoint 101 is connected to network 113 through one or more physical interfaces 107a; and, receiving endpoint 102 is connected to network 113 through one or more physical interfaces 107b. Lastly, sending endpoint 101 is connected to network 114 through one or more physical interfaces 108a; and, receiving endpoint 102 is connected to network 114 through one or more physical interfaces 108b. In FIG. 1, sending endpoint 101 and receiving endpoint 102 are shown to be connected through four networks; however, sending endpoint 101 and receiving endpoint 102 may be connected through more or less networks. In this regard, the number of networks is established by a user's demands, or is established by an already existing infrastructure connecting the two endpoints.

Networks 111, 112, 113 and 114 can be many different types of networks, such as, for example, an Ethernet network, a Multimedia over Coax Alliance (MoCA) network, a Home-PNA (Home Phoneline Networking Alliance) network, an Ethernet over powerline network (HomePlug), a wireless network, or any other type of network. In addition, the networks connecting the two endpoints can all be a different type of network (e.g., network 111 can be an Ethernet network, while network 112 is a wireless network, network 113 is an Ethernet over powerline network, and network 114 is a MoCA network). On the other hand, the networks connecting the two endpoints can include any variety of combinations of different networks (e.g., network 111 can be a MoCA network, while network 112 is a wireless network, and networks 113 and 114 are Ethernet networks). The type of physical interfaces connecting the endpoints to the networks depends upon the type of network. For example, an endpoint may be connected to an Ethernet network through twisted pair cable, an endpoint may be connected to a MoCA network through coaxial cable, an endpoint may be connected to an Ethernet over powerline network over power lines/wires, and an endpoint may be connected to a wireless network over one or more radio antennas.

The sending endpoint 101 serves as an application sender, which may include, for example, a media server, a conference server, or a storage sender application. A media server is an endpoint that will transfer audio and video data (or other types of large data) to a client. Although the media server is specific to transferring video streams, other types of media servers can be substituted (e.g., an audio-only stream or a large archival stream). The media server may also be a modified third party application accessing the sending endpoint 101. A conference server is an endpoint that sends data (via Unicast or Multicast) to conference players, and is used in providing interactive conference content to participants. A storage sender application is an endpoint that sends data from a device to a receiver, and is used in transferring data between two endpoints (e.g., File Transfer Protocol (FTP)). The storage sender application is primarily used in a PC collaboration as a means to send device data to be stored at an external storage medium.

The receiving endpoint 102 serves as an application receiver, which may include, for example, a media client or media player, a conference player, or a storage receiver application. A media client or media player is an endpoint that receives data from a media server, and is used primarily for video and audio stream playing. A conference player is an endpoint that receives data from the conference server, and is used in playing and interacting within a conference. A storage receiver application is an endpoint that receives data from a storage sender application, and is used in transferring data between two endpoints (e.g., FTP). The storage application receiver is primarily used in a PC collaboration as a means to receive device data to be stored at an external storage medium.

In some instances, a sending endpoint may also simultaneously act as a receiving endpoint. For example, when a sending endpoint serves as a video conferencing application, video would stream from the sending endpoint to the receiving endpoint, and video would stream simultaneously from the receiving endpoint to the sending endpoint. In this example, the sending endpoint would also be acting as a receiving endpoint, and the receiving endpoint would also be acting as a sending endpoint. In other instances, a sending endpoint may become a receiving endpoint after some period of time. For example, a sending endpoint and a receiving endpoint might transfer data back and forth to each other in a ping-pong fashion, rather than simultaneously. In other words, the sending endpoint might complete a transfer of data to the receiving endpoint, and then a second transfer may begin in the opposite direction from the receiving endpoint to the sending endpoint.

In this example embodiment, each of the physical interfaces 105a and 105b to 108a and 108b described above use one or more ports. For example, one of the physical interfaces may use two ports, namely, a first port for sound and a second port for video.

Figure 2:
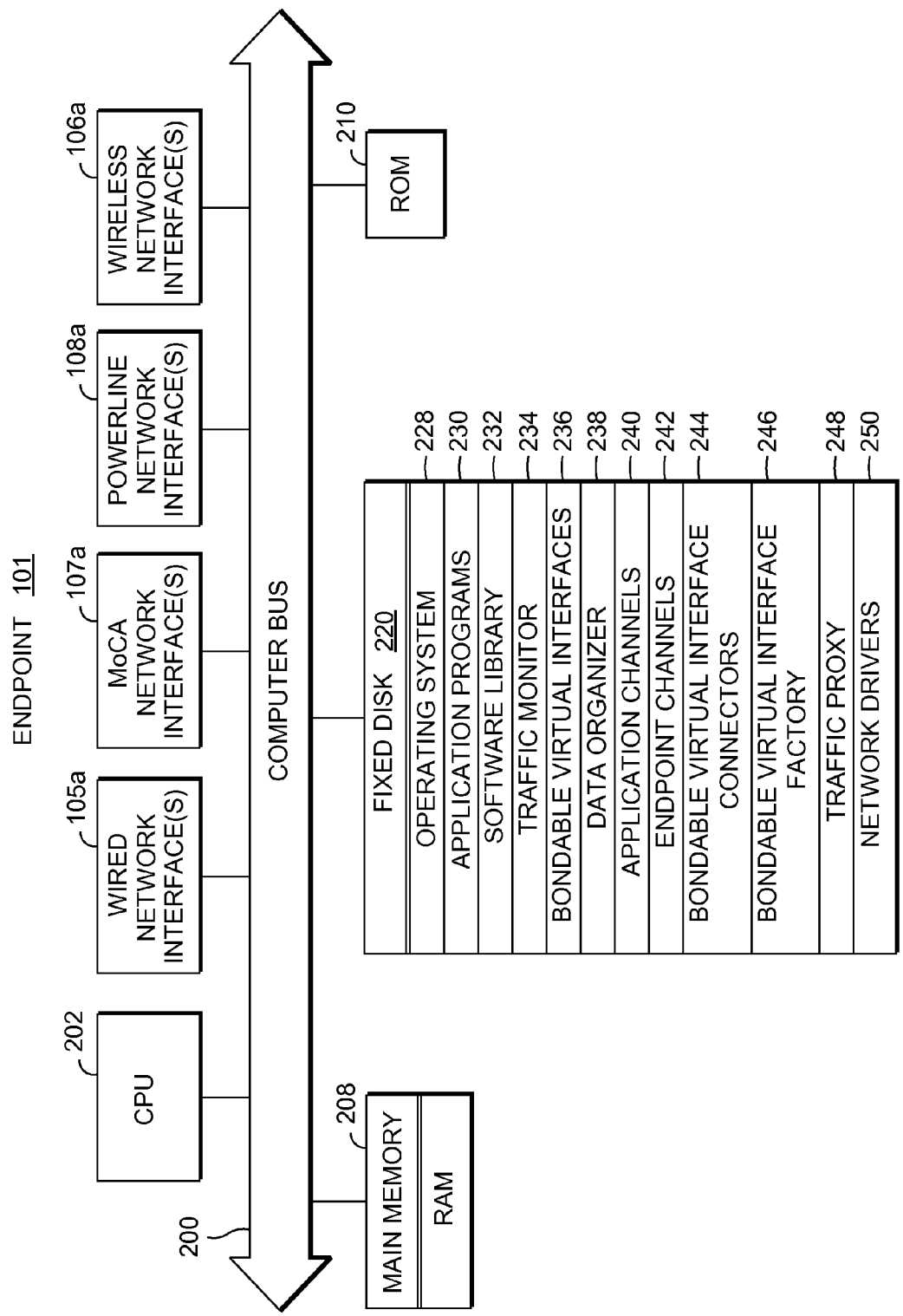
FIG. 2 is a detailed block diagram for explaining the internal architecture of the sending endpoint of FIG. 1.

FIG. 2 is a detailed block diagram for explaining the internal architecture of the sending endpoint 101 of FIG. 1. As shown in FIG. 2, sending endpoint 101 includes central processing unit (CPU) 202 which interfaces with computer bus 200. Also interfacing with computer bus 200 are hard (or fixed) disk 220, wired network interface(s) 105a, wireless network interface(s) 106a, MoCA network interface(s) 107a, powerline network interface(s) 108a, random access memory (RAM) 208 for use as a main run-time transient memory, and read only memory (ROM) 210.

RAM 208 interfaces with computer bus 200 so as to provide information stored in RAM 208 to CPU 202 during execution of the instructions in software programs such as an operating system, application programs, and interface drivers. More specifically, CPU 202 first loads computer-executable process steps from fixed disk 220, or another storage device into a region of RAM 208. CPU 202 can then execute the stored process steps from RAM 208 in order to execute the loaded computer-executable process steps. In addition, data such as gathered network performance statistics or other information can be stored in RAM 208, so that the data can be accessed by CPU 202 during the execution of computer-executable software programs, to the extent that such software programs have a need to access and/or modify the data.

As also shown in FIG. 2, hard disk 220 contains operating system 228, application programs 230 such as programs for starting up and shutting down the sending endpoint 101 or other programs. Hard disk 220 further contains software library 232 for controlling the sending of data from sending endpoint 101. Hard disk 220 also contains traffic monitor 234 for gathering performance statistics for each of the multiple physical interfaces 105a, 106a, 107a and 108a. In addition, hard disk 220 contains bondable virtual interfaces 236, data organizer 238, application channels 240, endpoint channels 242, bondable virtual interface connectors 244, bondable virtual interface factory 246, and traffic proxy 248, each of which is instantiated by the software library 232 and will be described in more detail below with reference to FIGS. 4 and 5. Traffic proxy 248 may be used as a communication interface between the software library 232 and the traffic monitor 234. Lastly, hard disk 220 contains network drivers 250 for software interface to networks such as networks 111, 112, 113 and 114.

In an example embodiment, software library 232 and traffic monitor 234 are loaded by CPU 202 into a region of RAM 208. CPU 202 then executes the stored software library 232 and the traffic monitor 234 from RAM 208 in order to execute the loaded computer-executable steps. In addition, application programs 230 are loaded by CPU 202 into a region of RAM 208. CPU 202 then executes the stored process steps as described in detail below in connection with FIGS. 15 and 18 to 27, in order to execute the loaded computer-executable steps.

Figure 3:
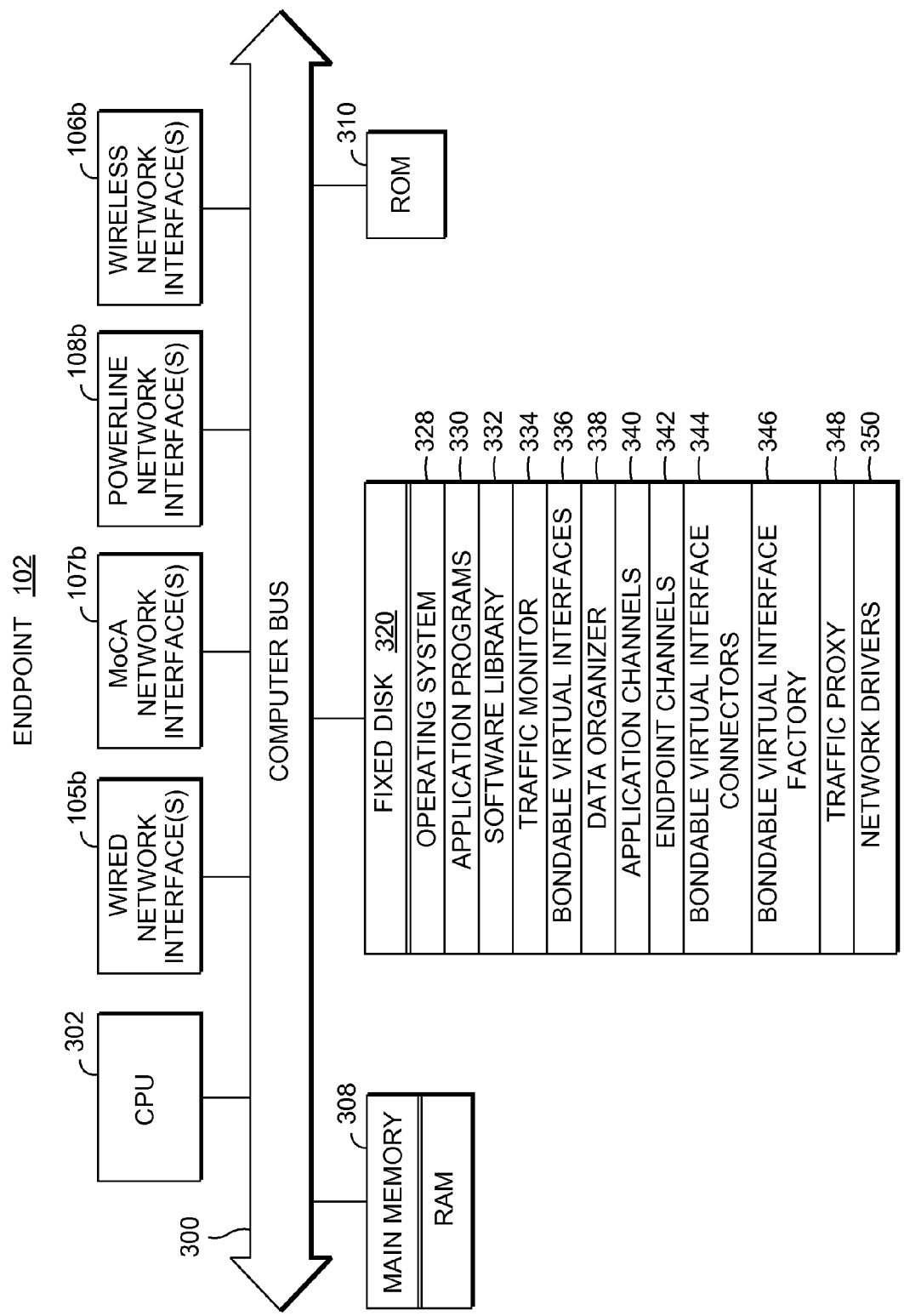
FIG. 3 is a detailed block diagram for explaining the internal architecture of the receiving endpoint of FIG. 1.

FIG. 3 is a detailed block diagram for explaining the internal architecture of the receiving endpoint 102 of FIG. 1. As shown in FIG. 3, receiving endpoint 102 includes central processing unit (CPU) 302 which interfaces with computer bus 300. Also interfacing with computer bus 300 are hard (or fixed) disk 320, wired network interface(s) 105b, wireless network interface(s) 106b, MoCA network interface(s) 107b, powerline network interface(s) 108b, random access memory (RAM) 308 for use as a main run-time transient memory, and read only memory (ROM) 310.

RAM 308 interfaces with computer bus 300 so as to provide information stored in RAM 308 to CPU 302 during execution of the instructions in software programs such as an operating system, application programs, and interface drivers. More specifically, CPU 302 first loads computer-executable process steps from fixed disk 320, or another storage device into a region of RAM 308. CPU 302 can then execute the stored process steps from RAM 308 in order to execute the loaded computer-executable process steps. In addition, data such as gathered network performance statistics or other information can be stored in RAM 308, so that the data can be accessed by CPU 302 during the execution of computer-executable software programs, to the extent that such software programs have a need to access and/or modify the data.

As also shown in FIG. 3, hard disk 320 contains operating system 328, application programs 330 such as programs for starting up and shutting down the receiving endpoint 102 or other programs. Hard disk 320 further contains software library 332 for controlling the receiving of data from receiving endpoint 102.

Software library 332 in this example is identical to software library 232 in sending endpoint 101. However, in other embodiments, the software library 332 need not be identical to library 232, so long as the two libraries implement a similar software architecture relative to the software library, the traffic monitor, the bondable virtual interfaces, and the data organizer. For example, the sending and receiving endpoints might implement different versions of the same software architecture. Or the sending and receiving endpoints might implement architecture that target different operating systems, such as Windows on the sending endpoint and Linux on the receiving endpoint. Or, the sending endpoint and the receiving endpoint might implement architecture that is OS-neutral like JAVA. Hard disk 320 also contains traffic monitor 334 for gathering performance statistics for each of the multiple physical interfaces 105b, 106b, 107b and 108b. In addition, hard disk 320 contains bondable virtual interfaces 336, data organizer 338, application channels 340, endpoint channels 342, bondable virtual interface connectors 344, bondable virtual interface factory 346, and traffic proxy 348, each of which is instantiated by the software library 332 and will be described in more detail below with reference to FIGS. 4 and 5. Traffic proxy 348 may be used as a communication interface between the software library 332 and the traffic monitor 334. Lastly, hard disk 320 contains network drivers 350 for software interface to networks such as networks 111, 112, 113 and 114.

In an example embodiment, software library 332 and traffic monitor 334 are loaded by CPU 302 into a region of RAM 308. CPU 302 then executes the stored process steps of the software library 332 and the traffic monitor 334 from RAM 308 in order to execute the loaded computer-executable steps. In addition, the process steps of the application programs 330 are loaded by CPU 302 into a region of RAM 308. CPU 302 then executes the stored process steps as described in detail below in connection with FIGS. 15 and 18 to 27, in order to execute the loaded computer-executable steps.

General Description of Architecture

Transferring data between two endpoints in an efficient manner is difficult. Efficiency can be improved in general by increasing the amount of information concerning the nature of the transfer. For example, efficiency can be improved with an understanding of how to send data between two endpoints and also an understanding of the type of data being sent. Further, by identifying multiple physical interfaces and combining them together into one physical interface (i.e., bondable virtual interface), data throughput may be improved.

In a simplistic architecture, a media receiver/player requests (via e.g., HTTP or RTSP) for a movie stream from a media server. The media server then sends data to the client with some, but probably little concern as to the means or how well the client may have received the media stream data. In contrast, within the architecture of this example embodiment, the media client provides profile information (i.e., a suggested or predetermined bondable virtual interface configuration) as to the type of the media to be streamed, and negotiates with the media server as to the physical interfaces available to exchange data. With this knowledge of media type, both the sending and receiving buffer can be modified to improve throughput. The negotiation between the media client and the media server produces a configuration and setup for multiple physical interfaces via negotiation. In a case where there are multiple logical physical interfaces, the creation of a combined (or bondable virtual interface) physical interface will occur. In this regard, a bondable virtual interface is a combination of physical interfaces that can send data via multiple physical interfaces. Further, feedback information will be sent between both endpoints to improve throughput. The media client then receives the segments on the multiple physical interfaces, recombines the segments and provides the data to the media client's player (whether included in the media client or connected to the media client). Using this architecture makes it possible to ordinarily improve throughput by: (1) Sending information back to the endpoint regarding, for example, changes to the data stream or processing of the data, which improves the efficiency of buffer management, and (2) using a bondable virtual interface which increases throughput of data by using multiple physical interfaces to send the data.

Figure 4:
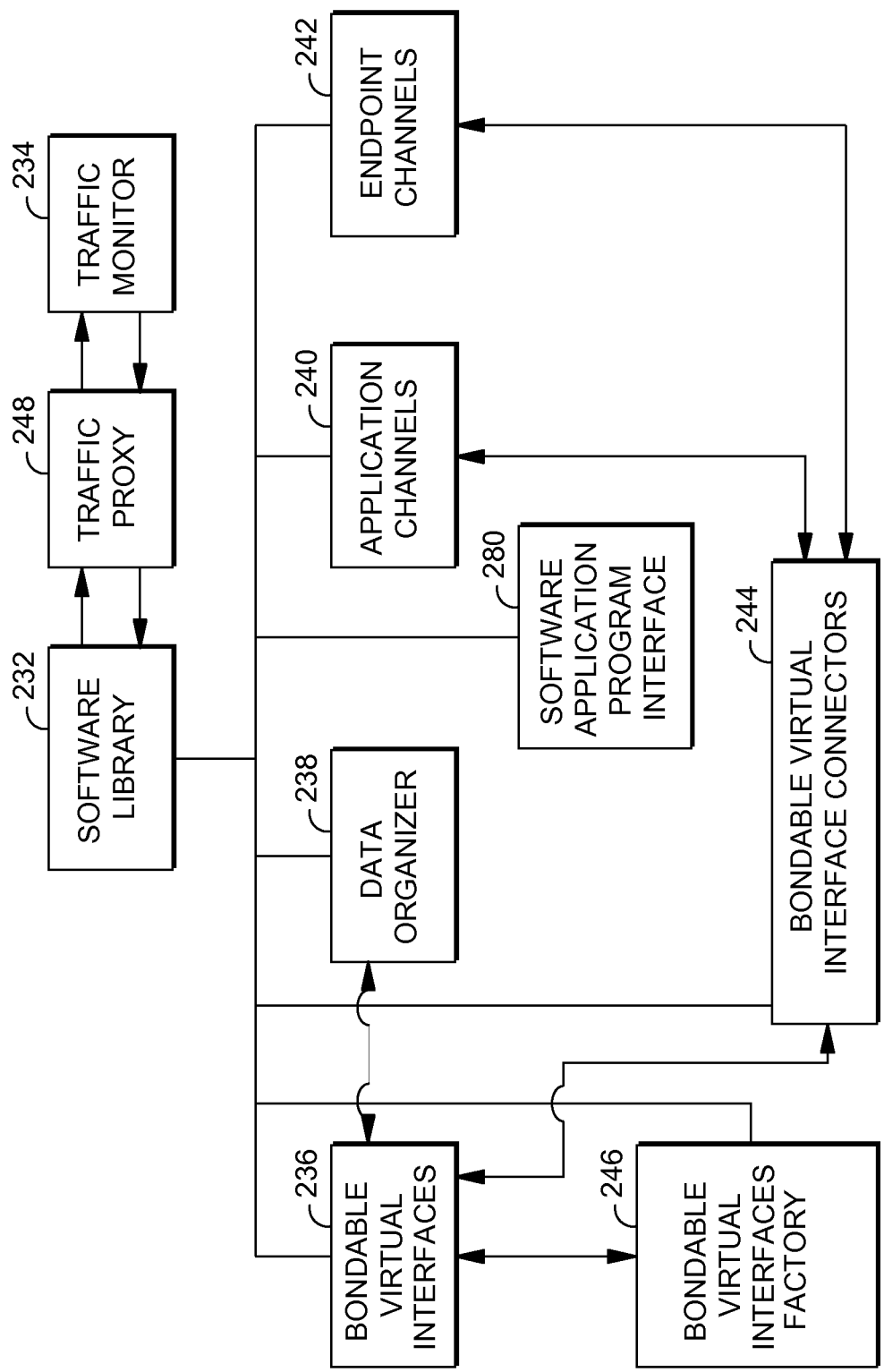
FIG. 4 is a high level view of an architecture according to an example embodiment.

FIG. 4 is a high level view of an architecture according to an example embodiment. As shown in FIG. 4, the architecture includes software library 232 and traffic monitor 234. The software library 232 is connected to and communicates with the traffic monitor 234 through traffic proxy 248. In this regard, the software library 232 instantiates and associates with the traffic monitor 234 via the traffic proxy 248. However, the traffic proxy 248 may be omitted, and the software library 232 and the traffic monitor 234 may communicate with each other directly.

As used herein, the word "instantiate" refers to the construction in memory of a software object, such as by use of an object factory. How the software object is created varies among different programming languages. In prototype-based languages, an object can be created from nothing, or an object can be based on an existing object. In class-based language, objects are derived from classes, which can be thought of as blueprints for constructing the software objects.

As further shown in FIG. 4, the software library 232 is connected to bondable virtual interfaces 236, bondable virtual interface factory 246, data organizer 238, software application program interface 280, application channels 240, and endpoint channels 242. In this regard, the software library 232 instantiates and associates with the bondable virtual interfaces 236, the bondable virtual interface factory 246, the data organizer 238, the software application program interface 280, the application channels 240, and the endpoint channels 242. In addition, the data organizer 238 instantiates a data splitter or a data combiner (both of which are described below in detail in connection with FIG. 5), depending on whether the architecture is implemented on a sending endpoint or a receiving endpoint. The foregoing mentioned components will be described, including their use and functionality, in more detail below in connection with FIG. 5.

Furthermore, the bondable virtual interface factory 246 is connected to and associates with the bondable virtual interfaces 236. The bondable virtual interfaces 236 are also connected to and associate with the data organizer 238 and the bondable virtual interface connectors 244. The bondable virtual interface connectors 244 also associate with application channels 240 and endpoint channels 242.

Figure 5:
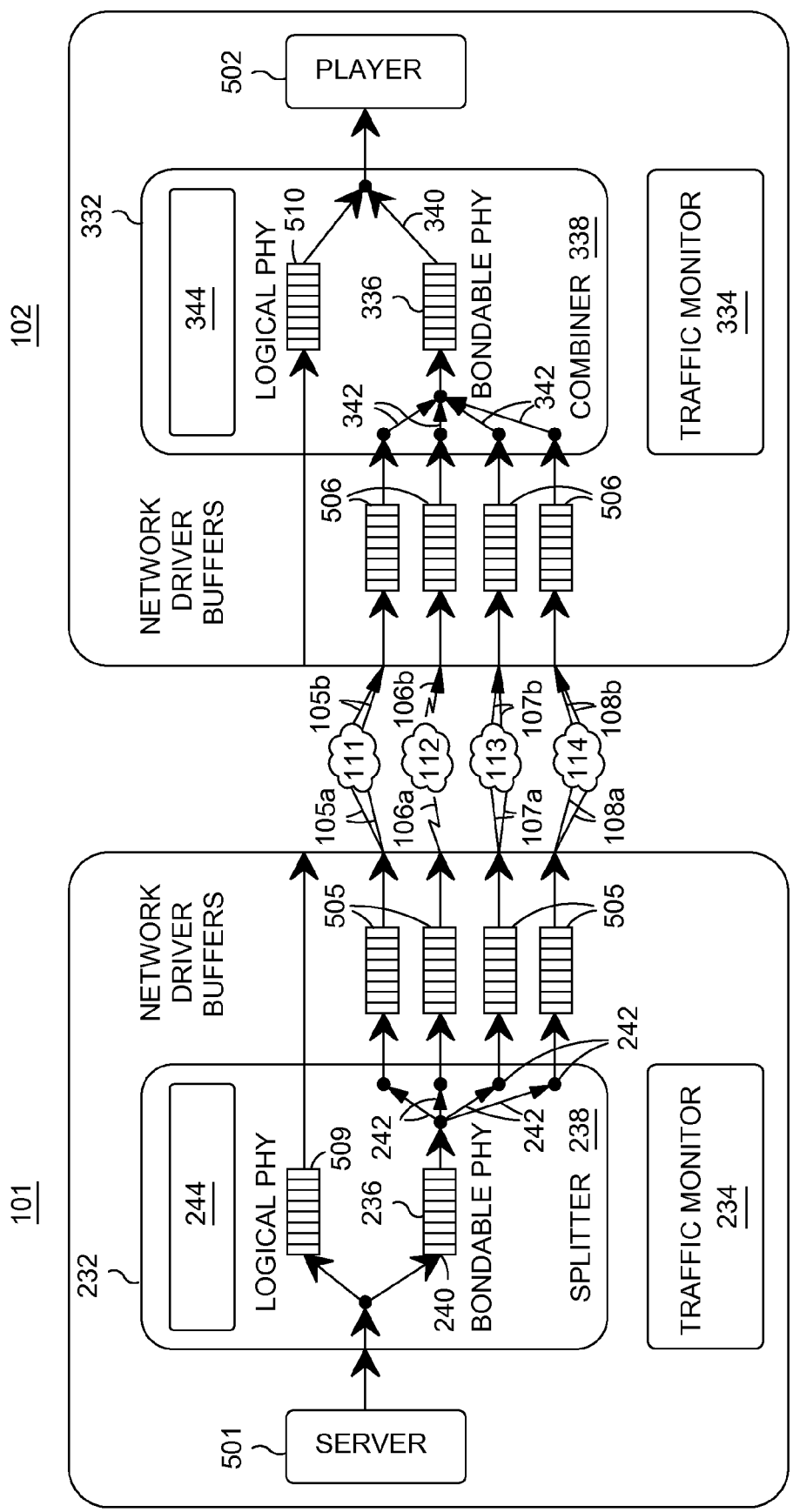
FIG. 5 is another view of a sending endpoint and a receiving endpoint, for providing a general explanation of an example embodiment.
Figure 6B:
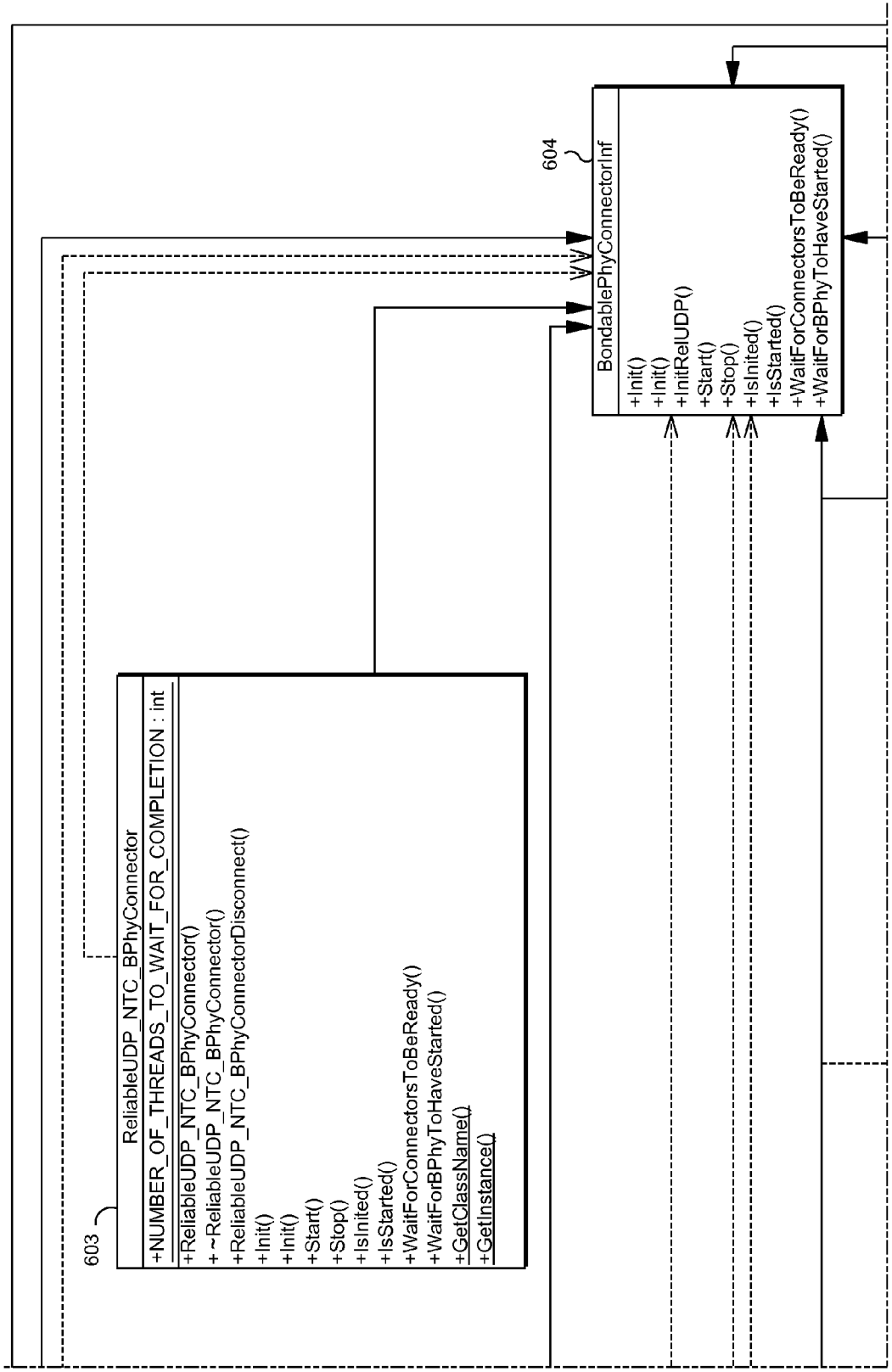
FIG. 6, including
FIGS. 6A to 6N, shows a Unified Modeling Language (UML) class diagram for an architecture of an example embodiment.
Figure 6D:
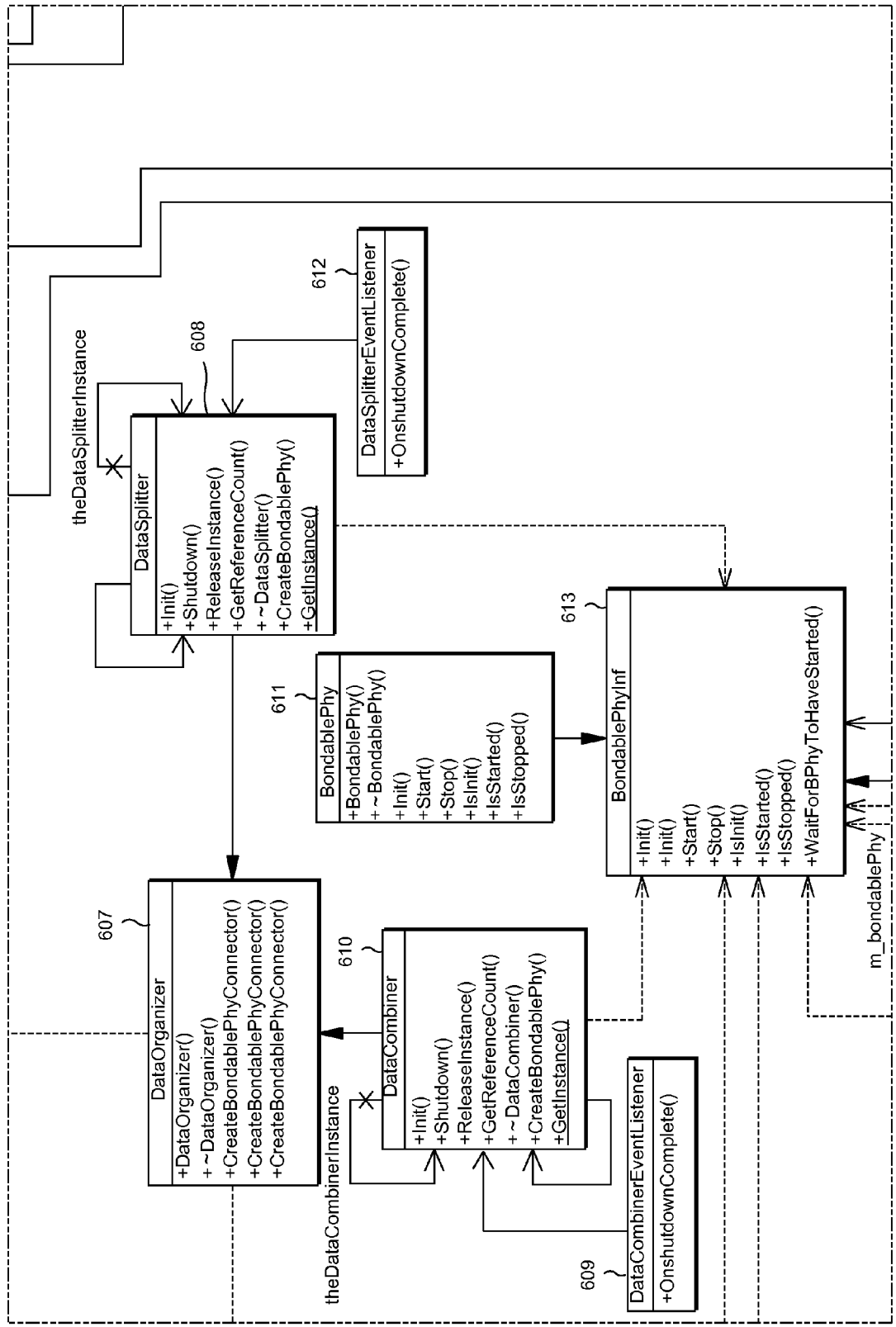
Figure 6E:
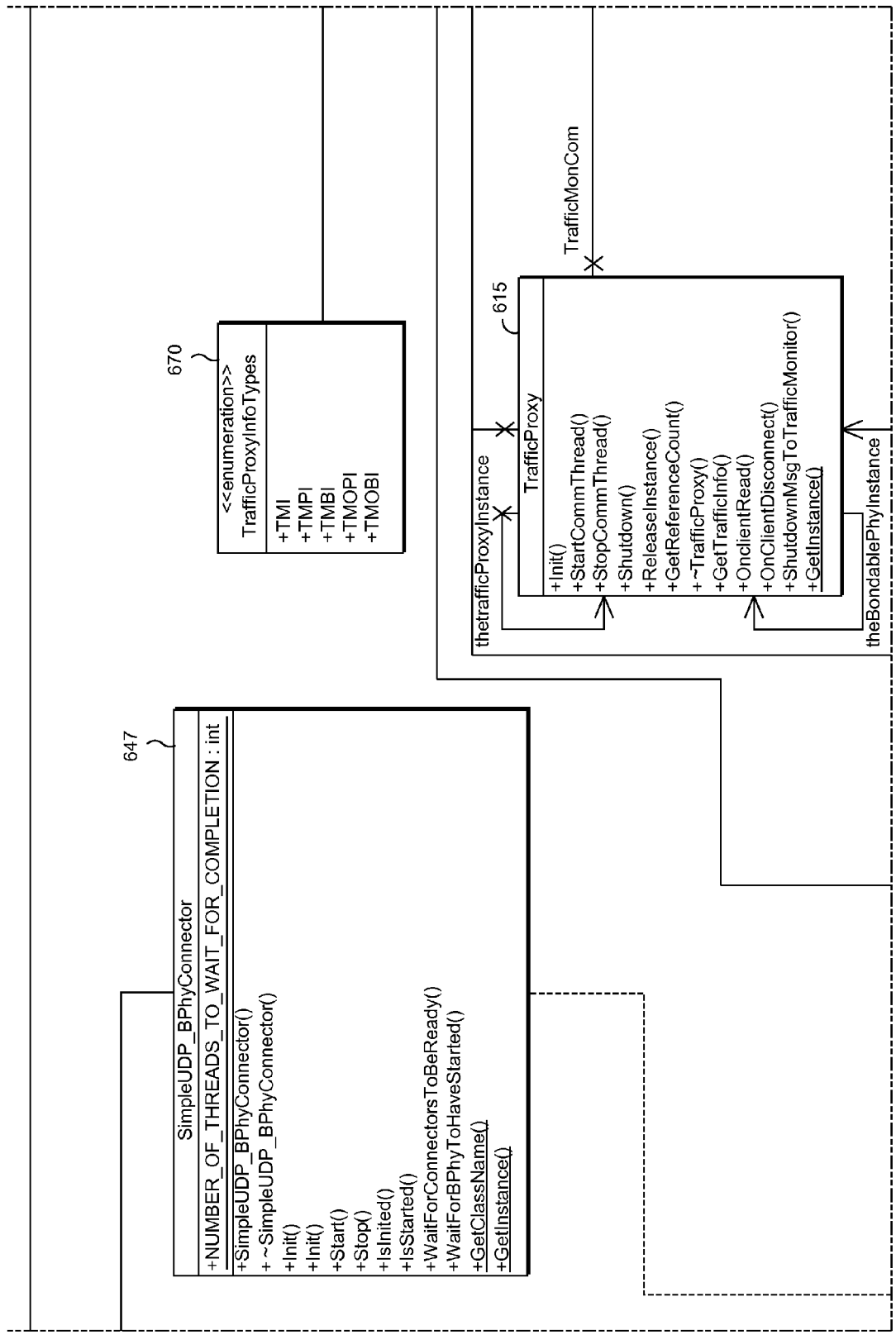
Figure 6F:
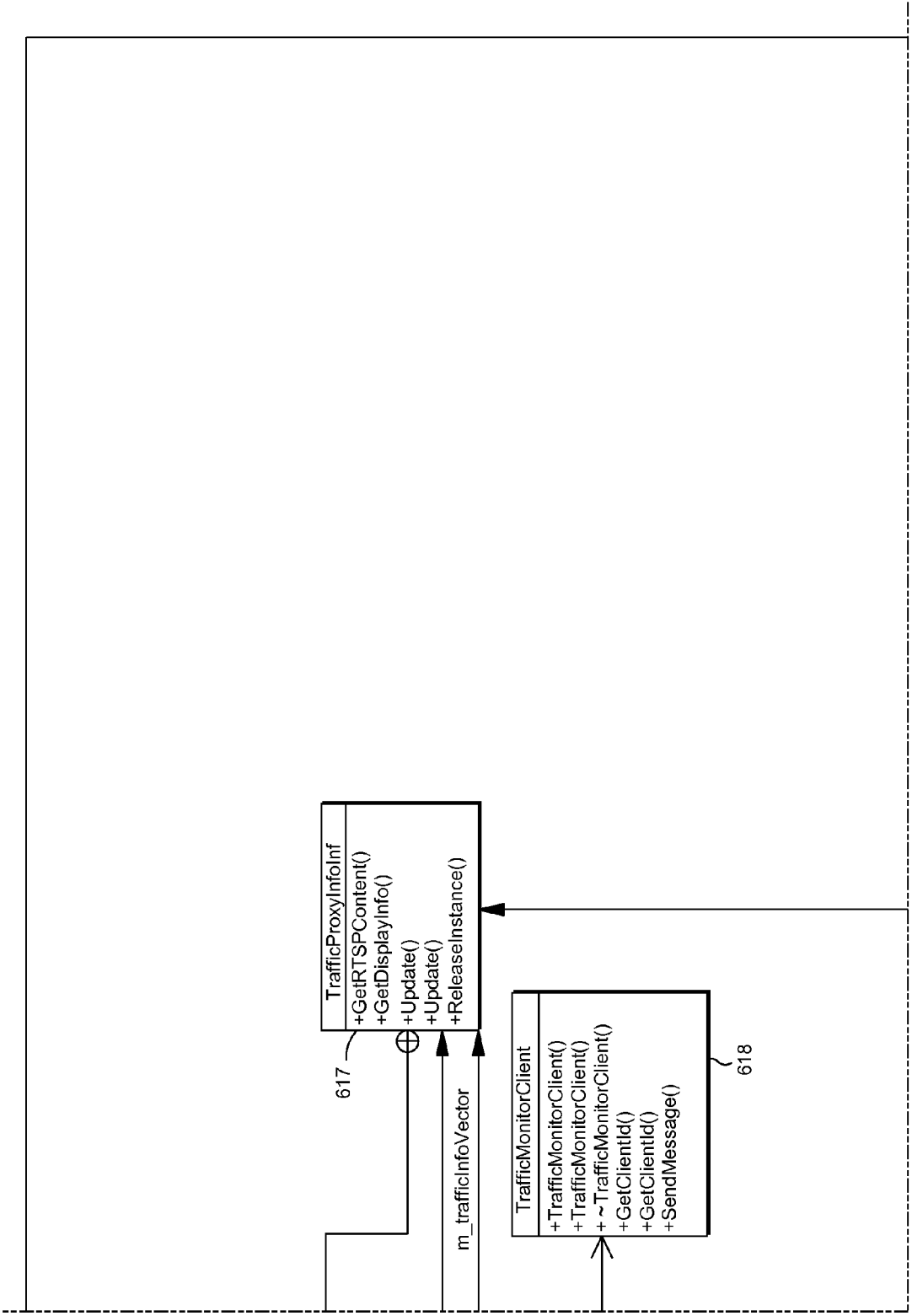
Figure 6G:
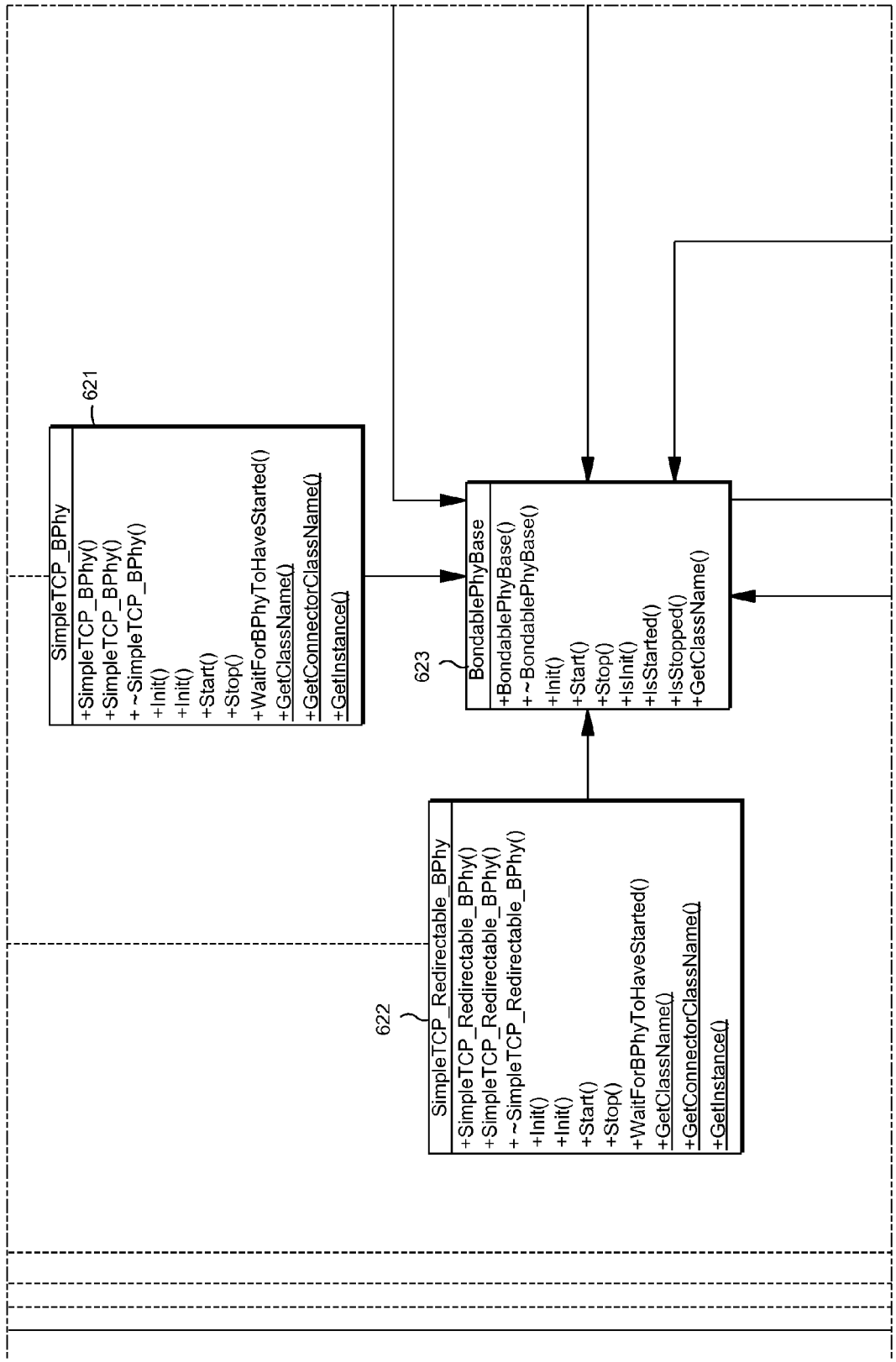
Figure 6H:
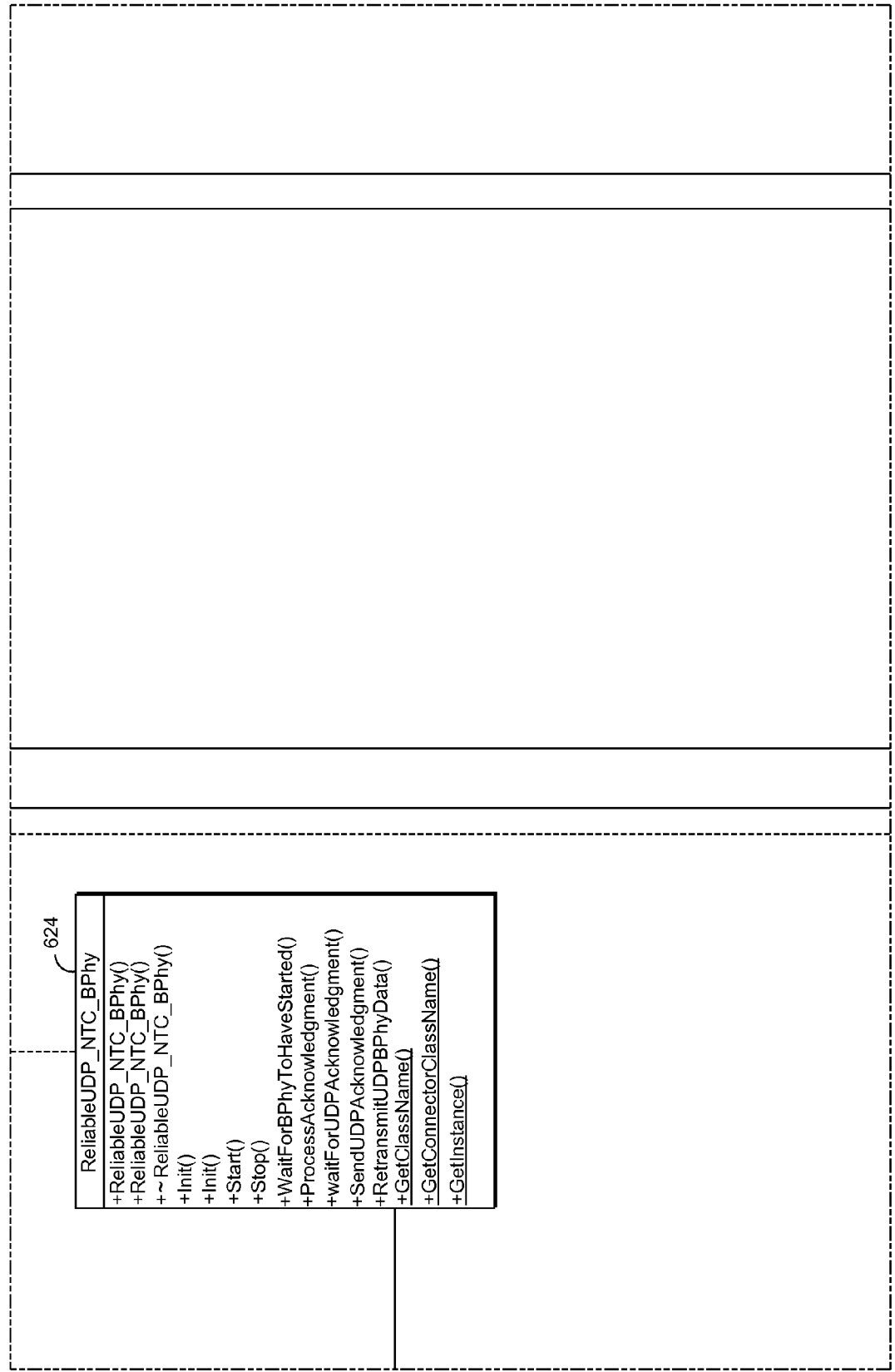
Figure 61:
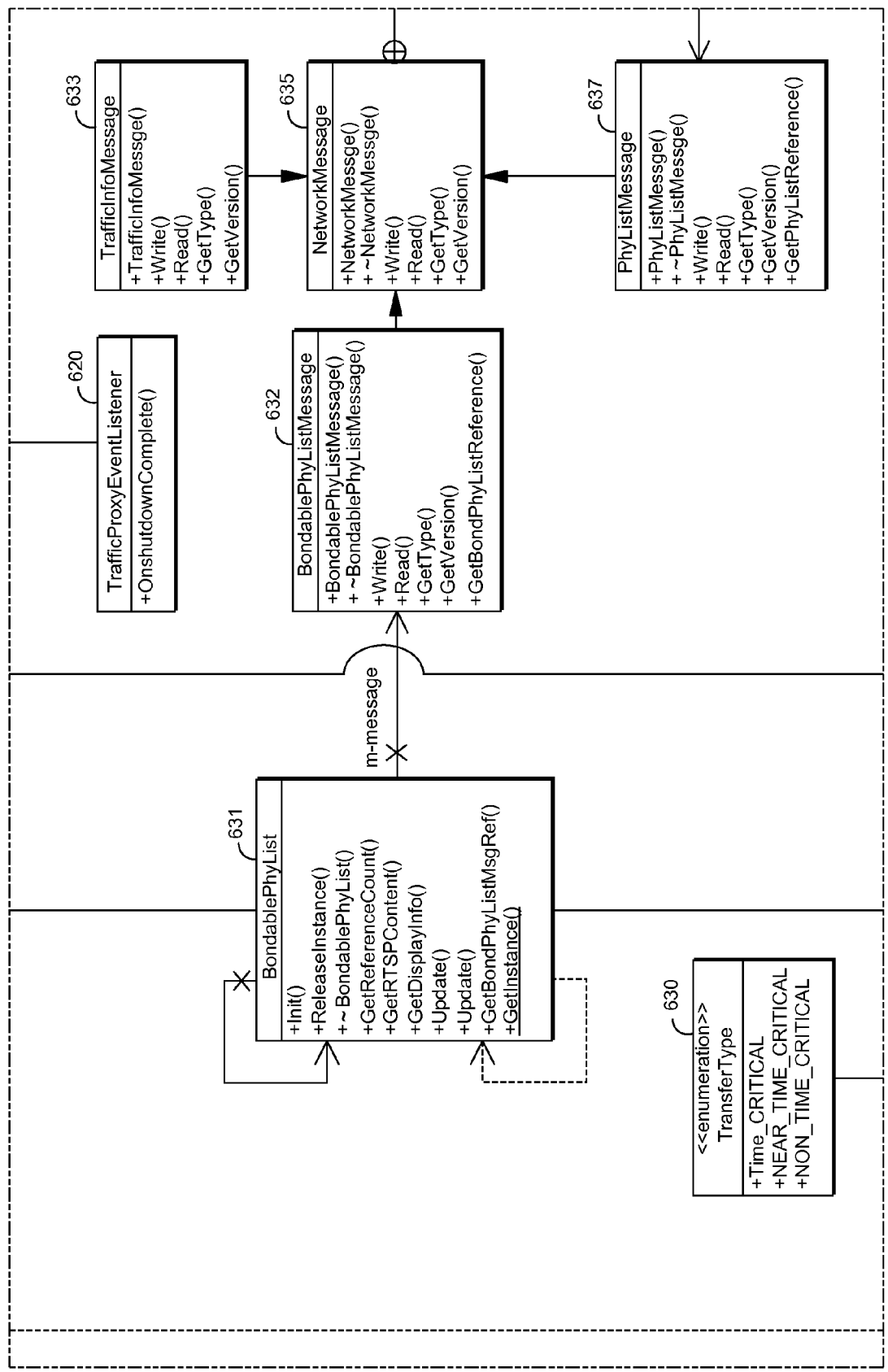
Figure 6J:
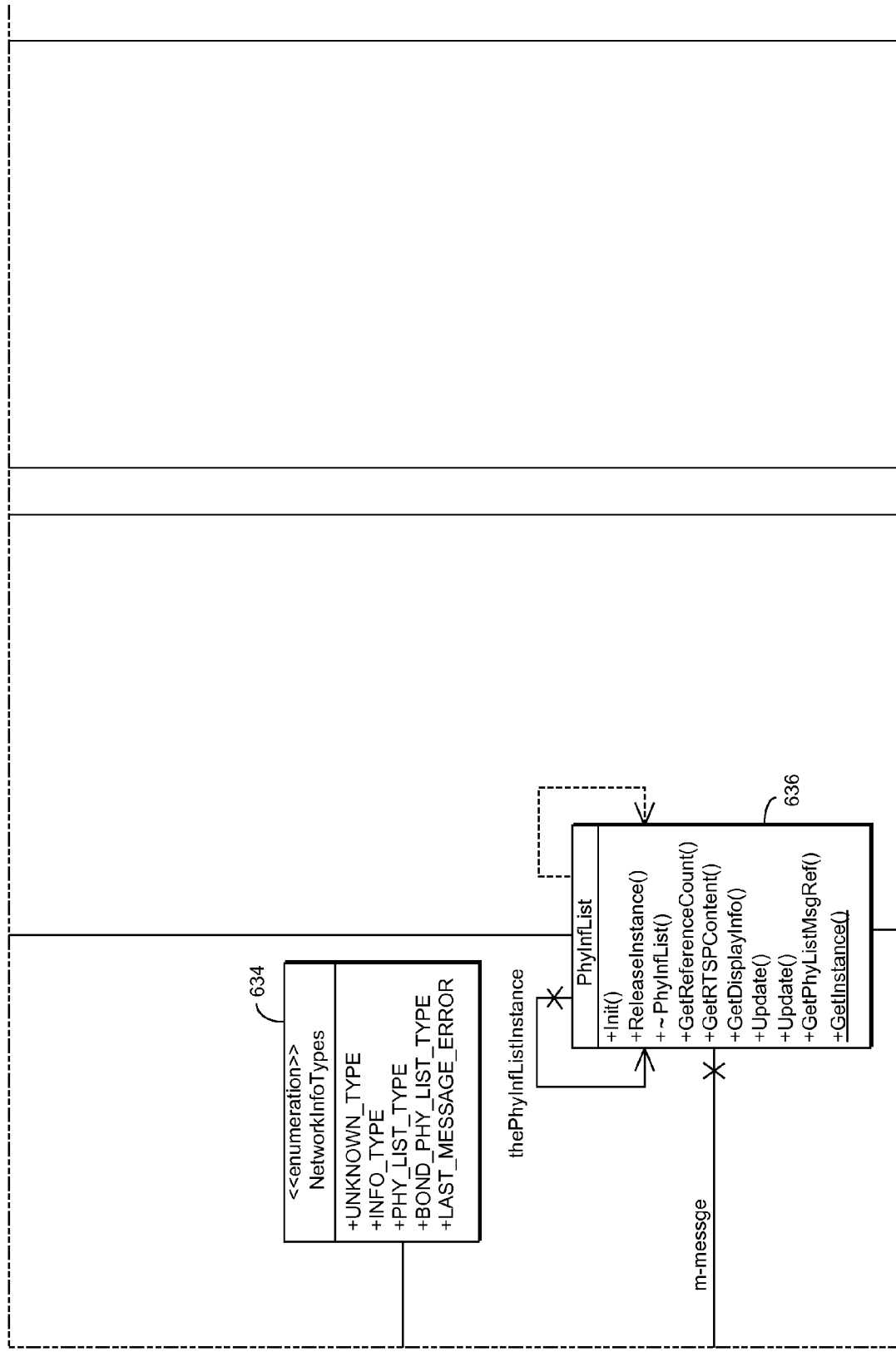
Figure 6K:
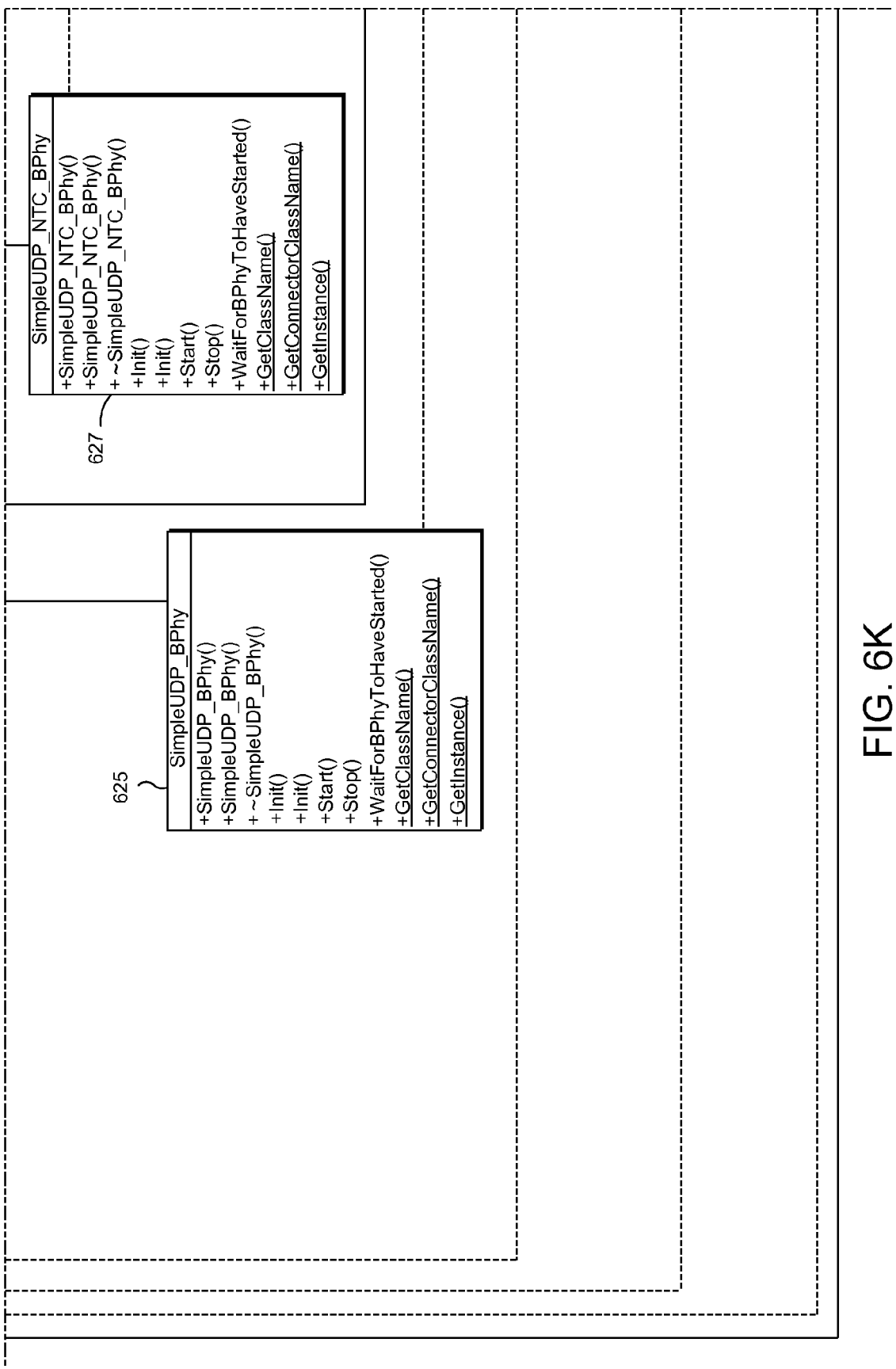
Figure 6M:
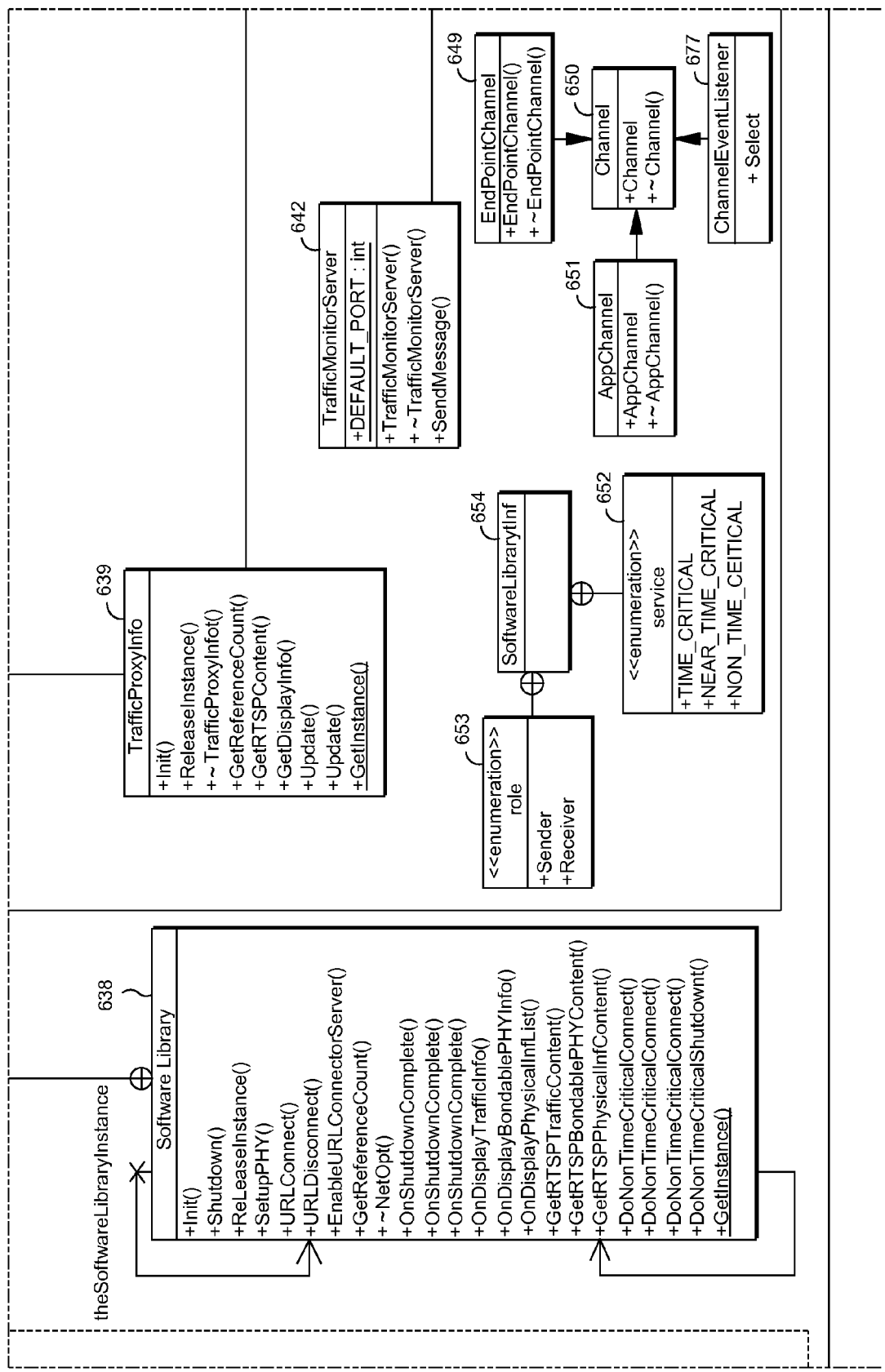
Figure 6N:
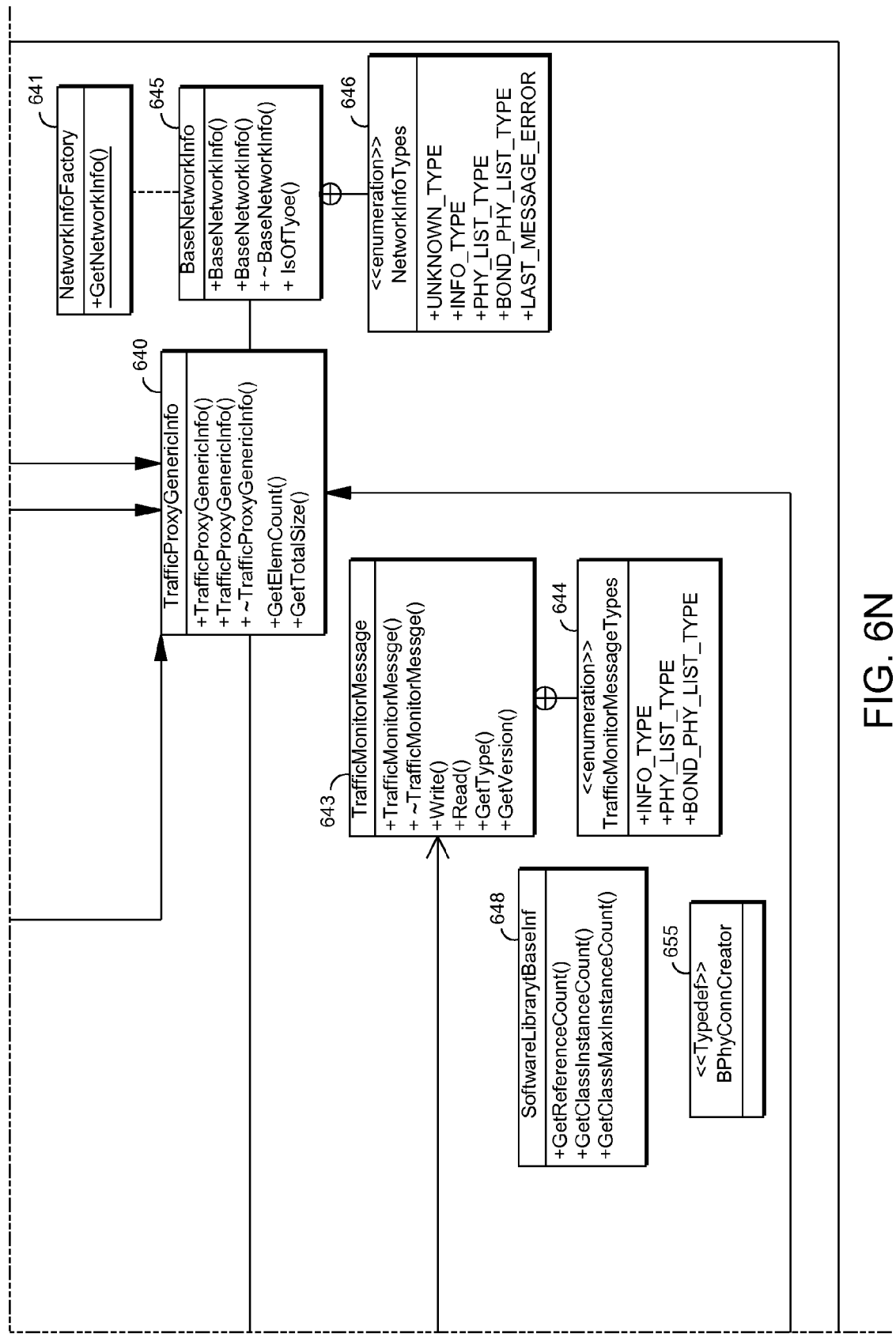

The above-mentioned architecture will now be described in more detail in connection with FIG. 5. FIG. 5 is another view of the sending endpoint 101 and the receiving endpoint 102 shown in FIG. 1, for providing an explanation of an example embodiment of the architecture included in both endpoints. As discussed above in connection with FIG. 1, the architecture is for streaming data from a sending endpoint 101 to a receiving endpoint 102 which are connected to each other by multiple networks (111, 112, 113, 114 of FIG. 1). Each of the sending endpoint 101 and the receiving endpoint 102 has multiple physical interfaces (105a and b, 106a and b, 107a and b and 108a and b of FIG. 1), each for interfacing to a respective one of the multiple networks. The architecture for controlling the streaming of the data is implemented on both the sending endpoint 101 and the receiving endpoint 102.

As shown in FIG. 5, the architecture on the sending endpoint 101 includes a software library 232 and a traffic monitor 234. The traffic monitor 234 is for gathering performance characteristics of each of the multiple physical interfaces. More specifically, the traffic monitor 234 is an operating system-specific application or (daemon) service that provides the software library 232 with all of the available physical interfaces, and with individual physical interface performance/traffic statistics and data. The traffic monitor 234 may obtain network status by periodically making system calls to system's data structures to acquire statistics for each physical interface of the sending endpoint 101. This data is then used by the traffic monitor 234 to specify corresponding configurations for bondable virtual interfaces, which will be described in more detail below, including a list of suitable known bondable virtual interfaces that can be used to transfer data based on current network traffic. The traffic monitor 234 communicates information back and forth between the software library 232. As shown in FIG. 5, the traffic monitor 234 communicates directly with the software library 232; however, in other embodiments, the traffic monitor 234 can communicate with the software library 232 via traffic proxy 248 as described above in connection with FIG. 4.

The software library 232 is for controlling the sending of the data stream from the sending endpoint 101. In controlling the sending of data, the software library 232 instantiates a plurality of bondable virtual interfaces 236 and a data organizer 238. In addition, the software library 232 instantiates logical physical interfaces 509. The logical physical interface 509 is an abstraction of a physical interface, which has a uniform interface. In addition, the bondable virtual interfaces 236 are instantiated by the software library based on the information communicated by the traffic monitor 234, for splitting the data stream into multiple data substreams at the sending endpoint 101. A bondable virtual interface is a clustering of two or more logical physical interfaces as a bondable object that aggregates available bandwidth with a single thread to manage a common buffer memory. The bondable virtual interface has a second thread to listen to a single feedback path from the receiving endpoint 102, and has additional threads for managing data transfer from a common buffer memory to each of an associated logical physical interface. An example of a bondable virtual interface is a pair of 802.11g wireless interfaces combined for a nominal available bandwidth of 44 Mb/s, assuming ~22 Mb/s of effective bandwidth for each individual interface.

In addition, the data organizer is used for designating one of the plurality of bondable virtual interfaces 236 for splitting the data stream. At the sending endpoint 101, the data organizer 238 instantiates a data splitter 238 for implementing the designated one of the plurality of bondable virtual interfaces 236 at the sending endpoint 101. In this regard, the data organizer 238 is a parent object for the data splitter, and includes functionality for the registration of new or added bondable virtual interfaces. Moreover, the data organizer 238 is inherited by the data splitter 238. The data splitter 238 contains the bondable virtual interfaces 236 class implementation, and contains the associated behavior for splitting the input data stream onto the multiple physical interfaces.

Similar to the sending endpoint 101, in the receiving endpoint 102, the architecture includes a software library 332 and a traffic monitor 334. The traffic monitor 334 is for gathering performance characteristics of each of the multiple physical interfaces. More specifically, the traffic monitor 334 is an operating system-specific application or (daemon) service that provides the software library 332 with all of the available physical interfaces and with individual physical interface performance/traffic statistics and data. The traffic monitor 334 may obtain network status by periodically making system calls to system's data structures to acquire statistics for each physical interface of the receiving endpoint 102. This data is then used by the traffic monitor 334 to specify corresponding configurations for bondable virtual interfaces, which will be described in more detail below, including a list of suitable known bondable virtual interfaces that can be used to transfer data based on current network traffic. The traffic monitor 334 communicates information back and forth between the software library 332. In FIG. 5, the traffic monitor 334 communicates directly with the software library 332; however, in other embodiments, the traffic monitor 334 can communicate with the software library 332 via a traffic proxy as described above in connection with FIG. 4.

The software library 332 is for controlling the receiving of the data stream at the receiving endpoint 102. In controlling the receiving of data, the software library 332 instantiates a plurality of bondable virtual interfaces 336 and a data organizer 338. In addition, the software library 332 instantiates logical physical interfaces 510. The logical physical interfaces 510 are substantially the same as logical physical interfaces 509, and provide the same functions. The bondable virtual interfaces 336 are instantiated by the software library based on the information communicated by the traffic monitor 334, for combining the multiple data sub-streams into the data stream at the receiving endpoint 102. In addition, the data organizer is for designating one of the plurality of bondable virtual interfaces 236 for combining the data stream.

At the receiving endpoint 102, the data organizer 338 instantiates a data combiner 338 for implementing the designated one of the plurality of bondable virtual interfaces 336 at the receiving endpoint 102. In this regard, the data combiner 338 is a parent object for the data combiner 338, and includes functionality for the registration of new or added bondable virtual interfaces. Moreover, the data organizer 338 is inherited by the data combiner 338. The data combiner 338 contains the bondable virtual interfaces 336 class implementation, and contains the associated behavior for combining multiple input streams into a resulting single data stream.

At startup of the architecture, the data splitter 238 and the data combiner 338 read network statistics provided by the traffic monitor 234 and 334. The traffic monitors' network statistics are updated periodically (at optionally application specified intervals), and are organized to display an ordered list of recommended bondable physical interface configurations, along with a minimum bandwidth available for each.

As further shown in FIG. 5, the sending endpoint 101 and the receiving endpoint 102 are each connected to one or more applications, such as application server 501 and application player 502, respectively. In this regard, the software library 232 of the sending endpoint 101 and the software library 332 of the receiving endpoint 102 further instantiate one or more application channels 240 and 340, respectively, connecting the software libraries 232 and 332 to one or more applications 501 and 502, respectively. The one or more application channels 240 write data to the software library 232, the written data having been received by the sending endpoint 101 from the one or more applications 501. In addition, the one or more application channels 340 read data from the software library 332, the read data having been sent from the receiving endpoint 102 to the one or more applications 502 connected to the receiving endpoint 102. For the application channels, a "named-socket" can be used, which provides a very similar interface to the traditional "single socket" approach in common usage. Moreover, the one or more application channels 240 and 340 include an event handling mechanism to indicate when there is data to be read from or written to the software libraries 232 and 332. The event handling mechanism for a named-socket is a select; however, many other means can be used for triggering events on the application channels.

As shown in FIG. 5, the software libraries 232 and 332 further instantiate multiple endpoint channels 242 and 342, respectively, connecting the software libraries 232 and 332 to the multiple physical interfaces 105a to 108a and 105b to 108b through network driver buffers 505 and 506. The multiple endpoint channels 242 and 342 write data to the software library 332, the written data having been received at the receiving endpoint 102 from the sending endpoint 101, and read data from the software library 232, the read data having been sent from the sending endpoint 101 to the receiving endpoint 102. The multiple endpoint channels 242 and 342 include an event handling mechanism to indicate when there is data to be read from or written to the multiple physical interfaces 105a and 105b to 108a and 108b. In addition, the network driver buffers 505 and 506 are provided to store data before sending data on the sending side, and before reconstructing the data stream and providing the single data stream to the application player 502 on the receiving side. In general, for the multiple endpoint channels, UDP and/or TCP sockets are used to write and read data to/from a network. Moreover, the event handling mechanism for the endpoint channels can be a select; however, other means for triggering events on the endpoint channels may be used. Lastly, an endpoint channel usually has an associated physical interface (e.g., an Ethernet socket); however, other instances exist in which this is not the case. For example, the case exists of using one physical interface but using multiple ports (e.g., using 2 sockets using IP address 192.168.10.1 port 10000 and port 10001).

The bondable virtual interfaces 236 and 336, as shown in FIG. 5, are created by the data splitter 238 or the data combiner 338 to perform the splitting or combining of the data stream. The bondable virtual interfaces 236 and 336 conform to an interface, which allows them to be used generically in the framework. In other words, one bondable virtual interface could be substituted with another bondable virtual interface quite easily without changing any interface requirements elsewhere in the software library, or in an application. Lastly, a bondable virtual interface can have multiple physical interfaces associated with it, or a bondable virtual interface can have a single logical physical interface (as is the case with sockets using one physical interface but with multiple ports).

In addition, the bondable virtual interfaces 236 and 336 have the basic functionality to split or combine data (based upon the role provided by the data splitter 238 or the data combiner 338). In general, the bondable virtual interfaces may be a reduction of a number or a set of rules regarding how to handle data from one or more application channels split over one or more endpoint channels (or vice versa, when recombining data). Thus, different types of bondable virtual interfaces may be created. Two examples of such bondable virtual interfaces are: a simple TCP Bondable virtual interface, and a simple UDP bondable virtual interface. A simple TCP bondable virtual interface is a bondable virtual interface consisting of multiple physical network interfaces, sending data with each interface using standard TCP connections. An example of a simple TCP bondable virtual interface would be a "round robin" type bondable virtual interface, which uses multiple interfaces to send data.

A simple UDP bondable virtual interface is a bondable virtual interface consisting of multiple physical network interfaces, and sending data with each interface using standard UDP datagrams.

When designating ones of the plurality of bondable virtual interfaces 236 and 336, the data splitter 238 and the data combiner 338 negotiate to designate one of the bondable virtual interfaces, based on the performance characteristics of the multiple physical interfaces 105a to 108a and 105b to 108b and available ones of the plurality of bondable virtual interfaces. During the negotiation between the data splitter 238 and the data combiner 338, the data splitter 238 presents available ones of the plurality of bondable virtual interfaces, and the data combiner 338 selects one of the available ones of the plurality of bondable virtual interfaces.

Furthermore, the software libraries 232 and 332 further instantiate a plurality of bondable virtual interface connectors 244 and 344, respectively. Each bondable virtual interface connector is associated with a specific bondable virtual interface. The bondable virtual interface connectors 244 and 344 ensure that the connections between the software libraries 232 and 332 and the multiple physical interfaces 105a to 108a and 105b to 108b via the multiple endpoint channels 242 and 342, respectively, are ready to accept data before sending data from the sending endpoint 101 to the receiving endpoint 102. In addition, the bondable virtual interface connectors 244 and 344 ensure that the connections between the software libraries 232 and 332 and the one or more applications 501 and 502 via the one or more application channels 240 and 340, respectively, are ready to accept data before sending data from the sending endpoint 101 to the receiving endpoint 102.

When sending streaming data from the sending endpoint 101 to the receiving endpoint 102, the one or more applications 501 specify a category of time objective: the categories include a non-time critical objective, a time critical objective, or a near-time critical objective. A non-time critical data stream is a data stream where the data should be received without error; however, time may not be a critical factor (i.e., there may be scenarios (or situations) where time is a critical factor). In these scenarios, a contributing factor for a non-time critical data stream should also include data integrity and thus, in these situations, there is a significant difference between non-time critical, near-time critical and time critical. For example, a non-time critical objective would be specified for a simple file transfer, because the data in this scenario ordinarily should be received without error, and arrival time may not be important for this data.

A near-time critical data stream is a data stream where the data is bound to an endpoint within a range of time. For example, a video stream can possibly be buffered for 5 seconds before the first video frame is displayed on the screen. Or, in the case of a larger memory buffer or hard drive, the first couple of minutes can be burst from the sender to the receiver (i.e., video server to video player). Thus, after the head start (buffer or system priming) has been buffered, the remaining data can be sent in a more leisurely manner, as long as it is received in time to be consumed by the player without interruption in playback. Further, in video streams, it is often the case that some of the packets may be dropped, corrupted or lost due to collision or other network impairments. In this regard, UDP is often the de-facto standard of video streaming and UDP does not guarantee delivery.

For a time-critical data stream, it is usually imperative that the information be received as quickly as possible. Moreover, a time critical objective would be specified when streaming an interactive video stream such as a video conference, because the data in this scenario should be received as soon as possible, while a loss of an insignificant portion of the data may be acceptable.

Because a time objective is specified for the data to be sent, the architecture has greater flexibility in choosing which of the multiple physical interfaces to utilize in sending data. Thus, instead of solely relying on network bandwidth of the multiple physical interfaces, the architecture can utilize the time objectives to provide an even more efficient means of sending data between the endpoints.

For the near-time critical and the time critical data streams, transferring of the stream will involve a payload stream mechanism, a feedback mechanism, and a control stream mechanism. The payload stream mechanism sends the payload content from the sending endpoint 101 to the receiving endpoint 102. In the architecture, the payload stream is sent via a bondable virtual interface, for example, using an RTP-like protocol where multiple physical interfaces will be used to send data to the receiving endpoint 102. The feedback mechanism will be described in detail below in connection with FIGS. 15 to 17. The control stream mechanism sends content control commands from the receiving endpoint 102 to the sending endpoint 101 (e.g., play, pause, etc.) using, for example, an RTSP like protocol.

For a non-time critical data stream, the transferring of the stream within the architecture will have the same behavior as the near-time and the time critical data streams with no control stream. Thus, the transferring of the stream for a non-time critical data stream involves a payload stream mechanism and a feedback mechanism, each having similar characteristics as the stream mechanisms of the near-time and the time critical data streams.

Furthermore, the software libraries 232 and 332 each further comprise a software application program interface 280, as described in connection with FIG. 4, which consists of a set of commands used by the one or more applications 501 and 502 to utilize the architecture. In addition, the software libraries 232 and 332 each instantiate a bondable virtual interface factory 246, as described in connection with FIG. 4, for registering the newly created ones of the plurality of bondable virtual interfaces, unregistering ones of the plurality of bondable virtual interfaces which are no longer available, and providing a list of available bondable virtual interfaces to the data organizer.

As discussed above, the traffic monitors 234 and 334 may communicate with the software libraries 232 and 332, respectively, via a traffic proxy. In this case, the software libraries 234 and 334 each further instantiate a traffic proxy 248 (as described in connection with FIGS. 2 and 4) and a traffic proxy 348 (as described in connection with FIG. 3) for communicating information between the traffic monitors 234 and 334 and the software libraries 232 and 332, respectively, via a shared common interface. The common interface is a shared library, which contains objects containing information and the means to share this common data between the traffic monitors 232 and 332 and the traffic proxies 248 and 348. The transport mechanism can be changed easily and additional information can be added (e.g., by adding new objects).

In general, all interaction between the architecture and other applications is conducted through a basic interface. This basic interface is comprised of a core functionality, which is specific to the architecture, and behavioral functionality, which is specific to the operation of the interfacing application. Examples of core functionality would be a startup and shutdown of the architecture. Behavioral functionality examples might include RTSP, or URL connection functionality. For example, the architecture will provide a setup functionality to extend the standard RTSP setup functionality, in which the extension to RTSP is obtainable from an RTSP OPTIONS command. In another example, URL connection functionality can be added to achieve file transfer behavior.

FIG. 6 (6A to 6N) shows a Unified Modeling Language (UML) class diagram for an architecture of an example embodiment. As shown in FIG. 6, a TransferType 630 object is contained by a SoftwareLibrary object 638.

Also shown in FIG. 6, is a SimpleUDP_NTC_BPhyConnector object 601, a SimpleTCP_Redirectable_BPhyConnector object 602, and a ReliableUDP_NTC_BPhyConnector object 603, all of which associate and are dependent upon BondablePhyConnectorInf object 604. In addition, a SimpleUDP_PhyConnector object 647, and a SimpleTCP_BPhyConnector 628 all associate with and are dependent upon the BondablePhyConnectorInf object 604. Moreover, a BondablePhyFactory object 605 is dependent upon the BondablePhyConnectorInf object 604. Furthermore, a BondableBPhyConnector object 606 associates with BondablePhyConnectorInf object 604.

The SimpleTCP_BPhyConnector object 628 also associates with BondablePhyInf object 613. Moreover, a SimpleTCP_Redirectable_BPhy object 622, a SimpleTCP_BPhy object 621, a ReliableUDP_NTC_BPhy object 624, a SimpleUDP_NTC_BPhy object 627, a SimpleUDP_BPhy object 625, a DataCombiner object 610, and a DataSplitter object 608 are all dependent upon the BondablePhyInf object 613. In addition, the SimpleTCP_BPhy object 621, the SimpleTCP_Redirectable_BPhy object 622, the ReliableUDP_NTC_BPhy object 624, the SimpleUDP_BPhy object 625, and the SimpleUDP_NTC_BPhy 627 all associate with BondablePhyBase object 623. The BondablePhyBase object 623 associates with the BondablePhyInf object 613. BondablePhy object 611 also associates with the BondablePhyInf object 613.

The DataCombiner object 610 and DataSplitter object 608 each are associated with and inherit the DataOrganizer object 607, which is dependent upon the BondablePhyConnector object 606 and the BondablePhyConnectorInf object 604. In addition, a DataCombinerEventListener object 609 and a DataSplitterEventListener object 612 associate with the DataCombiner object 610 and the DataSplitter object 608, respectively.

Furthermore, a TrafficProxyInfoTypes object 670 is contained by a TrafficProxyInfoInf object 617. In addition, a PhyInfList object 636, a TrafficProxyInfo object 639, a BondablePhyList object 631, and a TrafficProxy object 615 all associate with the TrafficProxyInfoInf object 617. In addition, a TrafficProxyEventListener 620 associates with the TrafficProxy object 615, and the TrafficProxy object 615 associates with a TrafficMonitorClient object 618. The BondablePhyList also associates with the TrafficProxyGenericInfo object 640 and a BondablePhyListMessage object 632. Moreover, the TrafficProxyInfo object 639 and a BaseNetworkInfo 645 associate with the TrafficProxyGenericInfo object 640. The BaseNetworkInfo object 645 is dependent upon the NetworkInfoFactory object 641, and a NetworkInfoTypes object 646 is contained by the BaseNetworkInfo object 645.

Moreover, the BondablePhyListMessage object 632, the TrafficInfoMessage object 633, and the PhyListMessage object 637 all associate with a NetworkMessage object 635. In addition, a NetworkInfoTypes object 634 is contained by the NetworkMessage object 635. Furthermore, the PhyInfList object 636 associates with the PhyListMessage object 637 and the TrafficProxyGenericInfo object 640.

In addition, a TrafficMonitorMessageTypes object 644 is contained by a TrafficMonitorMessage object 643, and a TrafficMonitorServer object 642 associates with the TrafficMontiorMessage object 643.

FIG. 6 also shows that an EndPointChannel object 649 and an AppChannel object 651 associate with a Channel object 650. Also shown in FIG. 6, are an <<enumeration>> role object 653 and an <<enumeration>> service object 652 which interface with a SoftwareLibraryInf object 654. A ChannelEventListener object 677 is also associated with the Channel object 650.

Use Cases

Some example implementations are described below, which use the architecture according to an example embodiment. These use cases include situations in which the architecture will be used, and the steps to be implemented for these situations. The following use cases are not an extensive list of use cases for all scenarios of using the architecture; rather, other use cases and implementations may exist or be developed.

Video Streaming Use Case

Figure 7:
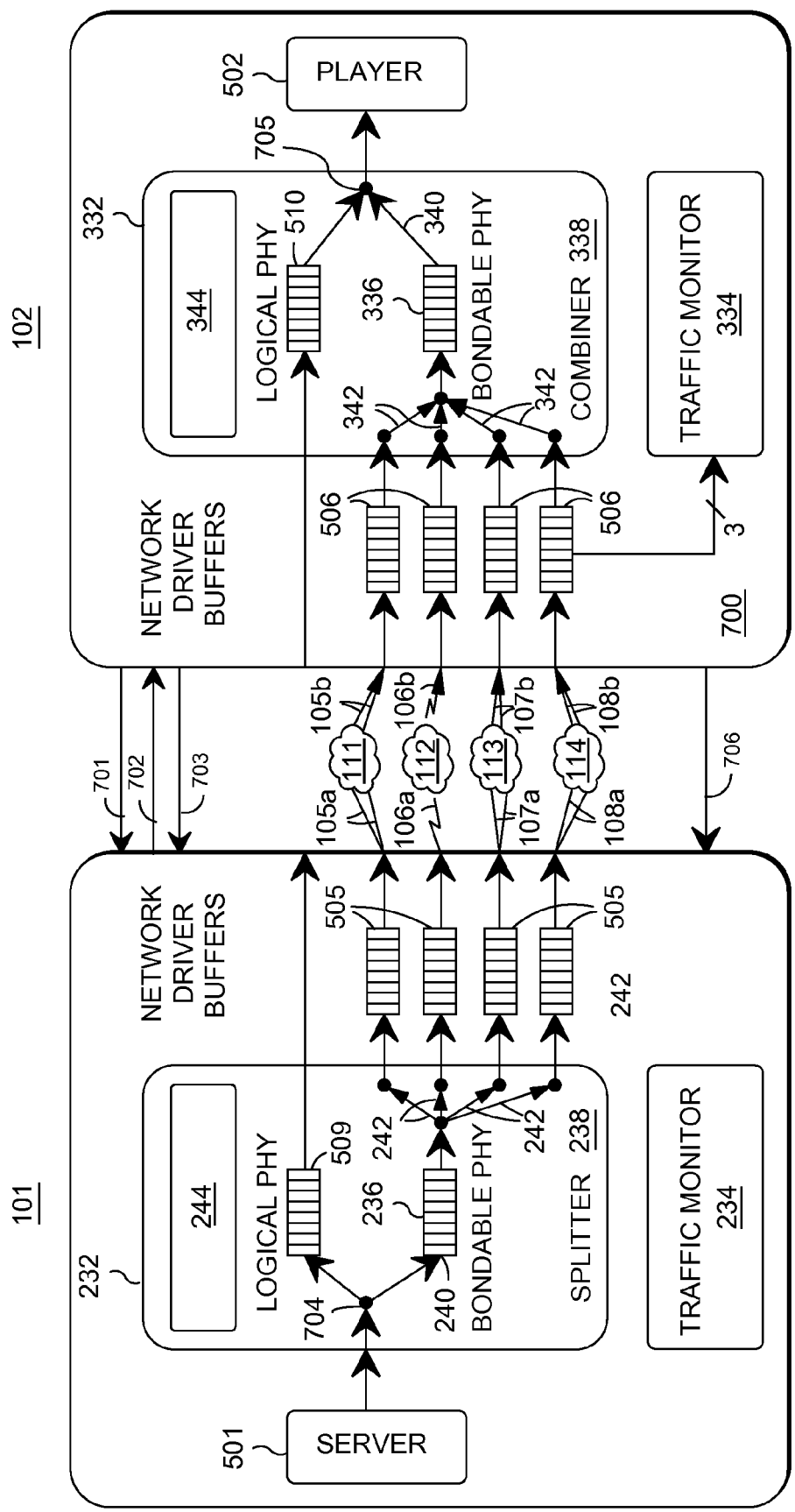
FIG. 7 is an illustration for providing an explanation of a sending endpoint and a receiving endpoint negotiating a playback of a media stream in accordance with an example embodiment.

FIG. 7 is an illustration for providing an explanation of a sending endpoint and a receiving endpoint negotiating a playback of a media stream. In particular, FIG. 7 shows how the sending endpoint 101 and the receiving endpoint 102 of FIG. 1 negotiate a playback of a media stream over multiple interfaces 105a and 105b to 108a to 108b connecting the sending endpoint 101 and the receiving endpoint 102 to multiple networks 111 to 114 using a session initiation and control protocol such as RTSP. FIGS. 8 to 15 describe this behavior of the sending endpoint 101 and the receiving endpoint 102, using UML sequence diagrams. FIG. 7 describes the behavior at a top level in order to better understand the behavior from an overall system viewpoint. Each of the sending endpoint and the receiving endpoint has multiple physical interfaces (105a and b, 106a and b, 107a and b and 108a and b of FIG. 1), each for interfacing to a respective one of the multiple networks. The architecture for controlling the streaming of data is implemented on both the sending endpoint 101 and the receiving endpoint 102.

As shown in FIG. 7, each of sending endpoint 101 and receiving endpoint 102 are connected to multiple physical interfaces 105a to 108a and 105b to 108b, respectively, which connect the endpoints through multiple networks 111 to 114, as similarly shown in FIG. 5. Also similar to the structure in FIG. 5, each of the sending endpoint 101 and the receiving endpoint 102 includes an architecture for controlling the streaming of data over the multiple physical interfaces 105a to 108a and 105b to 108b, the architectures including components such as the software libraries 232 and 332 and traffic monitors 234 and 334.

In FIG. 7, the traffic monitors 234 and 334 on the sending endpoint 101 and receiving endpoint 102, respectively, periodically record the current status of the multiple physical interfaces 105a and 105b to 108a and 108b, monitoring such statistics as the number of dropped packets since the last observation, the number of packets received in error, and the number of collisions observed on this interface (700). If possible, knowledge of the link rate (capacity) and bandwidth consumed by observed traffic are used to calculate available bandwidth remaining for each of the physical interfaces. Known device profiles (i.e., combinations of available interfaces into logical and bondable virtual interfaces) are used to create a list of paths, in preferred order, using criteria such as, for example, available bandwidth, latency, observed or expected congestion, or perhaps all three. This list is used to negotiate the desired set of interfaces, which forms the bondable virtual interfaces 236 and 336, to use when playing back a media stream.

Assuming that the receiving endpoint 102 already has the correct URL for a data stream, the receiving endpoint 102 contacts the sending endpoint 101 to initiate playback of that URL. This playback request is accompanied by a list of preferred profiles to use for playback, as obtained from the traffic monitor 334 of the receiving endpoint 102 (701).

The sending endpoint 101 receives the playback request and the profile list, and uses its traffic monitor 234 to generate a sending side list of preferred profiles. The sending endpoint compares the profile lists looking for a good match, and communicates the chosen profile back to the receiving endpoint 102 (702).

The receiving endpoint 102 confirms (agrees) which paths are to be used, and requests the software library 332 instantiate the data combiner 338 with which to receive and reconstruct the expected media sub-streams (703). The sending endpoint 101 then receives the confirmation, and requests to have the software library 232 instantiate the data splitter 238 to handle the stream. Splitting and sending of the sub-streams over the multiple physical interfaces 105a and 105b to 108a and 108b then commences. In particular, the data splitter 238 splits the single data stream from the server application 501 into sub-streams via the bondable virtual interfaces 236 and 336 (704).

The data combiner then receives and reconstructs the stream, and passes it along to a player application for consumption on the sending endpoint (705). The data combiner 338 and/or the player application 502 generates feedback information, and the feedback information is sent to the sending endpoint, which will be described in greater detail below in connection with FIGS. 15 to 17 (706).

After playback is complete (signaled, perhaps, by an RTSP teardown command), the architectures on either side of the connection shutdown the connections and the associated data splitter 238 and the data combiner 338. The traffic monitors 234 and 334 continue to run periodically to update network statistics for a next data transfer.

Startup Sequence for Receiving Endpoint

Figure 8:
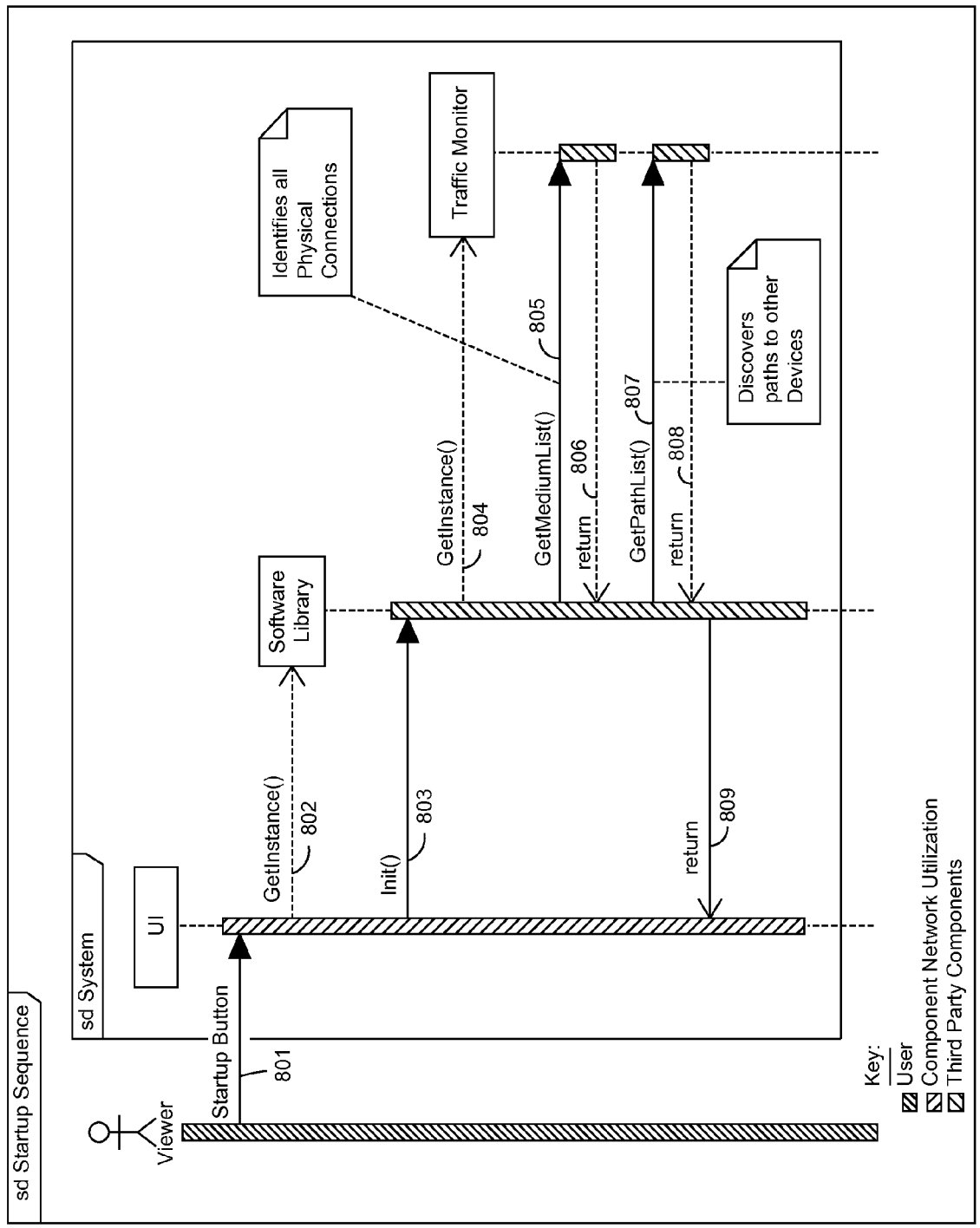
FIG. 8 shows a startup sequence diagram for the architecture on a receiving endpoint according to an example embodiment.

FIG. 8 shows a startup sequence diagram for the architecture on a receiving endpoint according to an example embodiment. As shown in FIG. 8, when a user powers-on a receiving endpoint, such as a set top box (STP) device, an application program such as application program 330 of FIG. 3 may start the architecture in the receiving endpoint 102 of FIG. 1. A set top box device is a hardware device that receives large media streams from a server, or in some cases sends large streams of data to a storage device (e.g., in the transferring of a video stream to be stored on a media server). The application program will get a handle to the architecture and call the init function. In the init function the software library will get a handle to the traffic monitor, and the software library will obtain information about the physical interfaces and the network paths.

More specifically, a user starts up the receiving endpoint 102 device, and a power-on sequence calls a start-up (801). Next, the application program calls the software library to obtain a reference (802), and uses the reference to call the init function (803). The software library then calls the traffic monitor to obtain a reference (804), and calls GetMediumList to obtain a list of the physical interfaces (805). The traffic monitor then returns the list of physical interfaces to the software library (806). The software library then calls a GetPathList( ) which discovers different paths to other devices (807). The traffic monitor then returns a list of the discovered paths to the software library (808), and the status of the init is returned to the application program (809).

Startup Sequence for Sending Endpoint

Figure 9:
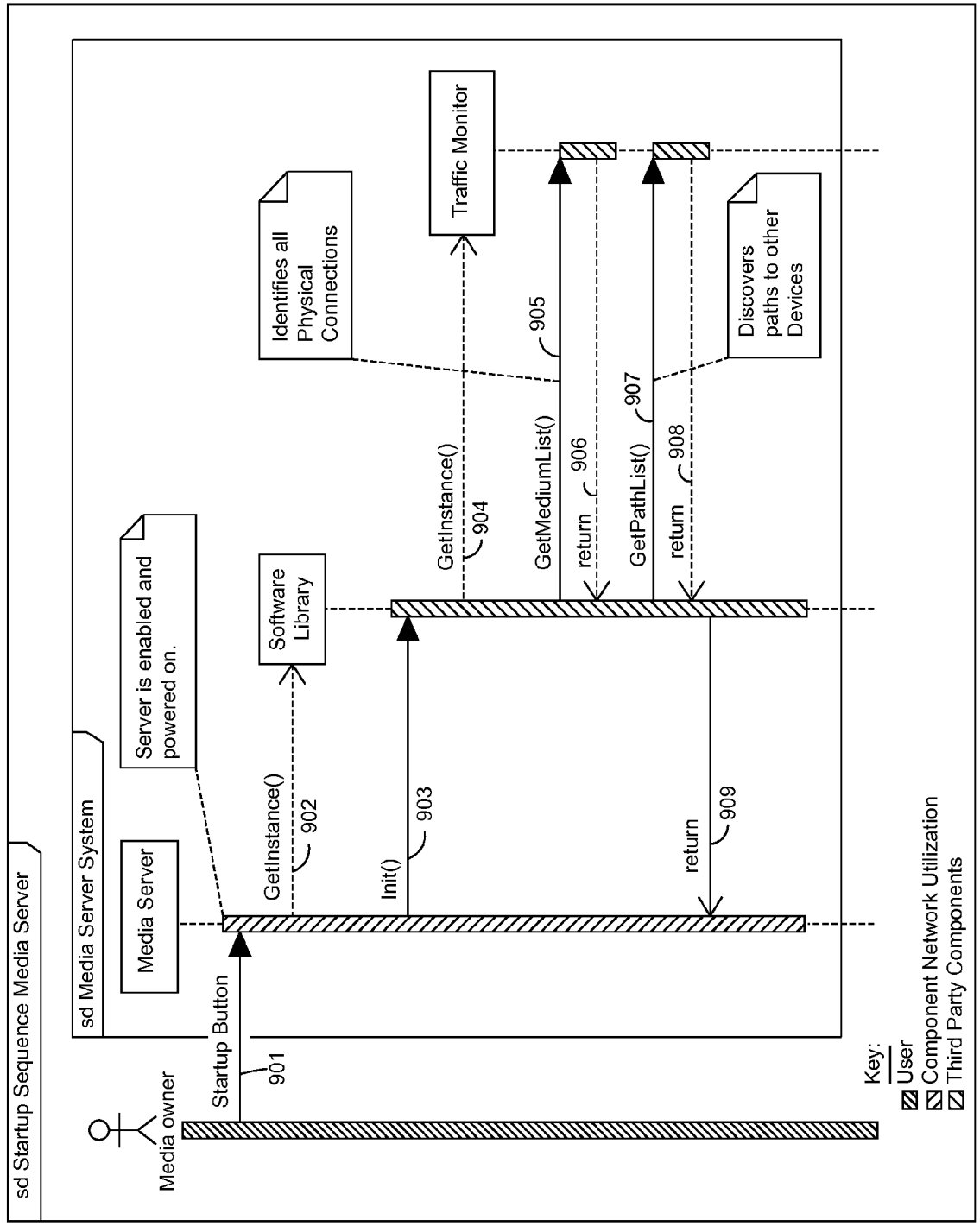
FIG. 9 shows a startup sequence diagram for a sending endpoint according to an example embodiment.

FIG. 9 shows a startup sequence diagram for a sending endpoint according to an example embodiment. As shown in FIG. 9, when a user starts the sending endpoint 101 of FIG. 1, an application program such as application program 230 of FIG. 2 will start the architecture in the sending endpoint 101. The application program will get a handle to the architecture and call the init function. In the init function, the software library will get a handle to the traffic monitor. The software library will then obtain information about the physical interfaces and the network paths.

More specifically, a user starts up the sending endpoint 101 device, and a power-on sequence calls a start-up (901). Next, the application program calls the software library to obtain a reference (902), and uses the reference to call the init function (903). The software library then calls the traffic monitor to obtain a reference (904), and calls GetMediumList to obtain a list of the physical interfaces (905). The traffic monitor then returns the list of physical interfaces to the software library (906). The software library then calls a GetPathList( ) which discovers different paths to other devices (907). The traffic monitor then returns a list of the discovered paths to the software (908), and the status of the init is returned to the application program (909).

With respect to FIGS. 8 and 9, the traffic monitors gather information from all the physical interfaces (e.g., bandwidth utilization), during initialization and periodically thereafter.

Shutdown Sequence

Figure 10:
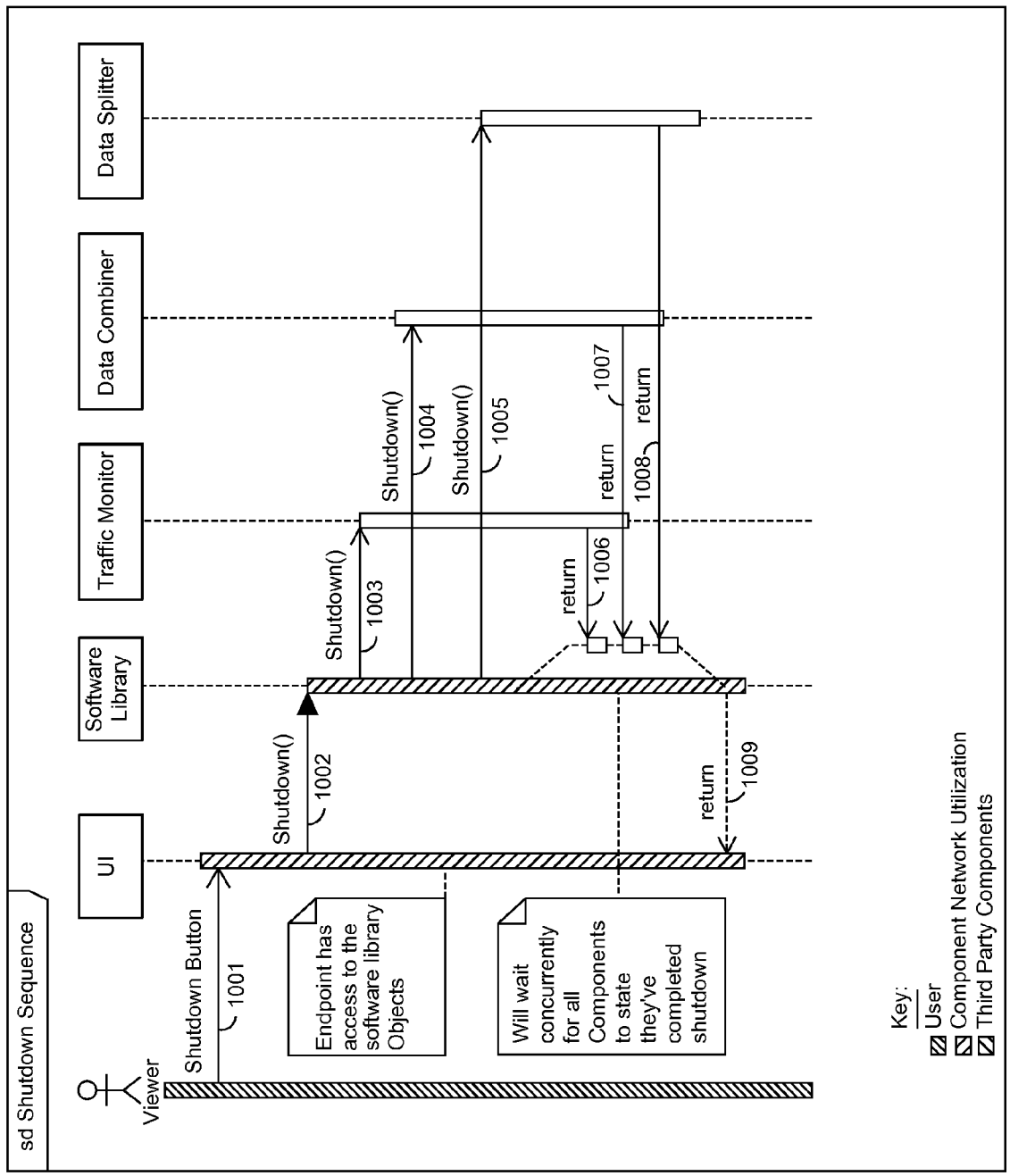
FIG. 10 shows a shutdown sequence diagram according to an example embodiment.

FIG. 10 shows a shutdown sequence diagram according to an example embodiment. As shown in FIG. 10, the application program, such as application program 230 or 330, which has a handle to the architecture can call the shutdown mechanism. The software library will call all of the components' (i.e., the traffic monitor's, the data combiner's or data splitter's) shutdown method. The software library will wait until all of the components return an OK before shutting down the architecture.

More specifically, a user initiates a quit (1001), and the application program calls a software library shutdown function (1002). Moreover, an asynchronous shutdown is sent to the traffic monitor (1003), an asynchronous shutdown is sent to the data combiner (1004), and/or an asynchronous shutdown is sent to the data splitter (the data splitter could have been invoked when the application sent data to a storage server) (1005). These asynchronously sent messages allow the software library to continue running. Next, the traffic monitor sends a return status to the software library (1006). This return is sent to the software library, where the software library is waiting for all the components to return their shutdown status. Then, the data combiner sends a return status to the software library (1007), and the data splitter sends a return status to the software library (1008). A status of the software library shutdown object is then returned to the application program (1009).

Retrieve Media List

Figure 11:
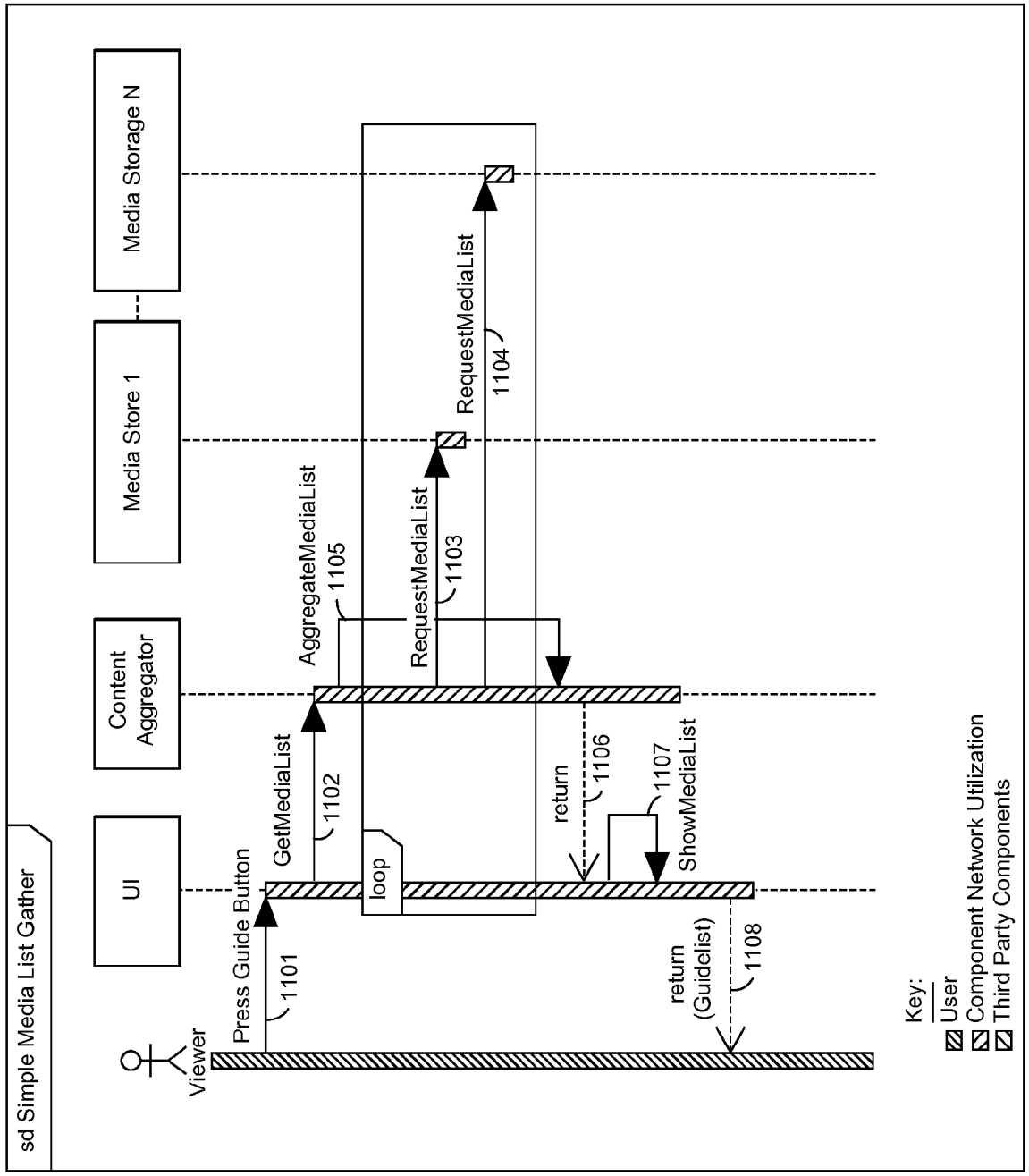
FIG. 11 shows a sequence diagram for gathering a list of media according to an example embodiment.

FIG. 11 shows a sequence diagram for gathering a list of media according to an example embodiment. This sequence diagram depicts a request for a movie or a media list from a content aggregator, which may include components not shown in FIG. 11. As shown in FIG. 11, a user presses a list button (e.g., a guide button), which is then sent to a user interface (UI) on a STB (1101). The UI then sends an appropriate message to a content aggregator (1102). The content aggregator then retrieves the media content by calling pertinent media stores for information (1103). The content aggregator calls more than one media store (for example, an N number of media stores), so as to obtain an extensive list of media content (1104). The aggregated list is then formed and returned to the STB's UI (1105). The STB UI processes the media list (1106), and the STB UI displays the media list (1107). The list is then returned to the software library (1108).

Streaming a Video

Figures 12, 12A, 12B:
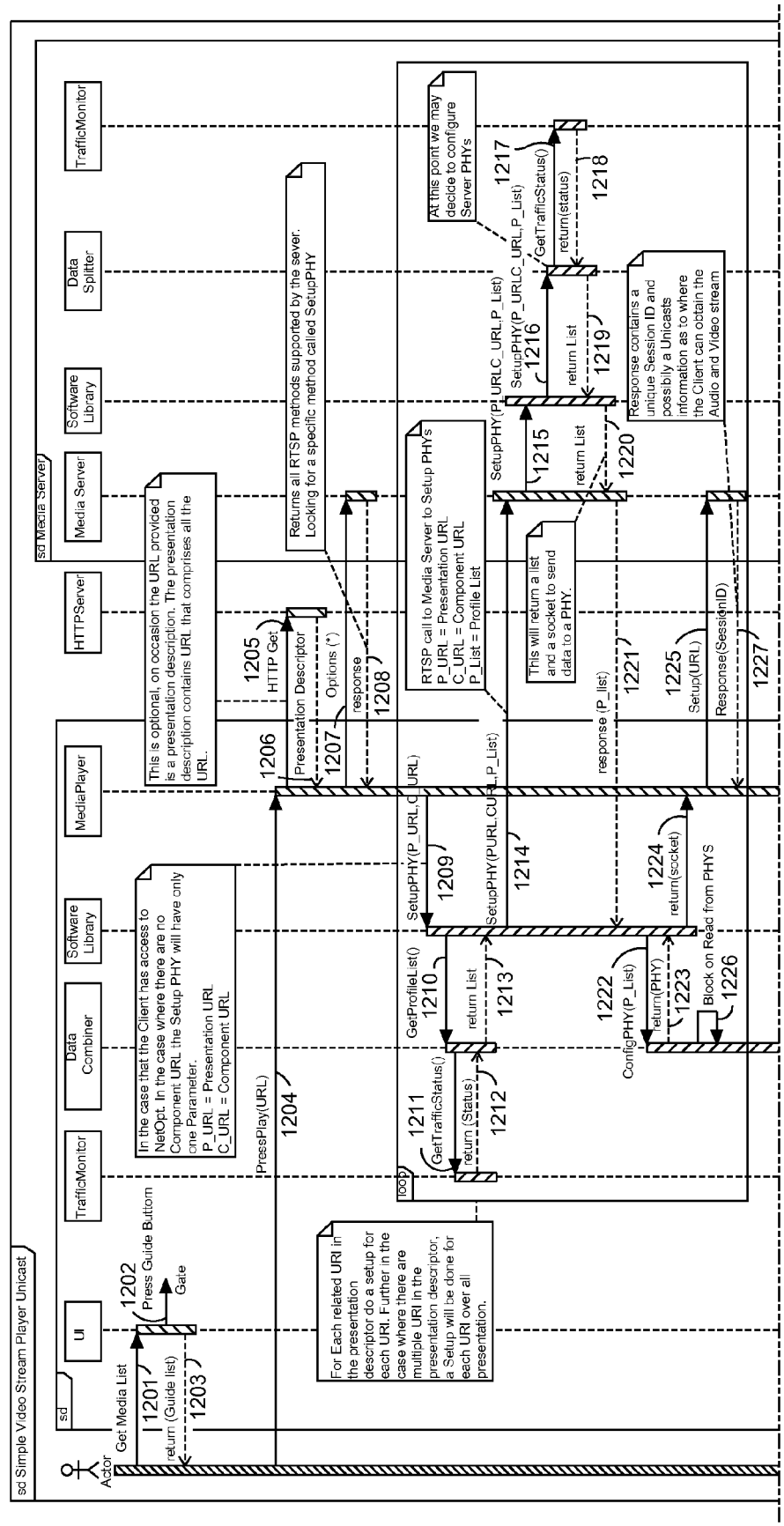
FIG. 12 shows a sequence diagram for streaming a video according to an example embodiment.
Figure 12B:
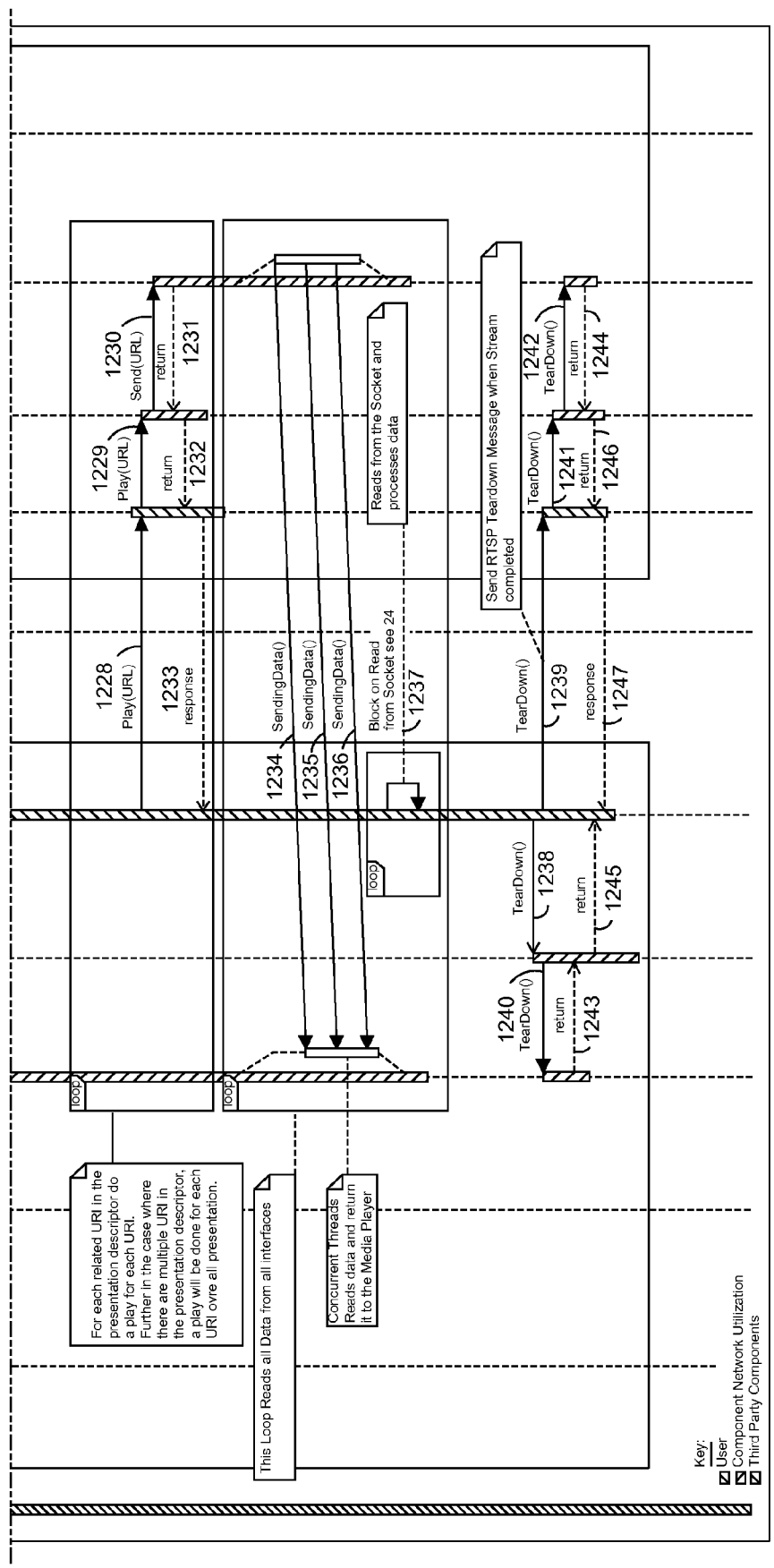

FIG. 12 shows a sequence diagram for streaming a video according to an example embodiment. The sequence diagram of FIG. 12 will be described in five sections, namely: (i) startup, (ii) setup, (iii) command, (iv) stream, and (v) teardown.

(i) Startup

As shown in FIG. 12A, a user presses a list button to obtain a media list, as described-above in more detail in connection with FIG. 11 (steps 1201 to 1203). The user selects a URL to play, and the receiving endpoint 102 is given the selected URL to play (1204). If the URL is a presentation descriptor, the receiving endpoint 102 asks another application for the information (e.g., an HTTP and RTSP server) (1205)(1206). The receiving endpoint 102 then sends, for example, a standard RTSP OPTIONS command to the sending endpoint 101 (1207). The OPTIONS command returns a list, for example, of RTSP methods available (which contains a Software Library RTSP extension command called "SetupPHY") (1208).

(ii) Setup

As shown in FIG. 12A, the receiving endpoint 102 calls the software library SetupPHY( ) method (1209), and the software library calls the GetProfileList( ) method of the data combiner (1210). During the process of getting the ProfileList, the data combiner calls the traffic monitor to GetTrafficStatus( ) (1211). The traffic monitor then returns the physical interface status in the form of a list (1212). The ProfileList may be a list of bondable virtual interfaces, and the list of bondable virtual interfaces may be in order of preference. On the other hand, the ProfileList may be a list of physical interfaces. The resulting ProfileList is then returned to the software library (1213). The software library makes a direct RTSP call to the sending endpoint 101, sending the list (1214). The sending endpoint 101 then calls the software library's SetupPHY( ) method, passing the list (1215), and calls the GetProfileList( ) method of the data splitter (1216). During the process of getting the ProfileList, the data splitter calls the traffic monitor to GetTrafficStatus( ) (1217). The traffic monitor then returns the physical interface status in the form of a list (1218). The ProfileList may be a list of bondable virtual interfaces, and the list of bondable virtual interfaces may be in order of preference. On the other hand, the ProfileList may be a list of physical interfaces. The resulting ProfileList is then returned to the software library (1219). The actual physical interfaces to be used for the data transfer are returned to the sending endpoint 101, which includes the list of sockets to be used to send the multiple substreams, and a single socket that will be used by the sending endpoint 101 to send the stream (1220). The single socket is an application channel 240. The sending endpoint 101 then responds to the RTSP call from step 1214, passing the actual connection information to be used (1221). This information is then passed to the ConfigurePHY( ) method of the data combiner, and used to create the socket that will be used to receive the data stream (1222). The sockets are then returned to the software library (1223), and then returned to the sending endpoint 101 (1224).

(iii) Command

As shown in FIG. 12A, an RTSP setup command is sent to the sending endpoint 101 to the receiving endpoint 102 (1225). Meanwhile, the data combiner is blocked, waiting for data (1226). The setup response is then returned, along with a unique SessionID (1227). As shown in FIG. 12B, the RTSP play command is then sent, using the unique SessionID (1228). The sending endpoint 101 calls the software library Play( ) method to begin playback of the data stream (1229). The software library then calls the data splitter's Send( ) method (1230 and 1231). The software library play method then completes (1233), and the sending endpoint 101 responds to the RTSP play command (1233). If there is more than one stream to be played (e.g., a separate audio and video stream), then steps 1225 to 1233 are executed for each stream.

(iv) Stream

As shown in FIG. 12B, asynchronous calls are made passing portions of the data using the bondable virtual interface to transfer substreams from the sending endpoint's data splitter object over the multiple networks, to be received by the receiving endpoint's data combiner object (1234 to 1236).

The receiving endpoint 102 then blocks, and continues to read from the single socket, which is an application channel 240, provided by the software library from step 1224, with the reconstructed stream (1237).

(v) Teardown

As shown in FIG. 12B, when the receiving endpoint 102 receives the end of the data stream, the receiving endpoint 102 calls the TearDown( ) method asynchronously (1238), and then immediately sends an RTSP teardown command to the sending endpoint 101 (1239). The software library of the receiving endpoint 102 then calls the data combiner's Teardown( ) method, and then waits for a response to the RTSP command (which will occur in step 1247) (1240, 1243 and 1245). The sending endpoint 101 then receives the RTSP teardown command and begins a similar process as used in steps 1240, 1243 and 1245, to tear down the data splitter (1241, 1242, 1244 and 1246).

For special play modes, such as fast-forward and reverse, the sequence diagram is the same as the above-described sequence diagram in FIG. 12, except that in the RTSP call to play, the scale is increased. More specifically, in a normal play mode the scale would be 1, while fast-forwarding would scale to a value greater than 1. In addition, a play mode in reverse would scale to a negative value. For example, a fast-forward of 2× would scale to 2, while a reverse 2× would scale to −2. In addition, special consideration should be given to scenarios where the receiving endpoint has a mass storage container (i.e., allowing for recording), where the data must be streamed in normal play speed (i.e., scale=1), and special play will take place in the streaming from the storage container. However, this special scenario is not the case for this example embodiment.

Whiteboard Conferencing

Figures 13, 13A:
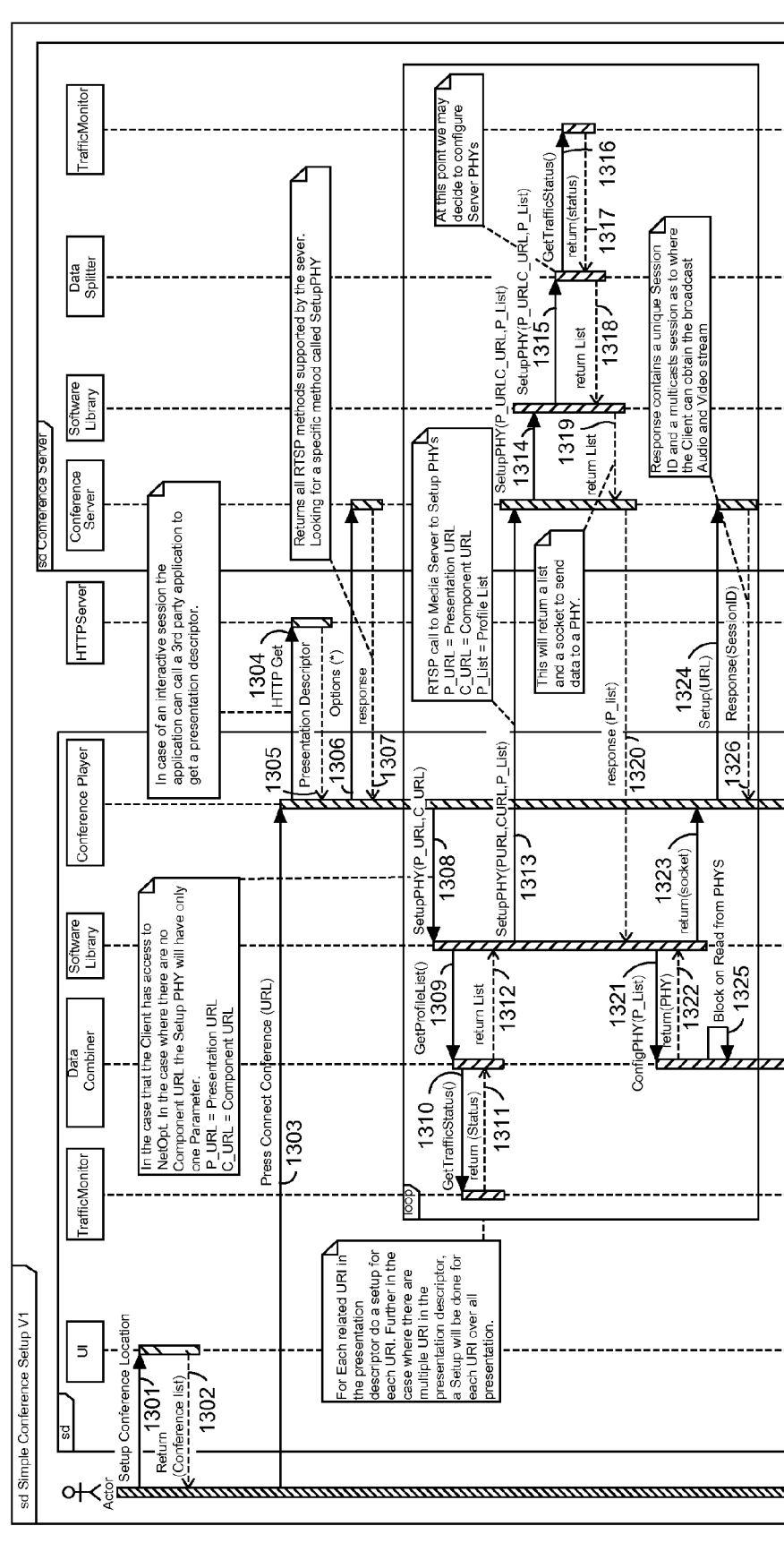
FIG. 13 shows a sequence diagram for streaming a video conference according to an example embodiment.

FIG. 13 shows a sequence diagram for streaming a video conference according to an example embodiment. The sequence diagram of FIG. 13 depicts the interaction of the architecture in a conference scenario. This scenario is similar to the video streaming scenario, except that the data can flow in both directions. This sequence diagram will also be described in five sections, namely: (i) startup, (ii) setup, (iii) command, (iv) stream, and (v) teardown.

(i) Startup

As shown in FIG. 13A, a user calls a setup conference location (1301), and a conference list is then returned to the user (1302). A URL is then given to the receiving endpoint 102 (1303), and the receiving endpoint 102 optionally requests to get a presentation descriptor (1304 and 1305). The receiving endpoint 102 then sends, for example, a standard RTSP OPTIONS command to the sending endpoint 101 (1306). The OPTIONS command returns a list, for example, of RTSP methods available (which will contain a Software Library RTSP extension command called 'SetupPHY') (1307).

(ii) Setup

As shown in FIG. 13A, the receiving endpoint 102 calls the software library SetupPHY( ) method (1308). The software library then calls a GetProfileList( ) method of the data combiner (1309). During the process of getting the ProfileList, the data combiner calls the traffic monitor to GetTrafficStatus( ) (1310). The traffic monitor then returns a status for each of the physical interfaces in the form of a list (1311), and the resulting ProfileList is returned to the software library (1312). The ProfileList may be a list of bondable virtual interfaces, and the list of bondable virtual interfaces may be in order of preference. On the other hand, the ProfileList may be a list of physical interfaces. The software library of the receiving endpoint 102 then makes a direct RTSP call to the sending endpoint 101, sending the list (1313). The sending endpoint 101 then calls its software library's SetupPHY( ) method, passing the list (1314). The software library then calls a GetProfileList( ) method of the data splitter (1315). During the process of getting the ProfileList, the data combiner calls the traffic monitor to GetTrafficStatus( ) (1316). The traffic monitor then returns a status for each of the physical interfaces in the form of a list (1317), and the resulting ProfileList is returned to the software library (1318). The ProfileList may be a list of bondable virtual interfaces, and the list of bondable virtual interfaces may be in order of preference. On the other hand, the ProfileList may be a list of physical interfaces. The actual physical interfaces to be used for the transfer are returned to the sending endpoint 101, which includes the list of sockets to be used to send the multiple substreams, and a single socket that will be used by the sending endpoint 101 to send the data stream (1319). The single socket is an application channel 240. The sending endpoint 101 then responds to the RTSP call from step 1313, passing the actual connection information to be used to the receiving endpoint 102 (1320). This information is then passed to a ConfigurePHY( ) method of the data combiner, and used to create the socket that will be used to receive the data stream (1321). The sockets are then returned to the software library of the receiving endpoint 102 (1322), and then to the receiving endpoint 102 (1323).

(iii) Command

Figure 13B:
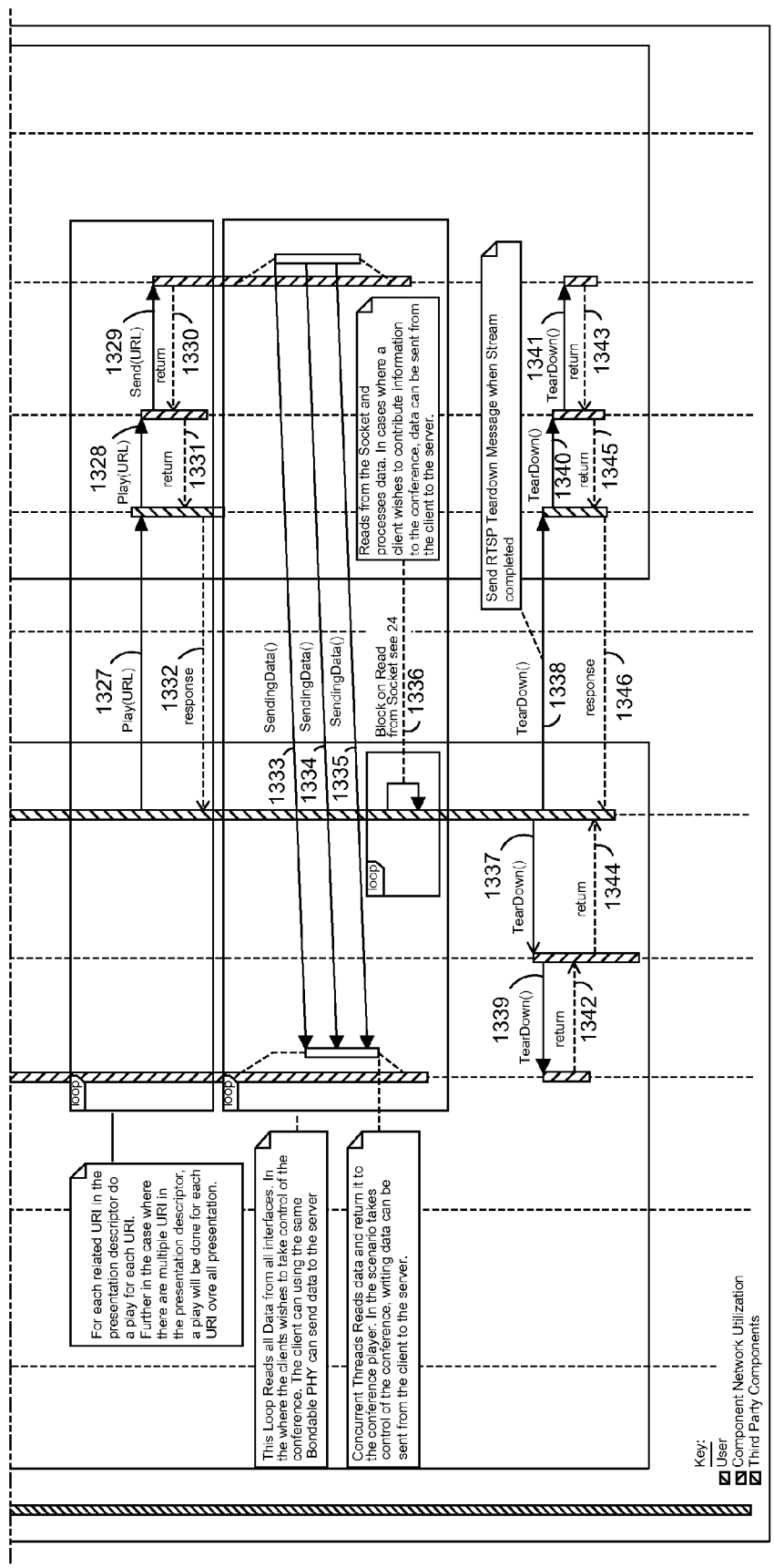

As shown in FIG. 13A, an RTSP setup command is then sent to the sending endpoint 101 (1324). Meanwhile, the data combiner is blocked, waiting for data (1325). The setup response is then returned, along with a unique SessionID (1326). As shown in FIG. 13B, the RTSP command is then sent to the sending endpoint 101, using the unique SessionID from step 1326 (1327). The sending endpoint 101 then calls a software library Play( ) method to begin playback of the data stream (1328). The software library of the sending endpoint 101 then calls the data splitter's Send( ) method (1329 and 1330). The software library Play( ) method then completes (1331), and the sending endpoint 101 responds to the RTSP play command (1332). If there is more than one stream to be played (e.g., separate audio and video streams), then steps 1324 to 1332 are then executed for each stream.

(iv) Stream

As shown in FIG. 13B, asynchronous calls are made passing portions of the data using the bondable virtual interface to transfer substreams from the sending endpoint's data splitter object over the one or more networks, to be received by the receiving endpoint's data combiner object (1333 to 1335). The sending endpoint 102 blocks, and continues to read from the single socket provided by the software library (from step 1323), with the reconstructed stream (1336).

(v) Teardown

As shown in FIG. 13B, when the receiving endpoint 102 receives the end of the data stream, the receiving endpoint calls a TearDown( ) method asynchronously, and then immediately sends an RTSP teardown command to the sending endpoint 101 (1338). The software library on the receiving endpoint 102 calls the data combiner's TearDown( ) method, and then waits for the response to the RTSP command (which will occur in step 1346) (1339, 1342 and 1344). The sending endpoint 101 then receives the RTSP teardown command and begins a similar process as used in steps 1339, 1342 and 1344, to tear down the data splitter (1340, 1341, 1343 and 1345).

In general, the entire process of FIG. 13 may occur simultaneously in the opposite direction. In other words, the process of FIG. 13 may occur in the direction from the sending endpoint to the receiving endpoint, and may also occur simultaneously in the direction from the receiving endpoint. In addition, in the process of FIG. 13, the sending endpoint and the receiving endpoint may trade roles. For example, if a viewer on a receiving endpoint takes control of a conferencing session, the software library can be used to stream inputs from this viewer (now the sending endpoint) to the receiving endpoint.

Archival Data Transfer

FIG. 14 shows a sequence diagram for streaming a data file transfer according to an example embodiment. In FIG. 14, a transfer data sequence diagram is depicted to show the interaction between the architecture components when an application wishes to transfer an amount of data to be stored on a server. For this sequence, the paradigm that is used is one of a simple URL connection, in which the inner working of the connection is similar to basic media streaming. However, instead of using a socket to communicate between the two endpoints, an input and an output stream will be used. Although the implementation of an input or output stream can be achieved via a socket, the foregoing interface is used to ensure that data flows from the sending application to the receiving server storage. This sequence diagram will be described in four sections, namely: (i) startup, (ii) connection, (iii) transfer, and (iv) disconnect.

(i) Startup

Figure 14A:
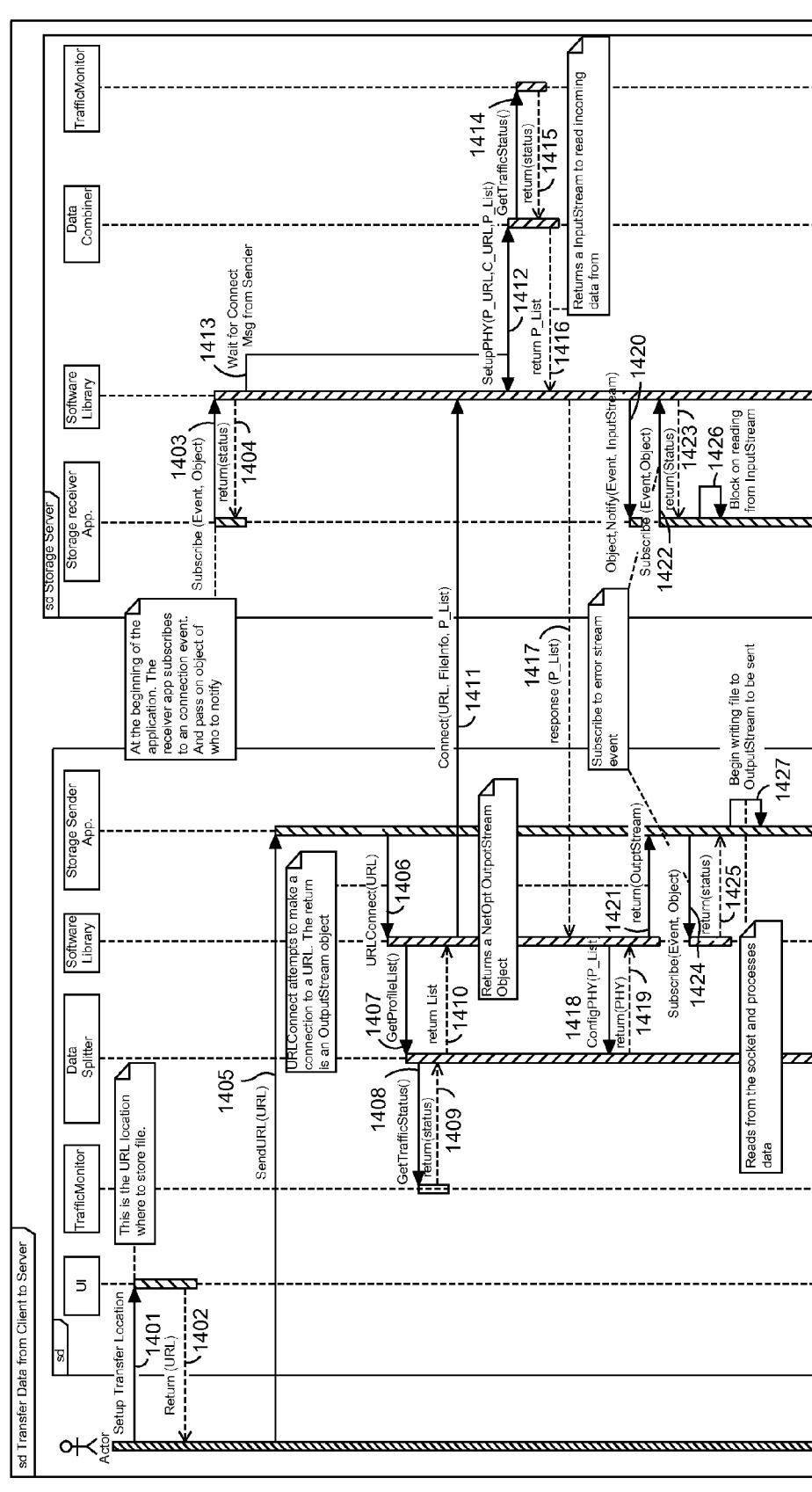
FIG. 14 shows a sequence diagram for streaming a data file transfer according to an example embodiment.

As shown in FIG. 14A, the application retrieves a URL identifying where to store the data to be transferred (1401 and 1402). The receiving endpoint 102 sustains a subscription to a connection event (1403 and 1404), and waits for an incoming connection, such as a sending endpoint connecting and sending a file (1413).

(ii) Connection

As shown in FIG. 14A, the URL is sent to the sending endpoint 101 (1405), and the sending endpoint 101 calls its software library's URLConnect( ) method (1406). The software library then calls the GetProfileList( ) method of the data splitter (1407). During the process of getting the ProfileList, the data splitter calls the traffic monitor to GetTrafficStatus( ) (1408), and the traffic monitor returns status of the physical interfaces in the form of a list (1409). The ProfileList may be a list of bondable virtual interfaces, and the list of bondable virtual interfaces may be in order of preference. On the other hand, the ProfileList may be a list of physical interfaces. The resulting ProfileList is then returned to the software library of the sending endpoint 101 (1410). The sending endpoint 101 then makes a ConnectURL call over the one or more networks to the software library of the receiving endpoint (1411). The software library then calls the GetProfileList( ) method of the data combiner (1412). During the process of getting the ProfileList, the data combiner calls the traffic monitor to GetTrafficStatus( ) (1414), and the traffic monitor returns status of the physical interfaces in the form of a list (1415). The ProfileList may be a list of bondable virtual interfaces, and the list of bondable virtual interfaces may be in order of preference. On the other hand, the ProfileList may be a list of physical interfaces. An InputStream to read incoming data is then returned to the software library of the receiving endpoint 102 (1416). Next, the receiving endpoint 102 responds to the ConnectURL call from step 1411 (1417). This information is then passed to the ConfigurePHY( ) method of the data splitter, and used to create the socket that will be used to send the data stream (1418). An OutputStream is then returned to the software library of the sending endpoint 101 (1419), and then to the sending endpoint 101 (1421). The software library of the receiving endpoint 102 then notifies the receiving endpoint 102, which is waiting (from step 1413), that a connection has been made (1420). The receiving endpoint 102 then subscribes for an error stream, to be notified of any errors encountered during reception (1422 and 1423) Likewise, the sending endpoint 101 subscribes to an error stream, to be notified of any errors encountered while sending data (1424 and 1425). The receiving endpoint 102 then blocks, waiting for data (1426).

(iii) Transfer

Figure 14B:
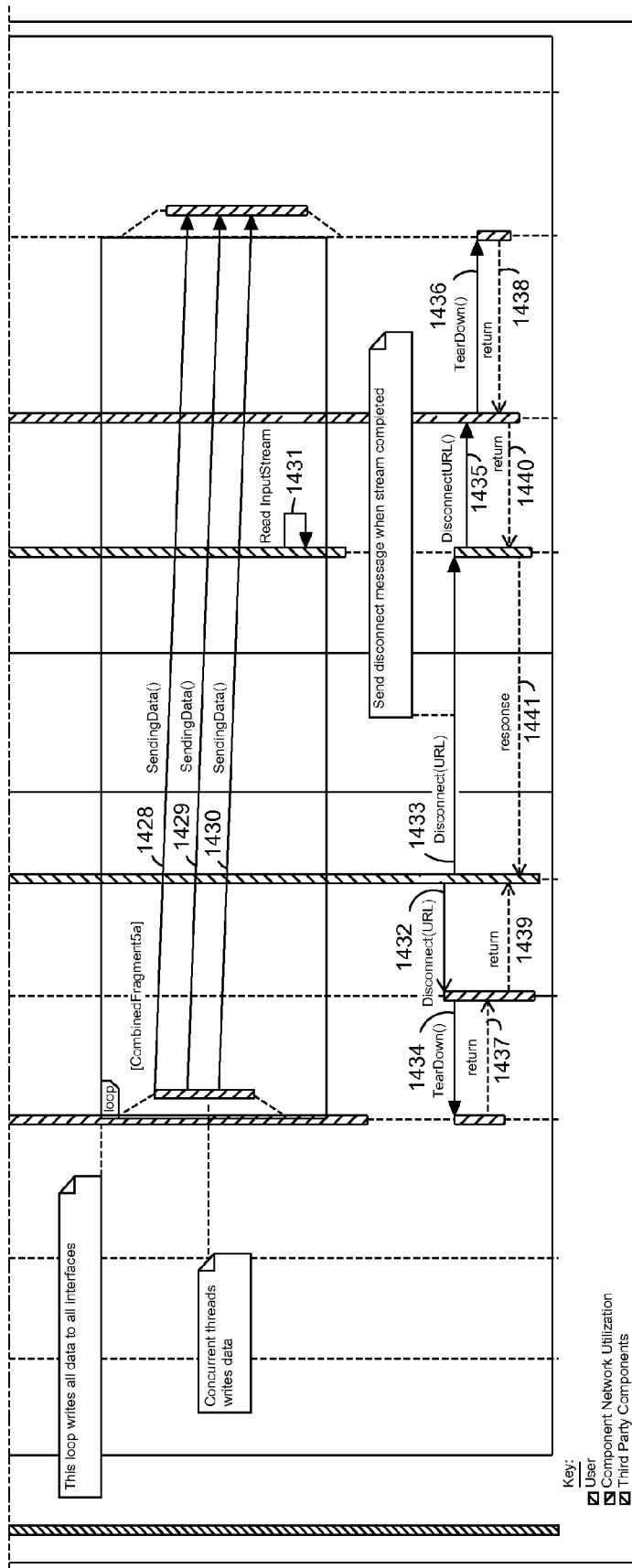

As shown in FIG. 14B, the sending endpoint 101 begins sending data on the output stream (1427). Asynchronous calls are made passing portions of the data using the bondable virtual interfaces to transfer substreams from the sending endpoint's data splitter object over the one or more networks, to be received by the receiving endpoint's data combiner object (1430). The receiving endpoint 102 then blocks, and continues to read the reconstructed data stream from the single input stream (1431).

(iv) Disconnect

As shown in FIG. 14B, when the sending endpoint 101 reaches the end of the data stream, the sending endpoint 101 calls a DisconnectURL( ) method asynchronously (1432), and then sends a Disconnect( ) command to the receiving endpoint 102 (1433). The software library of the sending endpoint 101 calls the data splitter's TearDown( ) method, and then waits for the response to the Disconnect( ) command (which will occur in step 1441) (1432, 1434, 1437 and 1439). The receiving endpoint 102 then receives the DisconnectURL command and begins a similar process as used in steps 1432, 1434, 1437 and 1439, to tear down the data combiner (1435, 1436, 1438 and 1440).

Figure 15:
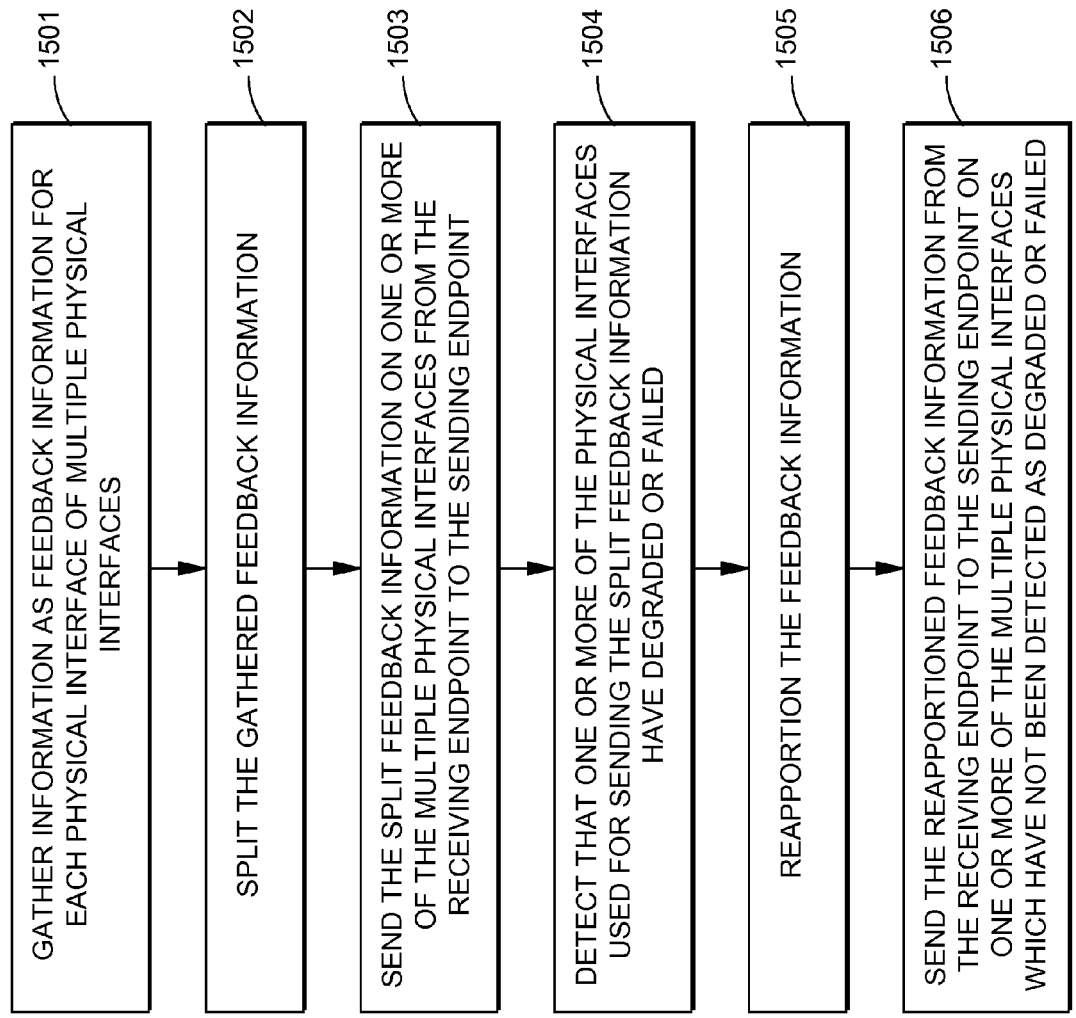
FIG. 15 is a flow chart for providing a detailed explanation of an example embodiment.

Providing Feedback Information when Network Streaming Over Multiple Physical Interfaces FIG. 15 is a flowchart for providing a detailed explanation of another example embodiment. More specifically, FIG. 15 depicts a flowchart for providing a detailed explanation of an example embodiment for providing feedback information for a data stream being sent from a sending endpoint 101 to a receiving endpoint 102 as shown in FIG. 1. Both of the sending endpoint 101 and the receiving endpoint 102 each have multiple physical interfaces (105a and 105b to 108a and 108b of FIG. 1) connecting the sending endpoint 101 and the receiving endpoint 102 to multiple networks 111 to 114 of FIG. 1, respectively. In this example embodiment, the data stream is split into a series of data packets and sent over multiple physical interfaces, such as multiple physical interfaces 105a and 105b to 108a and 108b.

As shown in FIG. 15, in block 1501, information is gathered as feedback information, by the traffic monitors 234 and 334, which includes at least a data capacity throughput for each of the multiple physical interfaces (105a to 108a) connected to the sending endpoint 101 and each of the multiple physical interfaces (105b to 108b) connected to the receiving endpoint 102. In this regard, the data capacity throughput for a physical interface is an amount of data throughput which is currently possible of being sent over the physical interface. Data capacity throughput is different from capacity. As an example, consider a case where a physical interface is connected to a network with a 100 Mbit network connection, the capacity of the physical interface is going to be 100 Mbps. However, in this same case, the data capacity throughput of the physical interface may be 40 Mbps due to, for example, other network traffic on the network.

In block 1502, the feedback information gathered at the receiving endpoint 102 is split by the bondable virtual interface 336. The split feedback information is then apportioned and sent by the bondable virtual interface on one or more of the multiple physical interfaces (105a and 105b to 108a and 108b) from the receiving endpoint 102 to the sending endpoint 101 (block 1503). In one situation, the split feedback information is sent over one of the multiple physical interfaces. For example, physical interface 105b may be selected to send the split feedback information, and all of the split feedback information would be sent over the physical interface 105b. In other situations, the split feedback information is sent over more than one of the multiple physical interfaces. For example, two or more of the physical interfaces may be selected to send the split feedback information, such as, for example, physical interfaces 106b and 107b. In this example, 50% of the split feedback information may be sent over physical interface 106b and 50% of the split feedback information may be sent over physical interface 107b. However, the apportionment of the split feedback information sent over each of the physical interfaces may vary depending on a number of factors, which will be described in more detail below in connection with block 1505. More specifically, for example, 70% of the split feedback information may be sent over the physical interface 106b and 30% of the split feedback information may be sent over physical interface 107b, or vice versa, depending on factors including, for example, a data capacity throughput for each of the physical interfaces.

A detection is then made by the traffic monitor 334 at the receiving endpoint 102 in block 1504, based on the gathered feedback information, that one or more of the physical interfaces used for sending the split feedback information have degraded or failed. For example, a physical interface may become disconnected from its respective endpoint. In this example, the disconnected physical interface has failed since data is no longer reaching the endpoint due to the disconnection. In another example, a physical interface may suffer from heavy congestion due to other network traffic. In this example, the physical interface has degraded because the heavy congestion is hindering the efficiency at which data is sent over the physical interface.

In one aspect of this example embodiment, the one or more physical interfaces are detected as degraded when a current data capacity throughput for the physical interface is below a standard deviation of an average data capacity throughput for the physical interface. The standard deviation of the average data capacity throughput is calculated from a time when the data is first sent to a time when the current data capacity is measured. The time of measurement can be an interval of time or another form based on constraints of the physical interfaces (e.g., every 10 ms, or every 10K of data received at the receiving endpoint, etc.). In another case, the one or more physical interfaces are detected as degraded when a current data capacity throughput for the physical interface is less than a known data capacity throughput of a least participating physical interface.

In block 1505, the feedback information is reapportioned by the bondable virtual interface 336. The reapportioned feedback information is then sent, in block 1506, from the receiving endpoint 102 to the sending endpoint 101 on one or more of the multiple physical interfaces which have not been detected as degraded or failed.

By virtue of the foregoing arrangement, it is ordinarily possible to provide feedback information for data being sent from a sending endpoint to a receiving endpoint in a consistent and efficient manner. More precisely, because a detection is made, based on the feedback information, of one or more of the physical interfaces used for sending the feedback information that have degraded or failed, physical interfaces which are more reliable and efficient than the degraded or failed physical interfaces may be used to send the feedback information from the receiving endpoint to the sending endpoint. Another advantageous effect resulting from the foregoing arrangement is that the feedback information may be provided so as to substantially minimize possible detrimental effects to the efficiency and quality of the streaming data, which may be caused by sending the split feedback information from the receiving endpoint to the sending endpoint. More particularly, since the feedback information is reapportioned and sent from the receiving endpoint to the sending endpoint on one or more of the multiple physical interfaces which have not been detected as degraded or failed, any further degradation which may be caused by sending the split feedback information from the receiving endpoint to the sending endpoint may be substantially reduced.

If, in block 1503, the split feedback information is sent over one of the multiple physical interfaces, then when reapportioning the feedback information in block 1505, the feedback information is apportioned from the one physical interface to a different one of the multiple physical interfaces. As an example, the feedback information may be sent in block 1503 over physical interface 105b. Then, in this example, if a detection is made in block 1504 that the physical interface 105b has degraded or failed, then the feedback information may be apportioned and sent over the physical interface 106b in block 1505. In one case, the different one of the multiple physical interfaces is a physical interface which is already being used to send data. In other cases, the different one of the multiple physical interfaces may be a physical interface which is not already being used to send data. For example, physical interfaces 105b to 107b may be currently used to send data from the sending endpoint 101 to the receiving endpoint 102, while physical interface 108b being connected to receiving endpoint 102, is not being used to send data. In this example, the different physical interface to which the feedback information is apportioned may be one of physical interfaces 105b to 107b, or may be physical interface 108b.

If, in block 1504, the one of the multiple physical interfaces used for sending the split feedback information is detected as degraded, then when reapportioning the feedback information in block 1505, a portion of the feedback information is sent over the degraded physical interface. A remaining portion of the feedback information is then apportioned from the one degraded physical interface to a different one of the multiple physical interfaces. More specifically, since the physical interface on which feedback information is being sent is detected as degraded, a portion of the feedback information can still be sent over the degraded physical interface. Thus, in this case, when reapportioning the feedback information, a portion of the feedback information such as 10%, may be sent over the degraded physical interface, while the remaining portion, namely 90%, may be sent over a different one of the multiple physical interfaces.

If, in block 1503, the split feedback information is sent over one of the multiple physical interfaces, then when reapportioning the feedback information in block 1505, the feedback information is split and apportioned over different ones of the multiple physical interfaces. In this situation, the feedback information is reapportioned from one physical interface such as physical interface 105b to multiple different physical interfaces such as physical interfaces 106b to 108b. The different ones of the multiple physical interfaces may include physical interfaces which are already being used to send data from endpoint to endpoint. Alternatively, the different ones of the multiple physical interfaces may include one or more physical interfaces which are not already being used to send data from endpoint to endpoint.

If, in block 1504 in another case, the one physical interface used to send feedback information from the receiving endpoint 102 to the sending endpoint 101 is detected as degraded, then when reapportioning the feedback information in block

1505, a portion of the feedback information is sent over the degraded physical interface. A remaining portion of the feedback information is then split and apportioned over different ones of the multiple physical interfaces. More particularly, since the physical interface on which feedback information is being sent is detected as degraded, a portion of the feedback information can still be sent over the degraded physical interface. Thus, in this case, when reapportioning the feedback information, a portion of the feedback information such as 10%, may be sent over the degraded physical interface, while the remaining portion, namely 90%, may be sent over other different ones of the multiple physical interfaces.

If, in block 1503 in yet another case, the split feedback information is sent over more than one of the multiple physical interfaces, then when reapportioning the feedback information, the feedback information is split and apportioned over different ones of the multiple physical interfaces. In this case, the split feedback information is being sent over different ones of the multiple physical interfaces, for example, 50% of the split feedback information is being sent over physical interface 105b, and 50% of the split feedback information is being sent over physical interface 106b. Then, upon detection in block 1504 that the physical interface 105b or the physical interface 106b has degraded or failed, the 50% of feedback information being sent over the degraded or failed physical interface may be reapportioned and sent over physical interface 107b. Or, the feedback information being sent over the degraded or failed physical interface may be reapportioned and sent over physical interfaces 107b and 108b. Alternatively, if the physical interface 106b is detected as degraded, then the feedback information being sent over the physical interface 106b may be reapportioned and sent over physical interfaces 105b and 108b. The different ones of the multiple physical interfaces may include physical interfaces which are already being used to send data from endpoint to endpoint. On the other hand, the different ones of the multiple physical interfaces may include one or more physical interfaces which are not already being used to send data from endpoint to endpoint.

If, in block 1504, one or more of the physical interfaces on which the split feedback information is sent are detected as degraded, then when reapportioning the feedback information in block 1505, a portion of the feedback information is sent over one or more of the degraded physical interfaces. A remaining portion of the feedback information is then split and apportioned over different ones of the multiple physical interfaces. In this case, the split feedback information is being sent over different ones of the multiple physical interfaces, for example, 50% of the split feedback information is being sent over physical interface 105b, and 50% of the split feedback information is being sent over physical interface 106b. Then, upon detection in block 1504 that the physical interface 105b or the physical interface 106b has degraded, 10 of the 50% of feedback information being sent over the degraded physical interface may still be sent over the degraded physical interface. Then, the remaining 40% of the feedback information being sent over the degraded physical interface may be reapportioned to other different ones of the multiple physical interfaces, for example, physical interfaces 107b and 108b (e.g., 20% to 107b and 20% to 108b). Alternatively, if the physical interface 106b is detected as degraded, then 10 of the 50% of feedback information may, for example, still be sent over physical interface 106b, while the remaining 40% may be apportioned and sent over, for example, physical interfaces 105b, 107b and 108b.

In some situations, in blocks 1503 and 1506, the one or more physical interfaces on which the reapportioned feedback information is sent are physical interfaces having a data capacity throughput which is a median data capacity throughput among the data capacity throughputs for each of the multiple physical interfaces. For example, if one physical interface has a data capacity throughput of 20 Mb/s, a second physical interface has a data capacity throughput of 40 Mb/s, and a third physical interface has a data capacity throughput of 60 Mb/s, then the feedback information would be sent over the second physical interface having a median data capacity throughput of the three physical interfaces. As a result, an effect on the overall data capacity throughput can possibly be minimized, because the degraded physical interfaces and the physical interfaces having a highest data capacity throughput are not used to send feedback information.

The information gathered as feedback information may further include network statistics, process information, framework information, and information regarding an external environment of the receiving endpoint 102. Network statistics may include increases and reductions in a data capacity throughput for each of the physical interfaces. Process information may be information pertaining to an operating system on the each endpoint, such as a number of processes listening on a particular physical interface, or a number of ports currently open on particular physical interface. Framework information may include, for example, bondable virtual interface statistics, such as differences in arrival time at the receiving endpoint of data packets sent substantially simultaneously over the plurality of physical interfaces. Information regarding an external environment may include, for example, a distance from a viewer to a display when streaming a movie, or light conditions surrounding the display.

In blocks 1503 and 1506, when sending split feedback information over one or more of the multiple physical interfaces, many different methods may be used to send the feedback information from the receiving endpoint 102 to the sending endpoint 101. In a simple example, the split feedback information may be sent over each of the different physical interfaces in a round-robin order. Other example methods that may be used when sending the feedback information from the receiving endpoint 101 to the sending endpoint 102 can include methods which are described in U.S. application Ser. No. 12/463,372, U.S. application Ser. No. 12/463,367, and U.S. application Ser. No. 12/471,319, each of which is incorporated by reference herein.

When apportioning in block 1505, a weighted value is assigned for each type of feedback information in accordance with a desired output for the physical interfaces used to send the split feedback information, and wherein the one or more physical interfaces used to send the reapportioned feedback information are selected based on an output value determined using the weighted values. The weighted value assigned for each type of feedback information is continuously adjusted until the output value is equal to or greater than a predetermined percentage of an expected result.

Figure 16:
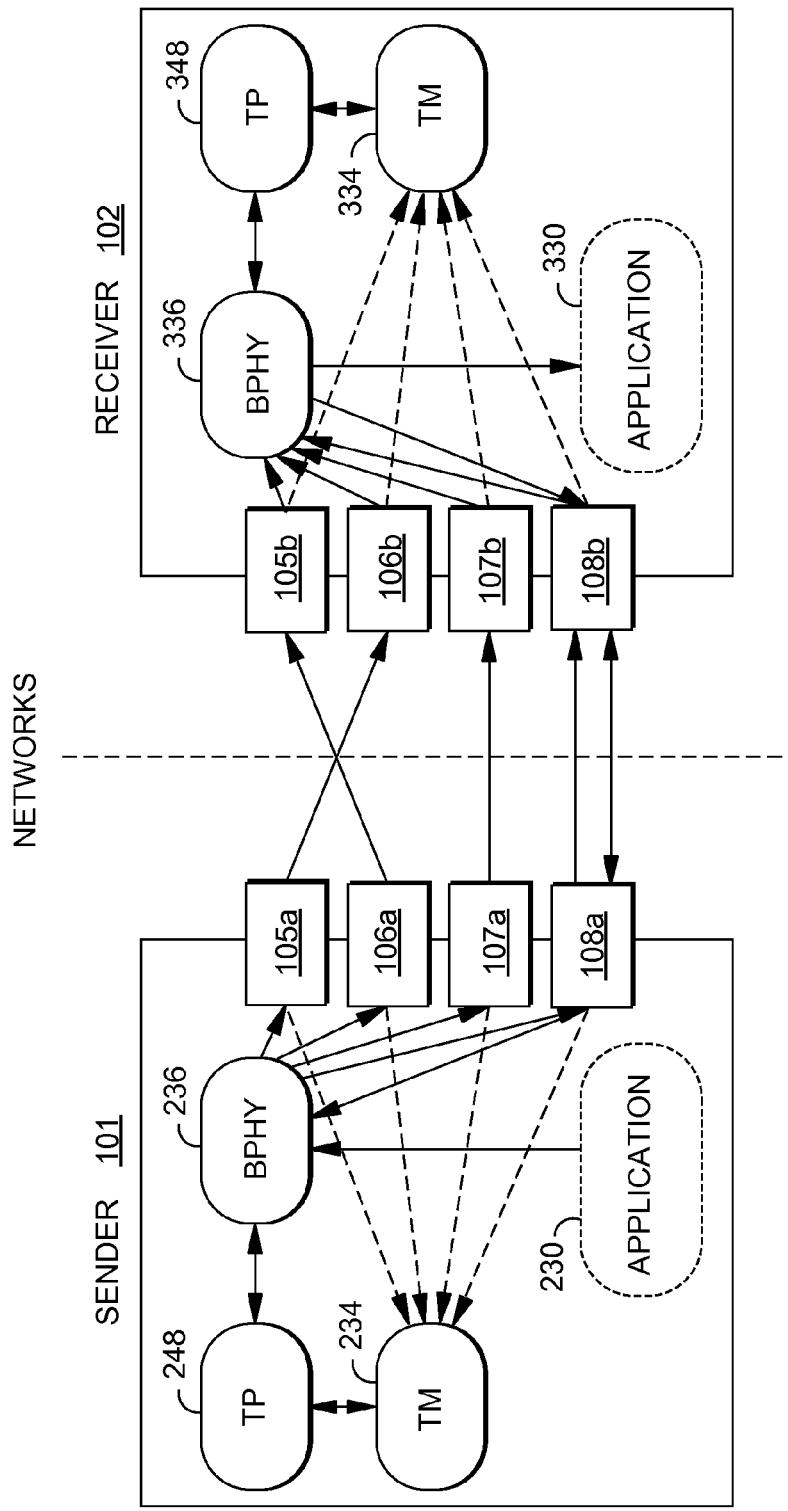
FIG. 16 shows a sending endpoint and a receiving endpoint, for providing a general explanation of an example embodiment.
Figure 17:
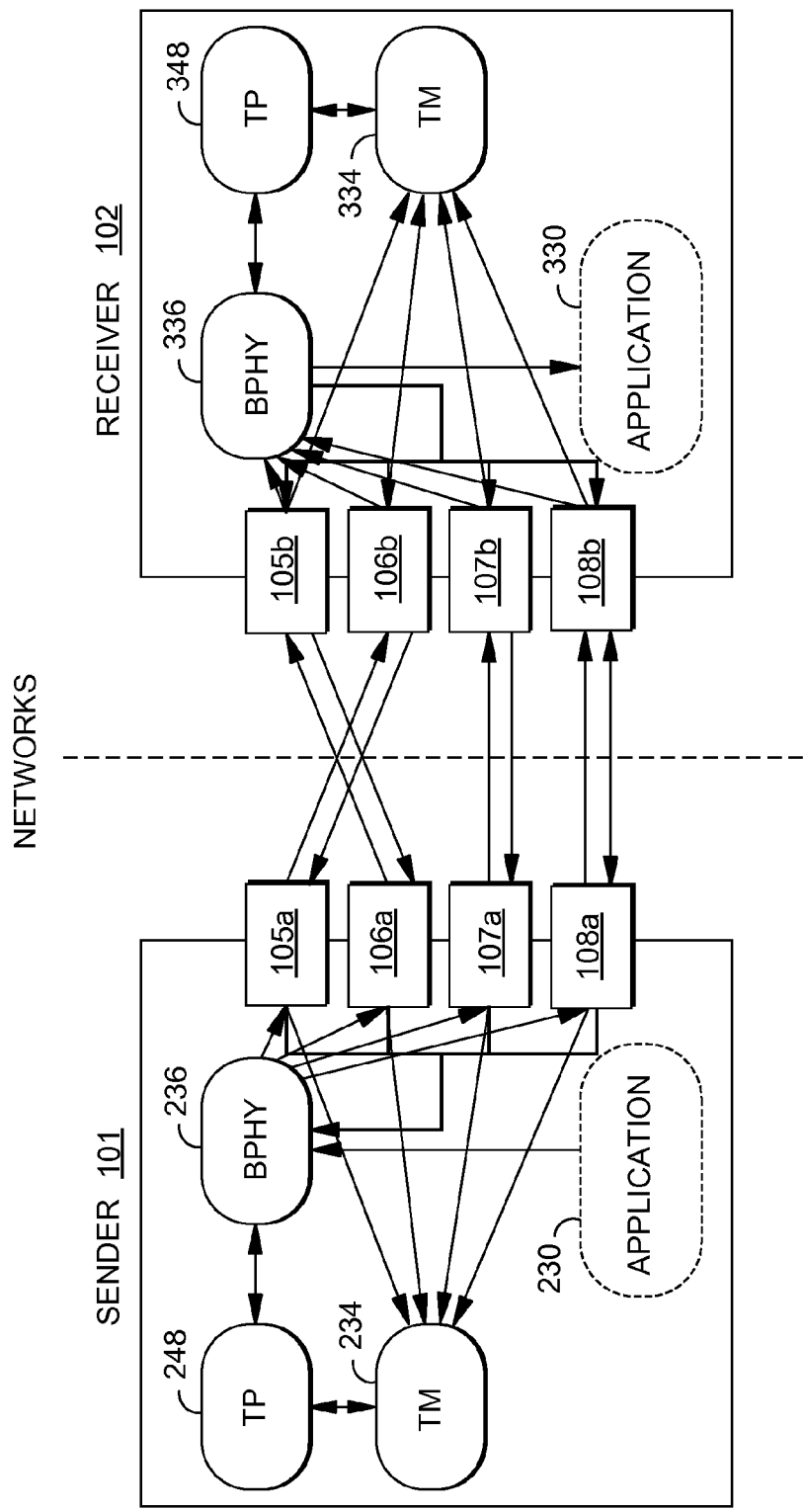
FIG. 17 shows a sending endpoint and a receiving endpoint, for providing a general explanation of another example embodiment.

FIGS. 16 and 17 show a sending endpoint 101 and a receiving endpoint 102, for providing illustrations of certain aspects described above in connection with FIG. 15. As shown in FIG. 16, application program 230 provides data to the bondable virtual interface 236. In turn, the bondable virtual interface 236 splits the data and sends the split data over the multiple physical interfaces 105a to 108a, to the multiple physical interfaces 105b to 108b at the receiving endpoint 102. As further shown in FIG. 16, the traffic monitor 234 gathers physical interface information as feedback information from each of the physical interfaces 105a to 108a. In addition, the bondable virtual interface 236 gathers information regarding data sent over the multiple physical interfaces 105a to 108a, and sends the data information to the traffic proxy 248. The traffic proxy 248 then sends the data information to the traffic monitor 234. The traffic monitor 234 then analyzes the data information provided by the bondable virtual interface 236 and the gathered information from the multiple physical interfaces 105a to 108a, and sends the analyzed information to the bondable virtual interface 234 through the traffic proxy 248. In other embodiments, the traffic monitor 234 and the bondable virtual interface 236 send information back and forth without using the traffic proxy 248.

On the receiving endpoint 102, the bondable virtual interface 336 combines data received from each of the physical interfaces 105b to 108b. In turn, the bondable virtual interface 336 sends the combined data to the application program 330. As shown in FIG. 16, the traffic monitor 334 gathers physical interface information as feedback information from each of the physical interfaces 105b to 108b. In addition, the bondable virtual interface 336 gathers information regarding data received on multiple physical interfaces 105b to 108b, and sends the data information to the traffic proxy 348. The traffic proxy 348 then sends the data information to the traffic monitor 334. The traffic monitor 334 then analyzes the data information provided by the bondable virtual interface 336 and the gathered information from the multiple physical interfaces 105b to 108b, and sends the analyzed information to the bondable virtual interface 334 through the traffic proxy 348. In other embodiments, the traffic monitor 334 and the bondable virtual interface 336 send information back and forth without using the traffic proxy 348.

In FIG. 16, the bondable virtual interface 336 sends the analyzed information received from the traffic monitor 334 as feedback information over the physical interface 108b to physical interface 108a connected to the sending endpoint 101. However, as discussed above in connection with FIG. 15, the feedback information may be sent over any one of the other physical interfaces. For example, the feedback information may be sent over the physical interface 105b to the physical interface 106a, may be sent over the physical interface 106b to the physical interface 105a, or may be sent over the physical interface 107b to 107a.

FIG. 17 shows a similar architecture as FIG. 16, and the description of such is being omitted here for the sake of brevity. In FIG. 17, the bondable virtual physical interface 336 splits the feedback information, and apportions the split feedback information the multiple physical interfaces 105b to 108b. The apportioned feedback information is then sent from the multiple physical interfaces 105b to 108b to their respective multiple physical interfaces on at the sending endpoint, namely 106a, 105a, 107a and 108a. As mentioned above in connection with FIG. 15, the number of physical interfaces used to send the feedback information can vary from 1 physical interface to 4 physical interfaces, or more.

Figure 18:
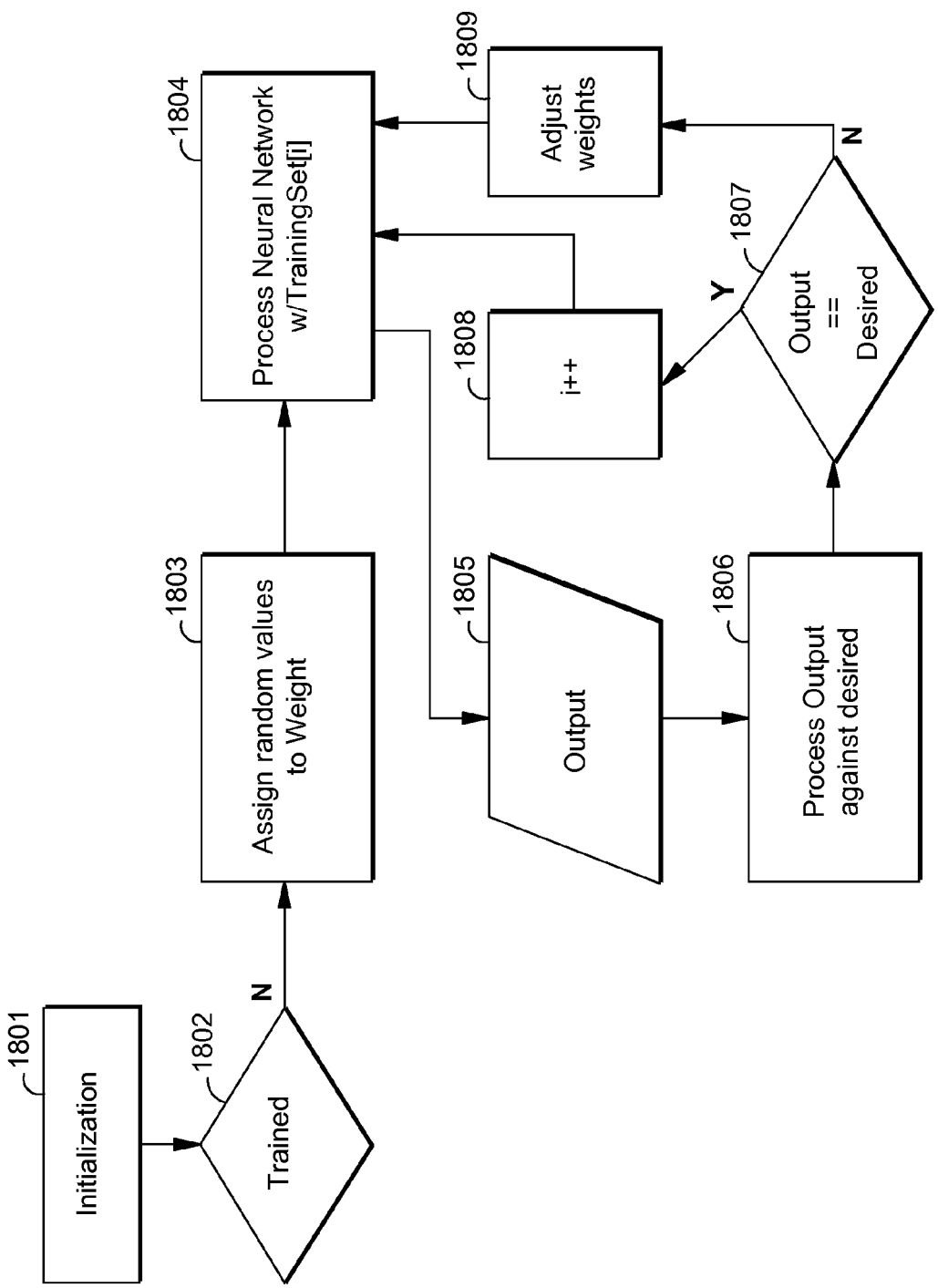
FIG. 18 is a flow chart for providing an explanation of a neural network implemented in an example embodiment.

FIG. 18 is a flow chart for providing an explanation of a neural network implemented in an example embodiment. More specifically, a neural network may used when implementing the sending of feedback information as described in detail above in connection with FIG. 15. In FIG. 18, initialization of the neural network is performed (1801), and the neural network is set to be in a training mode (1802). In this situation, training of the neural network occurs once, during development. Once the neural network is trained, values of weight which will be assigned to the types of feedback information will no longer be changed. Thus, training occurs prior to deployment of the neural network.

In block 1803, random values are assigned to weights that are attached to each type of feedback information. In block 1804, the neural network is processed using the random values assigned to weights for each type of feedback information. An output of the processed neural network for sending the feedback information over the multiple physical interfaces is then received in block 1805. In block 1806, a comparison is made as to the output from block 1805 with a desired output. If the output of block 1805 is equal to the desired output (1807), then the assigned values of weights are set for each of the types of feedback information (1808). If the output of block 1805 is not equal to the desired output (1807), then the weights are adjusted (1809), and the neural network is again processed (1804).

Figure 19:
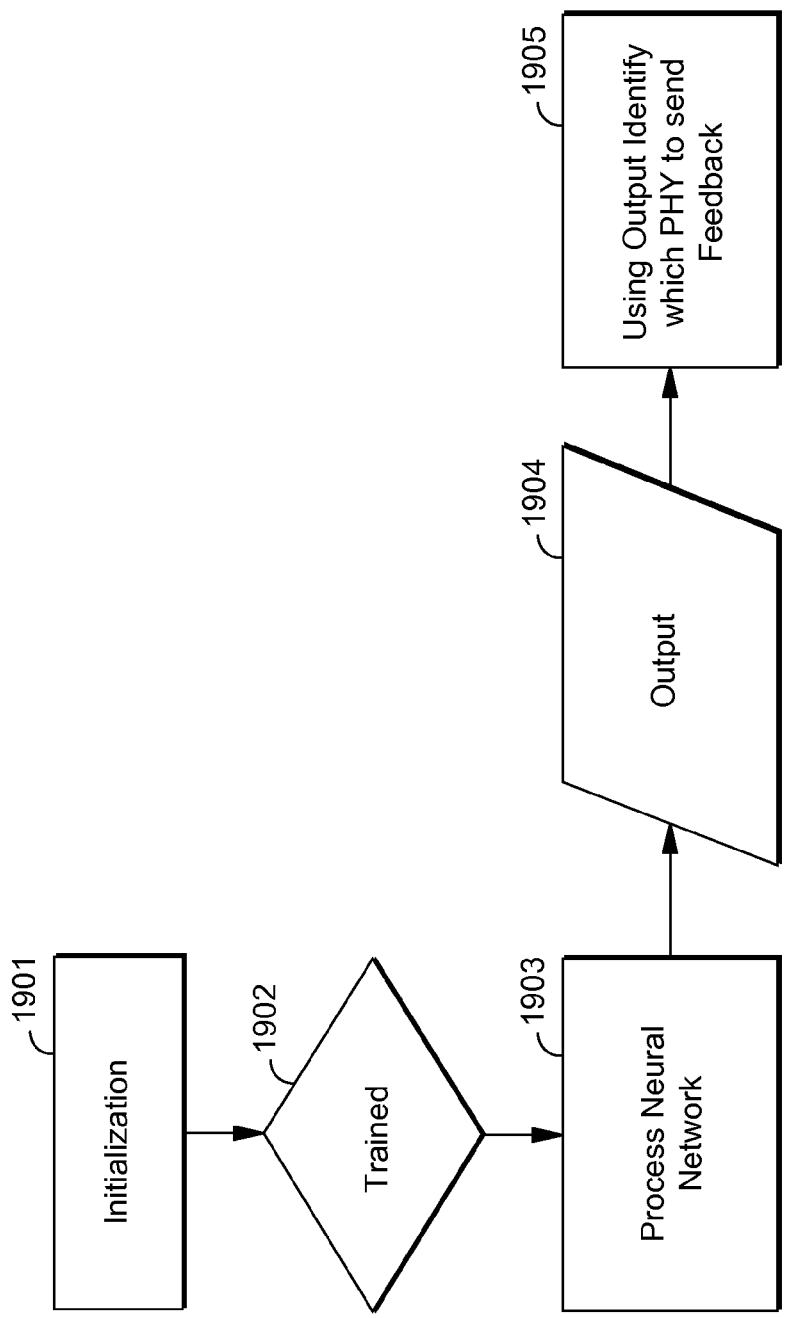
FIG. 19 is a flow chart for providing an explanation of a neural network implemented in an example embodiment.

FIG. 19 is a flow chart for providing an explanation of a neural network implemented in an example embodiment. More particularly, in FIG. 19, the neural network which is trained as described above in connection with FIG. 18 is implemented in an example embodiment. In FIG. 19, the neural network is initialized (1901), and trained as described above in connection with FIG. 18 (1902). The neural network is then processed using the assigned weight values for each of the types of feedback information (1903). In block 1904, an output is then provided from the processing in block 1903. The output is then used to determine which physical interface(s) on which to send the feedback information (1905). For example, middle output values produced by block 1904 for the plurality of physical interface may be used to send the feedback information. Alternatively, physical interfaces having neural network outputs within a high and low watermark (e.g., based on a data capacity throughput) may be used to send feedback information.

Figure 20:
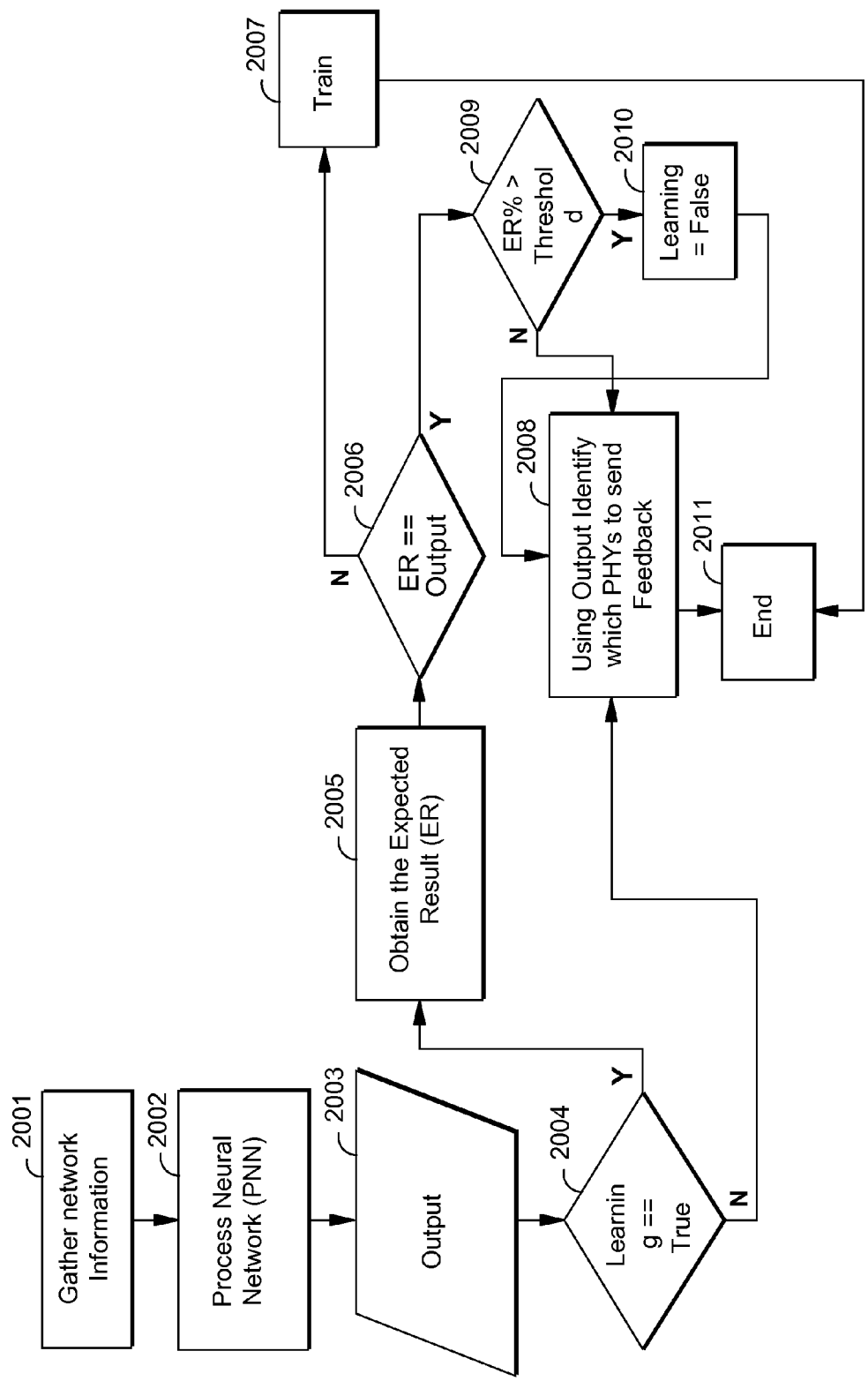
FIG. 20 is a flow chart for providing an explanation of a neural network with supervised learning implemented in an example embodiment.

FIG. 20 is a flow chart for providing an explanation of a neural network with supervised learning implemented in an example embodiment. As shown in FIG. 20, in block 2001, feedback information is gathered. The feedback information includes at least one of the types of feedback information as provided above in connection with FIG. 15. In block 2002, the gathered feedback information is processed by the neural network. In block 2003, an output is provided as a result of the processed gathered feedback information. In block 2004, a determination is made as to whether the neural network has been successfully trained. If the determination in block 2004 is positive, then the output from block 2003 is used to identify which physical interface on which to send the feedback information (2008).

If the determination in block 2004 is negative, then an expected result is obtained (2005). Then, the obtained expected result is compared with the output of block 2003 to determine if they are equal (2006). If the output is not equal to the expected result, then the neural network is re-trained (2007). If the output is equal to the expected result, then it is determined whether the expected result is greater than a predetermined threshold (2009). If the expected result is greater than the predetermined threshold, then the output of block 2003 is used to identify which physical interfaces on which to send the feedback information. If the expected result is not greater than the predetermined threshold, then learning of the neural network is determined as false (2010). The training then continues until the output matches a predetermined percentage of the expected result. In addition, the expected result may be obtained by using any number of methods such as Heuristics.

Network Streaming Over Multiple Physical Interfaces Using Feedback Information

Figure 21:
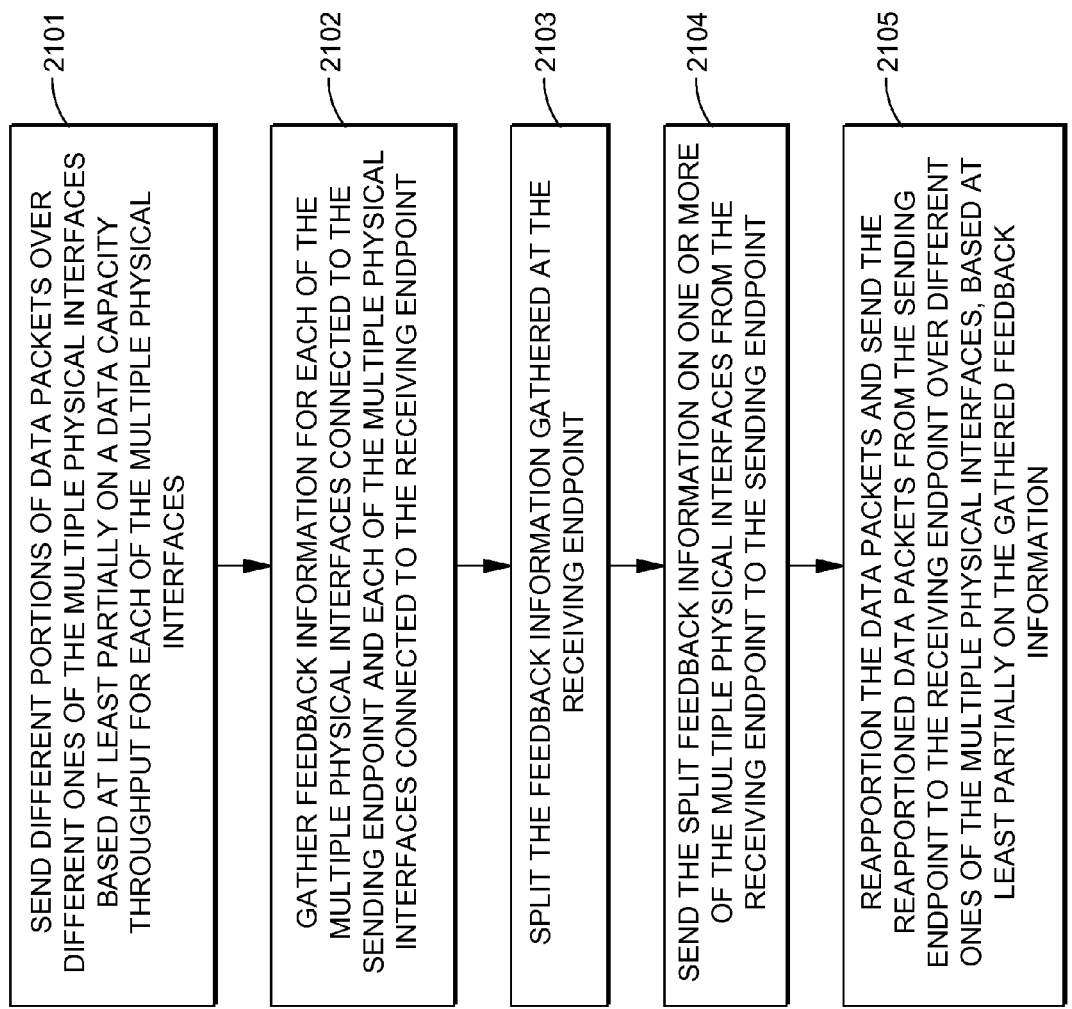
FIG. 21 is a flow chart for providing a detailed explanation of another example embodiment.

FIG. 21 is a flowchart for providing a detailed explanation of another example embodiment. More specifically, FIG. 21 depicts a flowchart for providing a detailed explanation of an example embodiment for sending a single data stream from the sending endpoint 101 to the receiving endpoint 102 based at least partially on feedback information provided by the receiving endpoint 102. Both of the sending endpoint 101 and the receiving endpoint 102 each have multiple physical interfaces (105a and 105b to 108a to 108b) connecting the sending endpoint 101 and the receiving endpoint 102 to multiple networks (111 to 114), respectively. The data stream is split into a series of data packets and sent over the multiple physical interfaces (105a and 105b to 108a to 108b).

As shown in FIG. 21, in block 2101, different portions of the data packets are sent by the bondable virtual interface 236 over different ones of the multiple physical interfaces (105a and 105b to 108a to 108b) based at least partially on a data capacity throughput for each of the multiple physical interfaces (105a and 105b to 108a to 108b). In block 2102, feedback information is gathered by the traffic monitors 234 and 334 for each of the multiple physical interfaces (105a to 108a) connected to the sending endpoint 101 and each of the multiple physical interfaces (105b to 108b) connected to the receiving endpoint 102. The feedback information includes at least the data capacity throughput for each of the multiple physical interfaces (105a and 105b to 108a to 108b).

In block 2103, the feedback information gathered at the receiving endpoint is split by bondable virtual interface 336. Then, in block 2104, the split feedback information is sent by the bondable virtual interface 336 on one or more of the multiple physical interfaces (105a and 105b to 108a to 108b) from the receiving endpoint 102 to the sending endpoint 101.

In block 2105, the data packets are reapportioned and sent by the bondable virtual interface 236 from the sending endpoint 101 to the receiving endpoint 102 over different ones of the multiple physical interfaces (105a and 105b to 108a to 108b). The reapportionment is based at least partially on the gathered feedback information for the physical interfaces (105a to 108a) connected to the sending endpoint 101 and/or the gathered feedback information for the physical interfaces (105b to 108b) connected to the receiving endpoint 102.

By virtue of the foregoing arrangement, it is ordinarily possible when sending data between endpoints of a network over multiple physical interfaces, to minimize possible negative effects on a quality and efficiency of data delivery due to changing network conditions. More precisely, because different portions of the data packets are sent over different ones of the multiple physical interfaces based at least partially on a data capacity throughput for each of the multiple physical interfaces, the multiple physical interfaces are used in an efficient manner. Moreover, since the data packets are reapportioned based at least partially on the gathered feedback information, an intelligent selection can be made as to which physical interfaces are used to send the data. Since the gathered feedback information includes feedback information for the physical interfaces connected to the sending endpoint and/or the feedback information for the physical interfaces connected to the receiving endpoint, possible negative effects on a quality and efficiency of sent data may be substantially reduced because the data is sent using knowledge of the conditions on both the sending endpoint and the receiving endpoint.

When reapportioning the data packets in block 2105, a detection is made, based on the gathered feedback information, whether one or more of the multiple physical interfaces (105a and 105b to 108a to 108b) have degraded or failed.

If one or more of the multiple physical interfaces are detected as degraded or failed, then when reapportioning the data packets in block 2105, all of the data packets being sent on the degraded one or more of the multiple physical interfaces are reapportioned. The reapportioned data packets are then sent over different ones of the multiple physical interfaces (105a and 105b to 108a to 108b) which have not been detected as degraded or failed. As an example, 50% of the data packets may be sent over the physical interface 105a at the sending endpoint 101 to the physical interface 106b at the receiving endpoint 102, and 50% of the data packets may be sent over the physical interface 106a at the sending endpoint 101 to the physical interface 105b at the receiving endpoint 102. In this example, if the physical interface 105a or the physical interface 106b is detected as degraded or failed, then the 50% of data packets being sent over the degraded or failed physical interface are reapportioned and sent over one physical interface, for example, physical interface 107a. Or, the 50% of data packets being sent over the degraded or failed physical interface are reapportioned and sent over multiple ones of the physical interfaces, for example, physical interfaces 107a and 108a. In this scenario, 10% of the data may be apportioned to physical interface 107a and 40% of the data may be apportioned to physical interface 108a, or vice versa, depending on, for example, a data capacity throughput for each of the physical interfaces.

In another aspect of this example embodiment, if one or more of the multiple physical interfaces are detected as degraded, then when reapportioning the data packets in block 2105, a percentage of the data packets are sent over the degraded one or more physical interfaces. A remaining percentage of the data packets are then reapportioned and sent over one or different ones of the multiple physical interfaces which have not been detected as degraded or failed. More specifically, since the physical interface on which the data packets is being sent is detected as degraded, a portion of the data packets can still be sent over the degraded physical interface. Thus, in this case, when reapportioning the data packets, a portion of the data packets such as 10%, may be sent over the degraded physical interface, while the remaining portion, namely 90%, may be sent over a different one or different ones of the multiple physical interfaces.

Alternatively, if one or more of the multiple physical interfaces are detected as degraded or failed, then when reapportioning the data packets in block 2105, all of the data packets are reapportioned and sent over one of the multiple physical interfaces which has not been detected as degraded or failed. This may be the case if, for example, one physical interface is more reliable than the other physical interfaces because the physical interface is a wired connection, and the other physical interfaces are wireless connections. In this case, it may be beneficial to send all of the reapportioned data on the reliable physical interface, so as to ensure reliability when streaming the data.

In a case that one or more of the multiple physical interfaces which are detected as degraded or failed are revived and are no longer detected as degraded or failed, an amount of data packets that was apportioned away from the degraded one or more physical interfaces is reapportioned back to the revived one or more of the multiple physical interfaces. For example, if 20% of data packets were reapportioned away from a physical interface that was detected as degraded or failed, and the physical interface is later observed to be functioning back at its non-degraded or non-failed state, then the 20% of data packets apportioned away from the physical interface may be apportioned back to the physical interface. As a result, it possible to efficiently utilize the multiple physical interfaces because by apportioning the percentage of data packets back to the physical interface reduces additional congestion incurred on the other physical interfaces.

When reapportioning the data packets in block 2105, the reapportioned data packets may be sent over different ones of the multiple physical interfaces which are already being used to send data from the sending endpoint 101 to the receiving endpoint 102. Alternatively, when reapportioning the data packets in block 2105, the reapportioned data packets may be sent over different ones of the multiple physical interfaces which include one or more physical interfaces which are not already being used to send data from the sending endpoint 101 to the receiving endpoint 102.

In one aspect of this example embodiment, if the data capacity throughput for one or more of the physical interfaces is reduced as indicated by the feedback information, then an apportionment of data packets sent over the one or more physical interfaces with the reduced data capacity throughput is reduced in proportion with the reduction in data capacity throughput. On the other hand, if the data capacity throughput for one or more of the physical interfaces is increased as indicated by the feedback information, and if the data capacity throughput of the other physical interfaces is not changed, then an apportionment of data packets sent over the one or more physical interfaces with the increased data capacity throughput is increased in proportion with the increase in data capacity throughput. For example, if the feedback information indicates that a data capacity throughput for a physical interface has reduced from 100 Mb/s to 50 Mb/s, then a reduction may be made as to an amount of data packets being sent over the physical interface in proportion to the reduction in data capacity throughput. Thus, in this example, the amount of data packets being sent over the physical interface would be reduced by 50%.

The feedback information may further include process information for each of the multiple physical interfaces. If a change in the process information indicates that an apportionment of data sent on one or more of the multiple physical interfaces should be increased or decreased, then the apportionment of data sent over the one or more physical interfaces is increased or decreased in accordance with the indication. For example, the process information may indicate that a large number of processes are listening on a particular physical interface. In this case, the process information may indicate that less data should be sent over the particular physical interface because the physical interface could become congested due to the large number of processes. Thus, in this situation, the apportionment of data sent over the particular physical interface would be reduced.

Moreover, the feedback information may further include framework information regarding the multiple physical interfaces. If a change in the framework information indicates that an apportionment of data sent on one or more of the multiple physical interfaces should be increased or decreased, then the apportionment of data sent over the one or more physical interfaces is increased or decreased in accordance with the indication. For example, the framework information may indicate that data being sent over a first physical interface is being received quicker than data that is sent over a second physical interface, in which the data is sent over the first and second physical interfaces substantially simultaneously. In this case, the framework information may indicate that less data should be sent over the slower physical interface. Thus, in this example, the apportionment of data sent over the slower physical interface would be reduced.

In addition, the feedback information may further include information regarding an external environment of the receiving endpoint 102. If a change in the external environment information indicates that an apportionment of data sent on one or more of the multiple physical interfaces should be increased or decreased, then the apportionment of data sent over the one or more physical interfaces is increased or decreased in accordance with the indication. For example, the information regarding an external environment of the receiving endpoint 102 may indicate that a viewer is a particular distance away from a display connected to the endpoint, such that a quality of the streaming video may be reduced without the viewer noticing a change in quality of the display. In this case, the external environment information may indicate that an apportionment of data over all of the physical interfaces may be reduced. Thus, in this situation, the apportionment of data sent over all of the physical interfaces would be reduced in accordance with the indication. More examples of situations where information regarding an external environment may be deemed pertinent to the apportionment of data sent over the physical interfaces can be found in U.S. application Ser. No. 12/416,059, U.S. application Ser. No. 12/416,066, and U.S. application Ser. No. 12/416,071, each of which are incorporated by reference herein.

The feedback information for each of the multiple physical interfaces 105a to 108a connected to the sending endpoint 101 may be gathered periodically. Alternatively, the feedback information for each of the multiple physical interfaces 105a to 108a connected to the sending endpoint 101 may be gathered when requested by the receiving endpoint 102. Or, the feedback information for each of the multiple physical interfaces 105a to 108a connected to the sending endpoint 101 may be gathered when the split feedback information sent from the receiving endpoint 102 is received by the sending endpoint 101.

Figures 22, 23, 24A:
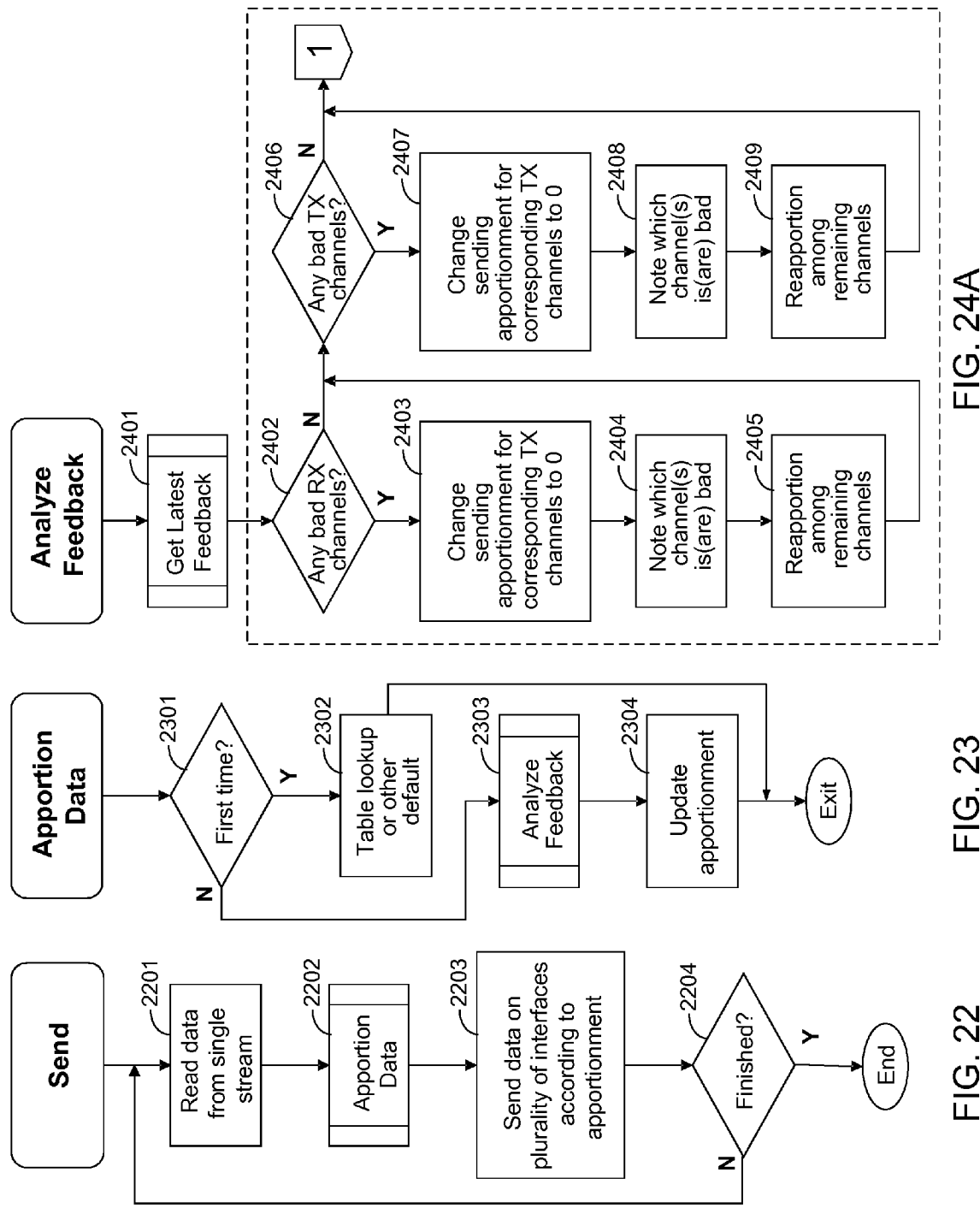

FIGS. 22 to 27 are detailed sequential conditional logic flow diagrams for implementing the process described above in connection with FIG. 21 according to one example embodiment. In other example embodiments, a neural network may be used instead of the sequential conditional logic. In FIG. 22, a single data stream is read at the sending endpoint 101 (2201). In block 2202, data of the read single data stream is apportioned to different ones of the plurality of physical interfaces. The data is sent over the plurality of physical interfaces according to the apportionment (2203). In block 2204, if the sending of data is finished, then the process ends. If in block 2204 the sending of data is not finished, then the process returns to block 2201.

FIG. 23 is a flow chart for describing block 2202 of FIG. 22 in greater detail. In FIG. 23, a determination is made as to whether this is a first instance of sending data over the physical interfaces for the single data stream (2301). If this is the first instance, then a default apportionment such as from a table lookup or other default is used to apportion the data (2302). If this is not the first instance, then feedback information gathered at the receiving endpoint and feedback information gathered at the sending endpoint is analyzed (2303). Then, the apportionment of data over the plurality of physical interfaces is updated in accordance with the analyzed feedback information (2304).

Figure 24B:
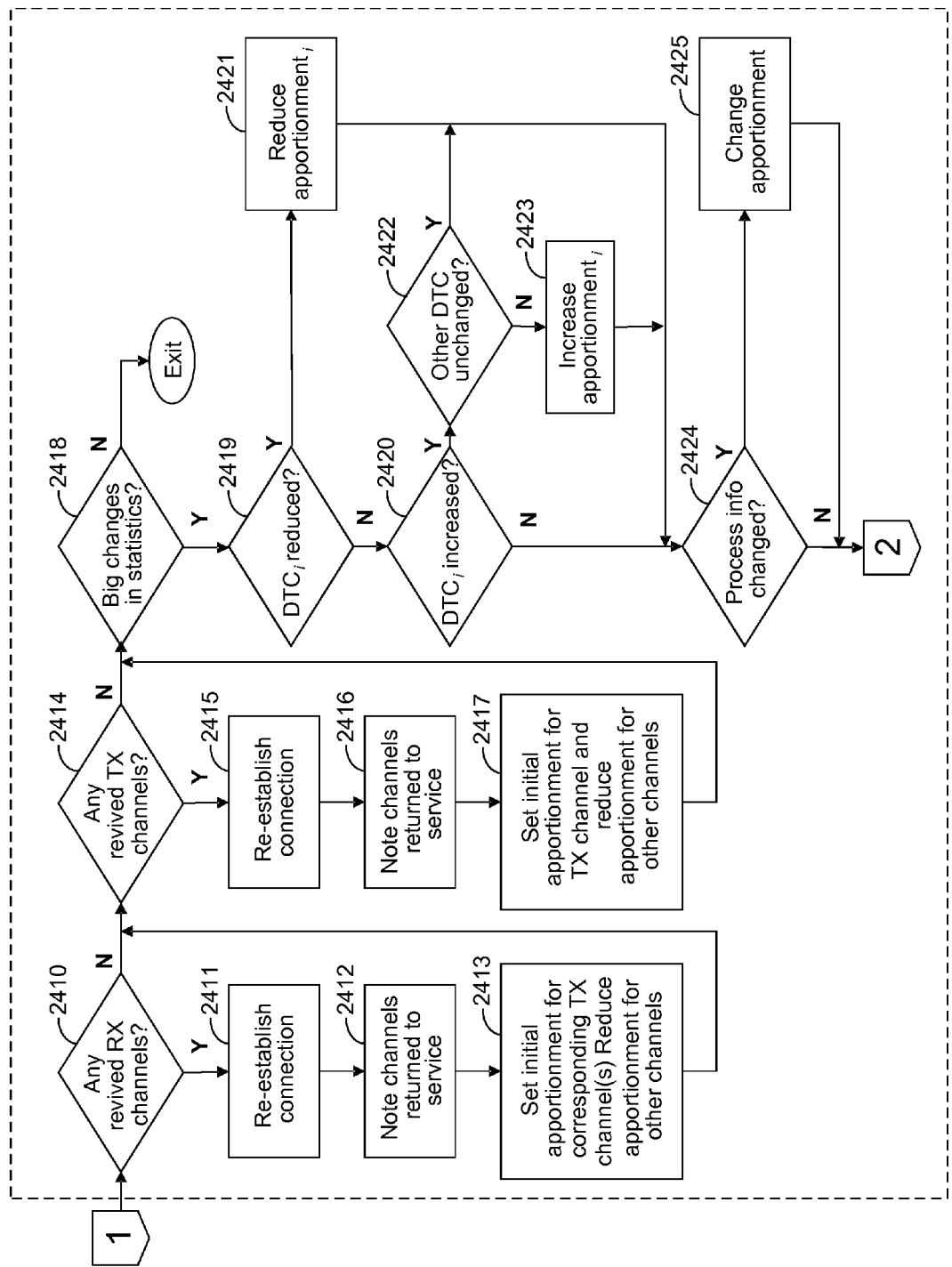

FIGS. 24A to 24C show flow charts for describing block 2303 of FIG. 23 in greater detail. In FIG. 24A, the latest feedback information is gathered from the sending endpoint 101 and the receiving endpoint 102 (2401). Based on the gathered feedback information, a determination is made as to whether one or more of the physical interfaces at the receiving endpoint have degraded or failed (2402). If the determination in block 2402 is positive, then the apportionment of data is changed to zero for physical interface(s) at the sending endpoint which correspond to the bad physical interface(s) at the receiving endpoint (2403). A note is then made as to the physical interfaces which were determined as degraded or failed (2404). The data is then reapportioned over the remaining physical interfaces at the sending endpoint (2404), and the process proceeds to block 2406. If in block 2402 the determination is negative, then the process proceeds to block 2406.

In block 2406, a determination is made as to whether one or more of the physical interfaces at the sending endpoint have degraded or failed. If the determination is positive in block 2406, then the apportionment of data is changed to zero for the physical interface(s) at the sending endpoint which were determined as degraded or failed (2407). A note is then made as to the physical interfaces which were determined as degraded or failed (2408). The data is then reapportioned over the remaining physical interfaces at the sending endpoint (2409), and the process proceeds to block 2410. If the determination in block 2406 is negative, then the process proceeds to block 2410.

In block 2410, a determination is made as to whether one or more of the physical interfaces at the receiving endpoint that were determined as failed, have been revived. If the determination in block 2410 is positive, then a connection with the one or more physical interfaces is re-established (2411), and a note is made as to the one or more physical interfaces that have returned to service (2412). The apportionment of data over the physical interface(s) at the sending endpoint which correspond to the physical interface(s) at the receiving endpoint that have returned to service is then set to the initial apportionment, and the remaining apportionment of data to the other physical interfaces at the sending endpoint is reduced to the initial apportionment (2413). The process then proceeds to block 2414. If the determination in block 2410 is negative, then the process proceeds to block 2414.

In block 2414, a determination is made as to whether one or more of the physical interfaces at the sending endpoint that were determined as failed, have been revived. If the determination in block 2414 is positive, then a connection with the one or more physical interfaces is re-established (2415), and a note is made as to the one or more physical interfaces that have returned to service (2416). The apportionment of data over the physical interface(s) at the sending endpoint that have returned to service is then set to the initial apportionment, and the remaining apportionment of data to the other physical interfaces at the sending endpoint is reduced to the initial apportionment (2417). The process then proceeds to block 2418. If the determination in block 2414 is negative, then the process proceeds to block 2418.

In block 2418, a determination is made as to whether a change in network statistics has occurred. If the determination is positive in block 2418, then a determination is made as to whether a data capacity throughput for one or more of the physical interfaces has reduced (2419). If the determination is positive in block 2419, then a reduction in apportionment is made of data over of the physical interfaces with a reduced data capacity throughput (2421), and the process proceeds to block 2424. If the determination in block 2419 is negative, then a determination is made as to whether a data capacity throughput for one or more of the physical interfaces has increased (2420). If the determination is negative in block 2420, then the process proceeds to block 2424. If the determination in block 2420 is positive, then a determination is made as to whether a data capacity throughput of the other physical interfaces has changed (2422). If the determination in block 2422 is positive, then the process proceeds to block 2424. If the determination in block 2422 is negative, then the apportionment of data is increased over the one or more physical interfaces with increased data capacity throughput (2423). The process then proceeds to block 2424.

In block 2424, a determination is made as to whether process information has changed. If the determination in block 2424 is positive, then the apportionment of data over the plurality of physical interfaces is changed in accordance with the change in process information (2425). Then, the process proceeds to block 2426. If the determination is negative in block 2424, then the process proceeds to block 2426.

In block 2426, a determination is made as to whether framework information has changed. If the determination is positive in block 2426, then the apportionment of data over the plurality of physical interfaces is changed in accordance with the change in framework information (2427). Then, the process proceeds to block 2428. If the determination in block 2426 is negative, then the process proceeds to block 2428.

In block 2428, a determination is made as to whether external environment information has changed. If the determination is positive in block 2428, then the apportionment of data over the plurality of physical interfaces is changed in accordance with the change in external environment information (2429). Then, the process proceeds to block 2430. If the determination in block 2428 is negative, then the process proceeds to block 2430. In block 2430, any other information provided in the feedback information is evaluated.

FIG. 25 is a flow chart for describing block 2401 of FIG. 24 in greater detail. In FIG. 25, local statistics are gathered for each of the physical interfaces at the sending endpoint 101 (2501). The local statistics may include, for example, an average data capacity throughput, a standard deviation of the data capacity throughput, etc. The local statistics may be gathered when the sending endpoint 101 is requested to gather the statistics. Or, the statistics may be gathered by the sending endpoint 101 periodically, or simply when the sending endpoint 101 receives feedback information from the receiving endpoint 102.

In block 2502, a determination is made at the sending endpoint 101 whether feedback information has been received from the receiving endpoint 102. If the determination is positive in block 2502, then the statistics are updated for each of the physical interfaces at the receiving endpoint 102. If the determination in block 2502 is negative, then the process is exited.

FIGS. 26 and 27 are flow charts for providing a detailed explanation of adding a new physical interface to a bondable virtual interface. In FIG. 26, if a problem is identified by the receiving endpoint 102 with a particular physical interface at the receiving endpoint 102 (2601), then feedback information is sent to the sending endpoint indicating new physical interface and port information to connect to, and a last segment of data read by the receiving endpoint 102 on the particular physical interface (2602). A problem may be identified on a particular interface using a high or low watermark of a data capacity throughput, using predictive models when a problem occurs, such as a neural network with time series or Bayesian statistics, etc., or by using Heuristic methods or statistics information from an input.

In block 2603, the sending endpoint 101 connects to the new physical interface and port, updates an apportionment of data over the multiple physical interfaces to include the new physical interface, and resends data over the physical interfaces. Also in block 2603, an apportionment of data to the particular physical interface with an identified problem is set to zero.

In FIG. 27, if a problem is identified by the sending endpoint 101 with a particular physical interface at the sending endpoint 101 (2701), then the sending endpoint 101 sets an apportionment of data to zero for the particular physical interface (2702). The sending endpoint 101 then identifies that a zero apportionment has been applied to the particular interface using either a flag or other method to indicate a problem with the physical interface (2703). The process described in connection with FIG. 26 is then performed.

This disclosure has provided a detailed description with respect to particular illustrative embodiments. It is understood that the scope of the appended claims is not limited to the above-described embodiments and that various changes and modifications may be made by those skilled in the relevant art without departing from the scope of the claims.

What is claimed is:

1. A method for providing feedback information for a data stream being sent from a sending endpoint to a receiving endpoint, wherein both of the sending endpoint and the receiving endpoint each have multiple physical interfaces connecting the sending endpoint and the receiving endpoint to multiple networks, respectively, and the data stream is split into a series of data packets and sent over the multiple physical interfaces, the method comprising:

gathering information as feedback information which includes at least a data capacity throughput for each of the multiple physical interfaces connected to the sending endpoint and each of the multiple physical interfaces connected to the receiving endpoint;

splitting the feedback information gathered at the receiving endpoint and sending the split feedback information substantially simultaneously on more than one of the multiple physical interfaces from the receiving endpoint to the sending endpoint;

detecting, based on the feedback information, that one or more of the physical interfaces used for sending the split feedback information have degraded or failed; and reapportioning the feedback information and sending the reapportioned feedback information from the receiving endpoint to the sending endpoint substantially simultaneously on more than one of the multiple physical interfaces which have not been detected as degraded or failed, wherein when reapportioning the feedback information, the feedback information is apportioned from the more than one of the physical interfaces to a different one of the multiple physical interfaces, and wherein the different one of the multiple physical interfaces is detected as degraded, and when reapportioning the feedback information, a portion of the feedback information is sent over the degraded physical interface, and a remaining portion of the feedback information is apportioned from the one degraded physical interface to a different one of the multiple physical interfaces.

2. A method according to claim 1, wherein the different one of the multiple physical interfaces is a physical interface which is already being used to send data.

3. A method according to claim 1, wherein the different one of the multiple physical interfaces is a physical interface which is not already being used to send data.

4. A method according to claim 1, wherein when reapportioning the feedback information, the feedback information is split and apportioned over different ones of the multiple physical interfaces.

5. A method according to claim 4, wherein the different ones of the multiple physical interfaces include physical interfaces which are already being used to send data.

6. A method according to claim 4, wherein the different ones of the multiple physical interfaces include one or more physical interfaces which are not already being used to send data.

7. A method according to claim 4, wherein the one physical interface is detected as degraded, and when reapportioning the feedback information, a portion of the feedback information is sent over the degraded physical interface, and a remaining portion of the feedback information is split and apportioned over different ones of the multiple physical interfaces.

8. A method according to claim 1, wherein one or more of the physical interfaces on which the split feedback information is sent are detected as degraded, and when reapportioning the feedback information, a portion of the feedback information is sent over one or more of the degraded physical interfaces, and a remaining portion of the feedback information is split and apportioned over different ones of the multiple physical interfaces.

9. A method according to claim 1, wherein the more than one of the physical interfaces on which the reapportioned feedback information is sent are physical interfaces having a data capacity throughput which is a median data capacity throughput among the data capacity throughputs for each of the multiple physical interfaces.

10. A method according to claim 1, wherein the information gathered as feedback information further comprises at least one of network statistics, process information, framework information, and information regarding an external environment of the receiving endpoint.

11. A method according to claim 10, wherein a weighted value is assigned for each type of feedback information in accordance with a desired output for the physical interfaces used to send the split feedback information, and wherein the one or more physical interfaces used to send the reapportioned feedback information are selected based on an output value determined using the weighted values.

12. A method according to claim 11, wherein the weighted value assigned for each type of feedback information is continuously adjusted until the output value is equal to or greater than a predetermined percentage of an expected result.

13. A method according to claim 1, wherein the one or more physical interfaces are detected as degraded when a current data capacity throughput for the physical interface is below a standard deviation of an average data capacity throughput for the physical interface, and wherein the standard deviation of the average data capacity throughput is calculated from a time when the data is first sent to a time when the current data capacity is measured.

14. A method according to claim 1, wherein the one or more physical interfaces are detected as degraded when a current data capacity throughput for the physical interface is less than a known data capacity throughput of a least participating physical interface.

15. A method according to claim 1, wherein a neural network is used when sending the feedback information from the receiving endpoint to the sending endpoint.

16. A method for providing feedback information for a data stream being sent from a sending endpoint to a receiving endpoint, wherein both of the sending endpoint and the receiving endpoint each have multiple physical interfaces connecting the sending endpoint and the receiving endpoint to multiple networks, respectively, and the data stream is split into a series of data packets and sent over the multiple physical interfaces, and wherein in the method the receiving endpoint performs the steps of:

gathering information as feedback information which includes at least a data capacity throughput for each of the multiple physical interfaces connected to the receiving endpoint;

splitting feedback information gathered at the receiving endpoint and sending the split feedback information substantially simultaneously on more than one of the multiple physical interfaces to the sending endpoint;

detecting whether one or more of the physical interfaces used for sending the split feedback information have degraded or failed, based on the feedback information; and reapportioning the feedback information and sending the reapportioned feedback information to the sending endpoint substantially simultaneously on more than one of the multiple physical interfaces which have not been detected as degraded or failed, wherein when reapportioning the feedback information, the feedback information is apportioned from the more than one of the physical interfaces to a different one of the multiple physical interfaces, and wherein the different one of the multiple physical interfaces is detected as degraded, and when reapportioning the feedback information, a portion of the feedback information is sent over the degraded physical interface, and a remaining portion of the feedback information is apportioned from the one degraded physical interface to a different one of the multiple physical interfaces.

17. A method according to claim 16, wherein the different one of the multiple physical interfaces is a physical interface which is already being used to send data.

18. A method according to claim 16, wherein the different one of the multiple physical interfaces is a physical interface which is not already being used to send data.

19. A method according to claim 16, wherein when reapportioning the feedback information, the feedback information is split and apportioned over different ones of the multiple physical interfaces.

20. A method according to claim 19, wherein the different ones of the multiple physical interfaces include physical interfaces which are already being used to send data.

21. A method according to claim 19, wherein the different ones of the multiple physical interfaces include one or more physical interfaces which are not already being used to send data.

22. A method according to claim 19, wherein the one physical interface is detected as degraded, and when reapportioning the feedback information, a portion of the feedback information is sent over the degraded physical interface, and a remaining portion of the feedback information is split and apportioned over different ones of the multiple physical interfaces.

23. A method according to claim 16, wherein one or more of the physical interfaces on which the split feedback information is sent are detected as degraded, and when reapportioning the feedback information, a portion of the feedback information is sent over one or more of the degraded physical interfaces, and a remaining portion of the feedback information is split and apportioned over different ones of the multiple physical interfaces.

24. A method according to claim 16, wherein the more than one of the physical interfaces on which the reapportioned feedback information is sent are physical interfaces having a data capacity throughput which is a median data capacity throughput among the data capacity throughputs for each of the multiple physical interfaces.

25. A method according to claim 16, wherein the information gathered as feedback information further comprises at least one of network statistics, process information, framework information, and information regarding an external environment of the receiving endpoint.

26. A method according to claim 25, wherein a weighted value is assigned for each type of feedback information in accordance with a desired output for the physical interfaces used to send the split feedback information, and wherein the one or more physical interfaces used to send the reapportioned feedback information are selected based on an output value determined using the weighted values.

27. A method according to claim 26, wherein the weighted value assigned for each type of feedback information is continuously adjusted until the output value is equal to or greater than a predetermined percentage of an expected result.

28. A method according to claim 16, wherein the one or more physical interfaces are detected as degraded when a current data capacity throughput for the physical interface is below a standard deviation of an average data capacity throughput for the physical interface, and wherein the standard deviation of the average data capacity throughput is calculated from a time when the data is first sent to a time when the current data capacity is measured.

29. A method according to claim 16, wherein the one or more physical interfaces are detected as degraded when a current data capacity throughput for the physical interface is less than a known data capacity throughput of a least participating physical interface.

30. A method for providing feedback information for a data stream being sent from a sending endpoint to a receiving endpoint, wherein both of the sending endpoint and the receiving endpoint each have multiple physical interfaces connecting the sending endpoint and the receiving endpoint to multiple networks, respectively, and the data stream is split into a series of data packets and sent over the multiple physical interfaces, and wherein in the method the sending endpoint performs the steps of:

gathering information as feedback information which includes at least a data capacity throughput for each of the multiple physical interfaces connected to the sending endpoint, wherein information is gathered by the receiving endpoint as feedback information which includes at least a data capacity throughput for each of the multiple physical interfaces connected to the receiving endpoint, wherein the feedback information gathered by the receiving endpoint is split and sent substantially simultaneously on more than one of the multiple physical interfaces from the receiving endpoint to the sending endpoint, wherein a detection is made by the receiving endpoint as to whether one or more physical interfaces used for sending split feedback information gathered at the receiving endpoint have degraded or failed, based on the feedback information, and wherein the feedback information is reapportioned and sent from the receiving endpoint to the sending endpoint substantially simultaneously on more than one of the multiple physical interfaces which have not been detected as degraded or failed, wherein when reapportioning the feedback information, the feedback information is apportioned from the more than one of the physical interfaces to a different one of the multiple physical interfaces, and wherein the different one of the multiple physical interfaces is detected as degraded, and when reapportioning the feedback information, a portion of the feedback information is sent over the degraded physical interface, and a remaining portion of the feedback information is apportioned from the one degraded physical interface to a different one of the multiple physical interfaces.

31. A method according to claim 30, wherein the different one of the multiple physical interfaces is a physical interface which is already being used to send data.

32. A method according to claim 30, wherein the different one of the multiple physical interfaces is a physical interface which is not already being used to send data.

33. A method according to claim 30, wherein when reapportioning the feedback information, the feedback information is split and apportioned over different ones of the multiple physical interfaces.

34. A method according to claim 33, wherein the different ones of the multiple physical interfaces include physical interfaces which are already being used to send data.

35. A method according to claim 33, wherein the different ones of the multiple physical interfaces include one or more physical interfaces which are not already being used to send data.

36. A method according to claim 33, wherein the one physical interface is detected as degraded, and when reapportioning the feedback information, a portion of the feedback information is sent over the degraded physical interface, and a remaining portion of the feedback information is split and apportioned over different ones of the multiple physical interfaces.

37. A method according to claim 30, wherein one or more of the physical interfaces on which the split feedback information is sent are detected as degraded, and when reapportioning the feedback information, a portion of the feedback information is sent over one or more of the degraded physical interfaces, and a remaining portion of the feedback information is split and apportioned over different ones of the multiple physical interfaces.

38. A method according to claim 30, wherein the more than one of the physical interfaces on which the reapportioned feedback information is sent are physical interfaces having a data capacity throughput which is a median data capacity throughput among the data capacity throughputs for each of the multiple physical interfaces.

39. A method according to claim 30, wherein the information gathered as feedback information further comprises at least one of network statistics, process information, framework information, and information regarding an external environment of the receiving endpoint.

40. A method according to claim 39, wherein a weighted value is assigned for each type of feedback information in accordance with a desired output for the physical interfaces used to send the split feedback information, and
wherein the one or more physical interfaces used to send the reapportioned feedback information are selected based on an output value determined using the weighted values.

41. A method according to claim 40, wherein the weighted value assigned for each type of feedback information is continuously adjusted until the output value is equal to or greater than a predetermined percentage of an expected result.

42. A method according to claim 30, wherein the one or more physical interfaces are detected as degraded when a current data capacity throughput for the physical interface is below a standard deviation of an average data capacity throughput for the physical interface, and wherein the standard deviation of the average data capacity throughput is calculated from a time when the data is first sent to a time when the current data capacity is measured.

43. A method according to claim 30, wherein the one or more physical interfaces are detected as degraded when a current data capacity throughput for the physical interface is less than a known data capacity throughput of a least participating physical interface.

44. A receiving endpoint comprising:
a computer-readable memory constructed to store computer-executable process steps; and
a processor constructed to execute the computer-executable process steps stored in the memory,
wherein the process steps in the memory cause the processor to provide feedback information for a data stream being sent from a sending endpoint to the receiving endpoint, wherein both of the sending endpoint and the receiving endpoint each have multiple physical interfaces connecting the sending endpoint and the receiving endpoint to multiple networks, respectively, and the data stream is split into a series of data packets and sent over the multiple physical interfaces, and wherein the process steps stored in the memory include computer-executable steps to:
gather information as feedback information which includes at least a data capacity throughput for each of the multiple physical interfaces connected to the receiving endpoint;
split feedback information gathered at the receiving endpoint and send the split feedback information substantially simultaneously on more than one or more of the multiple physical interfaces to the sending endpoint;
detect whether one or more of the physical interfaces used for sending the split feedback information have degraded or failed, based on the feedback information; and
reapportion the feedback information and send the reapportioned feedback information to the sending endpoint substantially simultaneously on more than one of the multiple physical interfaces which have not been detected as degraded or failed,
wherein when reapportioning the feedback information, the feedback information is apportioned from the more than one of the physical interfaces to a different one of the multiple physical interfaces, and
wherein the different one of the multiple physical interfaces is detected as degraded, and when reapportioning the feedback information, a portion of the feedback information is sent over the degraded physical interface, and a remaining portion of the feedback information is apportioned from the one degraded physical interface to a different one of the multiple physical interfaces.

45. A sending endpoint comprising:
a computer-readable memory constructed to store computer-executable process steps; and
a processor constructed to execute the computer-executable process steps stored in the memory,
wherein the process steps in the memory cause the processor to provide feedback information for a data stream being sent from the sending endpoint to a receiving endpoint, wherein both of the sending endpoint and the receiving endpoint each have multiple physical interfaces connecting the sending endpoint and the receiving endpoint to multiple networks, respectively, and the data stream is split into a series of data packets and sent over the multiple physical interfaces, and wherein the process steps stored in the memory include computer-executable steps to:
gather information as feedback information which includes at least a data capacity throughput for each of the multiple physical interfaces connected to the sending endpoint, wherein information is gathered by the receiving endpoint as feedback information which includes at least a data capacity throughput for each of the multiple physical interfaces connected to the receiving endpoint, wherein the feedback information gathered by the receiving endpoint is split and sent substantially simultaneously on more than one of the multiple physical interfaces from the receiving endpoint to the sending endpoint, wherein a detection is made by the receiving endpoint as to whether one or more physical interfaces used for sending split feedback information gathered at the receiving endpoint have degraded or failed, based on the feedback information, and wherein the feedback information is reapportioned and sent from the receiving endpoint to the sending endpoint substantially simultaneously on more than one of the multiple physical interfaces which have not been detected as degraded or failed, wherein when reapportioning the feedback information, the feedback information is apportioned from the more than one of the physical interfaces to a different one of the multiple physical interfaces, and wherein the different one of the multiple physical interfaces is detected as degraded, and when reapportioning the feedback information, a portion of the feedback information is sent over the degraded physical interface, and a remaining portion of the feedback information is apportioned from the one degraded physical interface to a different one of the multiple physical interfaces.

46. A computer-readable memory medium on which is stored computer-executable process steps for causing a processor to provide feedback information for a data stream being sent from the sending endpoint to a receiving endpoint, wherein both of the sending endpoint and the receiving endpoint each have multiple physical interfaces connecting the sending endpoint and the receiving endpoint to multiple networks, respectively, and the data stream is split into a series of data packets and sent over the multiple physical interfaces, the process steps comprising:

gathering information as feedback information which includes at least a data capacity throughput for each of the multiple physical interfaces connected to the receiving endpoint;

splitting feedback information gathered at the receiving endpoint and sending the split feedback information substantially simultaneously on more than one of the multiple physical interfaces to the sending endpoint;

detecting whether one or more of the physical interfaces used for sending the split feedback information have degraded or failed, based on the feedback information; and reapportioning the feedback information and sending the reapportioned feedback information to the sending endpoint substantially simultaneously on more than one of the multiple physical interfaces which have not been detected as degraded or failed, wherein when reapportioning the feedback information, the feedback information is apportioned from the more than one of the physical interfaces to a different one of the multiple physical interfaces, and wherein the different one of the multiple physical interfaces is detected as degraded, and when reapportioning the feedback information, a portion of the feedback information is sent over the degraded physical interface, and a remaining portion of the feedback information is apportioned from the one degraded physical interface to a different one of the multiple physical interfaces.

47. A computer-readable memory medium on which is stored computer-executable process steps for causing a processor to provide feedback information for a data stream being sent from the sending endpoint to a receiving endpoint, wherein both of the sending endpoint and the receiving endpoint each have multiple physical interfaces connecting the sending endpoint and the receiving endpoint to multiple networks, respectively, and the data stream is split into a series of data packets and sent over the multiple physical interfaces, the process steps comprising:

gathering information as feedback information which includes at least a data capacity throughput for each of the multiple physical interfaces connected to the sending endpoint, wherein information is gathered by the receiving endpoint as feedback information which includes at least a data capacity throughput for each of the multiple physical interfaces connected to the receiving endpoint, wherein the feedback information gathered by the receiving endpoint is split and sent substantially simultaneously on more than one of the multiple physical interfaces from the receiving endpoint to the sending endpoint, wherein a detection is made by the receiving endpoint as to whether one or more physical interfaces used for sending split feedback information gathered at the receiving endpoint have degraded or failed, based on the feedback information, and wherein the feedback information is reapportioned and sent from the receiving endpoint to the sending endpoint substantially simultaneously on more than one of the multiple physical interfaces which have not been detected as degraded or failed, wherein when reapportioning the feedback information, the feedback information is apportioned from the more than one of the physical interfaces to a different one of the multiple physical interfaces, and wherein the different one of the multiple physical interfaces is detected as degraded, and when reapportioning the feedback information, a portion of the feedback information is sent over the degraded physical interface, and a remaining portion of the feedback information is apportioned from the one degraded physical interface to a different one of the multiple physical interfaces.

* * * * *